United States Patent
Wang et al.

(10) Patent No.: US 12,483,637 B2
(45) Date of Patent: Nov. 25, 2025

(54) SERVICE IDENTIFIER ALLOCATION METHOD AND COMMUNICATION APPARATUS IN COMPUTING-AWARE NETWORK

(71) Applicant: HUAWEI TECHNOLOGIES CO., LTD., Shenzhen (CN)

(72) Inventors: Yan Wang, Shanghai (CN); Weihua Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/362,141

(22) Filed: Jul. 31, 2023

(65) Prior Publication Data

US 2023/0412560 A1    Dec. 21, 2023

Related U.S. Application Data

(63) Continuation of application No. PCT/CN2022/072261, filed on Jan. 17, 2022.

(30) Foreign Application Priority Data

Jan. 30, 2021   (CN) ......................... 202110131900.X

(51) Int. Cl.
*H04L 67/63* (2022.01)
*H04L 67/1014* (2022.01)
*H04L 67/1021* (2022.01)

(52) U.S. Cl.
CPC .......... *H04L 67/63* (2022.05); *H04L 67/1014* (2013.01); *H04L 67/1021* (2013.01)

(58) Field of Classification Search
CPC . H04L 41/50; H04L 41/5041; H04L 41/5045; H04L 41/5048; H04L 41/5051;
(Continued)

(56) References Cited

U.S. PATENT DOCUMENTS 10,320,625 B1 *   6/2019   Cherumbath ....... H04L 41/5048
2020/0213914 A1 *  7/2020   Shen ....................... H04L 67/63
(Continued)

FOREIGN PATENT DOCUMENTS

CN    109936614 A    6/2019
CN    110225144 A    9/2019
(Continued)

OTHER PUBLICATIONS

3GPP TS 23.502 V16.7.1 (Jan. 2021), 3rd Generation Partnership Project; Technical Specification Group Services and System Aspects; Procedures for the 5G System (5GS); Stage 2 (Release 16), total 603 pages.

(Continued)

*Primary Examiner* — Vivek C Srivastava
*Assistant Examiner* — William C Mcbeth
(74) *Attorney, Agent, or Firm* — HAUPTMAN HAM, LLP

(57) ABSTRACT

A service identifier allocation method in a computing-aware network includes requesting, by a terminal device, a computing management function to deploy a computing service by using information for obtaining the computing service. The method also includes receiving, by the terminal device, a notification from the computing management function. The notification indicates that deployment of the computing service is completed. The method further includes sending, by the terminal device, a service request packet to a first computing-aware user plane function. The service request packet is used to request the computing service.

16 Claims, 27 Drawing Sheets

(58) Field of Classification Search
CPC ............ H04L 41/5054; H04L 41/5096; H04L 67/1014; H04L 67/50; H04L 67/51; H04L 67/52; H04L 67/53; H04L 67/63; H04W 4/50; H04W 8/26

See application file for complete search history.

(56) References Cited

U.S. PATENT DOCUMENTS

| | | | | |
|---|---|---|---|---|
| 2020/0236594 | A1* | 7/2020 | Tang | H04L 41/5051 |
| 2020/0358673 | A1* | 11/2020 | Ren | H04L 41/5054 |
| 2020/0389531 | A1* | 12/2020 | Lee | H04L 67/51 |
| 2022/0201597 | A1* | 6/2022 | Kim | H04L 67/51 |
| 2023/0007457 | A1* | 1/2023 | Kleinrouweler | H04L 67/1014 |
| 2023/0199480 | A1* | 6/2023 | Tao | H04W 8/26 |
| | | | | 370/338 |
| 2023/0239343 | A1* | 7/2023 | Ge | H04W 4/50 |
| | | | | 709/203 |
| 2023/0362602 | A1* | 11/2023 | Gupta | H04L 67/51 |
| 2024/0064115 | A1* | 2/2024 | Bernardos | H04L 67/51 |

FOREIGN PATENT DOCUMENTS

| | | | | |
|---|---|---|---|---|
| EP | 3720091 | A1 | 10/2020 | |
| EP | 3754949 | A1 * | 12/2020 | ............ H04L 67/51 |

OTHER PUBLICATIONS

International Search Report issued in corresponding International Application No. PCT/CN2022/072261, dated Mar. 21, 2022, pp. 1-14.

Extended European Search Report issued in corresponding European Application No. 22745072.3, dated May 24, 2024, pp. 1-10.

* cited by examiner

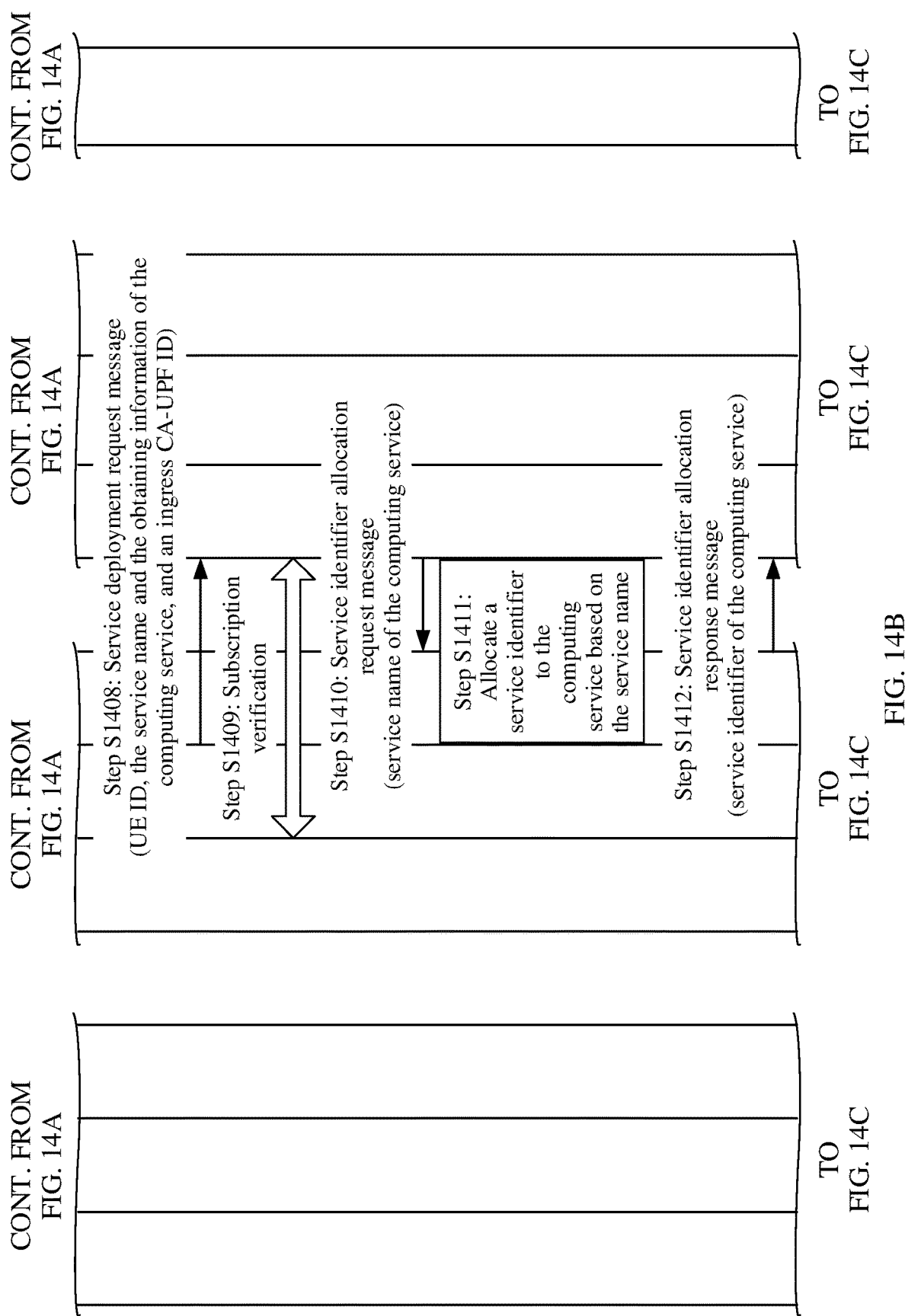

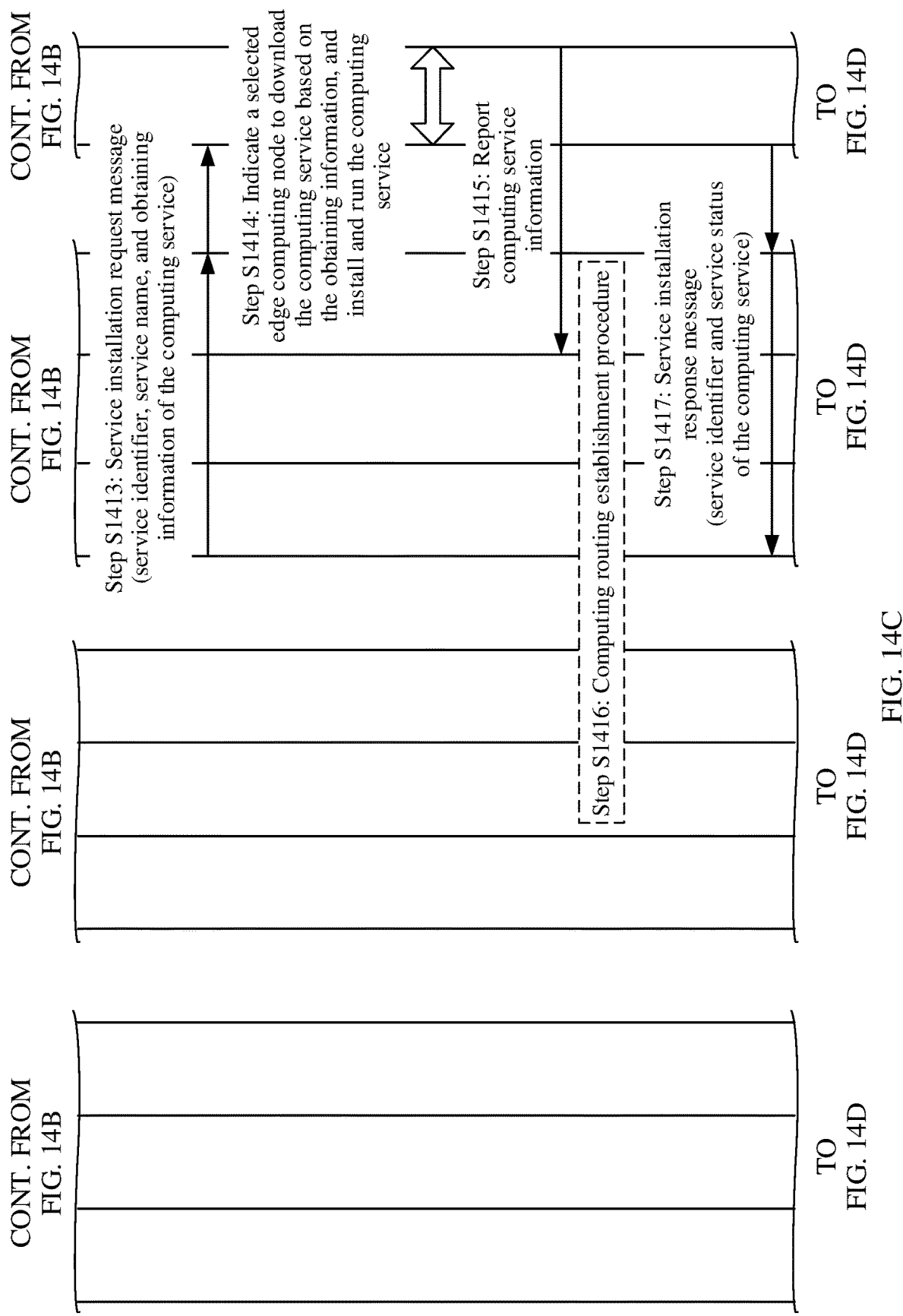

SERVICE IDENTIFIER ALLOCATION METHOD AND COMMUNICATION APPARATUS IN COMPUTING-AWARE NETWORK

CROSS-REFERENCE TO RELATED APPLICATIONS

This application is a continuation of International Application No. PCT/CN2022/072261, filed on Jan. 17, 2022, which claims priority to Chinese Patent Application No. 202110131900.X, filed on Jan. 30, 2021. The disclosures of the aforementioned applications are hereby incorporated by reference in their entireties.

TECHNICAL FIELD

This application relates to the field of wireless communication technologies, and in particular, to a service identifier allocation method and a communication apparatus in a computing-aware network.

BACKGROUND

In a 3GPP-based computing-aware network, a same computing service may be deployed on different edge computing nodes in the network. When a computing service is deployed on a plurality of edge computing nodes in the network, it is equivalent to that a plurality of copies of the computing service are distributed in the network, and the plurality of copies correspond to different server IP addresses.

To implement service identifier-based routing in the computing-aware network, each computing service corresponds to a unique service identifier. The computing-aware network implements routing of the computing service based on the service identifier, and maps server IP addresses of a plurality of copies of a same computing service deployed on different edge computing nodes to a same service identifier, which indicates that the plurality of edge computing nodes may provide a same computing service. In this way, a terminal may initiate a service request by using the service identifier, and does not need to consider specific details such as a location and an IP address of a server on which the computing service is located. A computing aware-user plane function in the network dynamically routes and forwards a received service request of the terminal based on service identifier-based computing routing, so that the service request is forwarded to an optimal edge computing node for processing.

At present, there is still a lack of a unified service identifier generation and allocation mechanism for the computing-aware network. If a network function outside the 3GPP network is scaled to implement service identifier allocation, performance and scalability problems may exist, or it is difficult to ensure a one-to-one correspondence between a service identifier and a service name, resulting in a routing conflict. For example, although routing and addressing can also be implemented by using a DNS to translate a domain name into an IP address, efficiency is low, a query delay is prolonged, and a global update is slow. Therefore, using DNS for translating a domain name into an IP address is not applicable to lightweight computing resources and highly dynamic service deployment and scheduling scenarios in the computing-aware network. For another example, when a hash algorithm is used for performing a hash operation on a computing name to obtain a service identifier, a client and a server are required to use a same hash algorithm. However, even so, because the client and the server run a hash algorithm independently, a conflict may still exist between service identifiers obtained by performing a hash operation on different service names Consequently, a service request is routed to an incorrect edge computing node, and normal running of a service is affected.

SUMMARY

Embodiments of this application provide a service identifier allocation method and a communication apparatus in a computing-aware network, to allocate a corresponding service identifier to a computing service deployed in the computing-aware network, and provide the corresponding service identifier to a terminal device.

According to a first aspect, an embodiment of this application provides a service identifier allocation method in a computing-aware network. The method may be performed by a terminal device, or may be performed by a component (for example, a chip or a circuit) configured in the terminal device.

The method includes: The terminal device queries a service identifier management function for a service identifier of a computing service by using a service name of the computing service; the terminal device receives the service identifier of the computing service from the service identifier management function; and the terminal device sends a service request packet to a first computing aware-user plane function. The service request packet is used to request the computing service, the service request packet includes the service identifier of the computing service, and the service identifier is a destination address of the service request packet.

In the foregoing technical solution, the terminal device may query, through interaction with the service identifier management function, a service identifier of a computing service deployed in the computing-aware network, and then send, based on the service identifier, a service request packet to an accessed first computing aware-user plane function, to access the computing service deployed in the computing-aware network.

In a possible design of the first aspect, the method further includes: The terminal device receives a service status of the computing service from the service identifier management function, where the service status indicates that the computing service is available or unavailable. That the terminal device sends a service request packet to a first computing aware-user plane function includes: The terminal device sends the service request packet to the first computing aware-user plane function if the service status indicates that the computing service is available.

In the foregoing technical solution, in a process of querying a service identifier of a computing service deployed in the computing-aware network, the terminal device may further obtain a service status of the computing service, to learn whether the computing service is currently available in the computing-aware network, and to determine whether to access the computing service.

In a possible design of the first aspect, the method further includes: The terminal device receives a query request message from a client, where the query request message is used to query the service identifier of the computing service, and the query request message includes the service name of the computing service; the terminal device sends a query response message to the client, where the query response message includes the service identifier and the service status of the computing service; and the terminal device receives the service request packet from the client if the service status indicates that the computing service is available.

In the foregoing technical solution, the terminal device may trigger, at a request of the client installed on the terminal device, a process of querying the service identifier management function for a service identifier of a computing service deployed in the computing-aware network, and return an obtained query result (including a service identifier and a service status of the computing service) to the client. In this way, in an interaction mode, the client may directly generate a service request packet based on related information of the computing service, the terminal device may receive the service request packet, and forward the service request packet to the first computing aware-user plane function accessed by the terminal device.

In a possible design of the first aspect, the method further includes: The terminal device receives a registration request message from a client, where the registration request message is used to request to register the computing service with the terminal device, and the registration request message includes the service name of the computing service; the terminal device sends a registration response message to the client, where the registration response message is used to notify the client that registration of the computing service is completed, and the registration response message includes the service status of the computing service; and the terminal device receives a service request message from the client, and generates the service request packet based on the service request message if the service status indicates that the computing service is available.

In the foregoing technical solution, the terminal device may trigger, at a request of the client installed on the terminal device, a process of querying the service identifier management function for a service identifier of a computing service deployed in the computing-aware network, and return an obtained query result (including a service status of the computing service) to the client. In this way, in another interaction mode, the client may generate a service request message based on related information of the computing service, and the terminal device generates a service request packet based on the service request message, and sends the service request packet to the first computing aware-user plane function accessed by the terminal device.

According to a second aspect, an embodiment of this application provides a service identifier allocation method in a computing-aware network. The method may be performed by a service identifier management function, or may be performed by a component (for example, a chip or a circuit) configured in the service identifier management function.

The method includes: The service identifier management function receives a service name of a computing service from an edge computing node; the service identifier management function allocates a service identifier to the computing service based on the service name; and the service identifier management function sends the service identifier of the computing service to the edge computing node.

In the foregoing technical solution, the service identifier management function may receive the service name of the computing service from the edge computing node, allocate, at a request of the edge computing node, the corresponding service identifier to the computing service deployed on the edge computing node, and return the corresponding service identifier to the edge computing node. Setting the service identifier management function can facilitate unified allocation and management of service identifiers of computing services deployed in the computing-aware network, to implement consistency of service identifier—based computing routing, and effectively avoid a routing conflict. In addition, it is considered that the computing service deployed in the computing-aware network may be a fine-grained microservice or a function instance, and a quantity of the computing services is large. Allocation of the service identifiers by using the service identifier management function can implement high dynamic deployment of the computing service in the computing-aware network, and effectively enhance flexibility of the computing-aware network.

In a possible design of the second aspect, the method includes: The service identifier management function receives the service name of the computing service from a terminal device; the service identifier management function queries the service identifier of the computing service based on the service name; and the service identifier management function sends the service identifier of the computing service to the terminal device.

In the foregoing technical solution, the service identifier management function may receive the service name of the computing service from the terminal device, query, based on the service name at a request of the terminal device, a service identifier of a computing service deployed in the computing-aware network, and return the service identifier to the terminal device. In this way, the terminal device can access the computing service based on the obtained service identifier.

In a possible design of the second aspect, the method further includes: The service identifier management function sends a service status of the computing service to the terminal device. The service status indicates that the computing service is available or unavailable, and the service status is obtained by the service identifier management function from a computing management function.

In the foregoing technical solution, in a process in which the terminal device queries a service identifier of a computing service deployed in the computing-aware network, the service identifier management function may further provide a service status of the computing service. In this way, the terminal device can determine, based on whether the computing service is currently available in the computing-aware network, whether to access the computing service.

In a possible design of the second aspect, that the service identifier management function obtains the service status of the computing service from the computing management function includes: The service identifier management function sends a status request message to the computing management function, where the status request message is used to request the service status of the computing service, and the status request message includes the service identifier of the computing service; and the service identifier management function receives a status response message from the computing management function, where the status response message includes the service status of the computing service.

In a possible design of the second aspect, the status request message includes identification information of a first computing aware-user plane function accessed by the terminal device, and the identification information of the first computing aware-user plane function is used to query the service status of the computing service corresponding to the first computing aware-user plane function.

According to a third aspect, an embodiment of this application provides a service identifier allocation method in a computing-aware network. The method may be performed by an edge computing node, or may be performed by a component (for example, a chip or a circuit) configured on the edge computing node.

The method includes: The edge computing node deploys a computing service, and generates a service name for the computing service; the edge computing node requests, by using the service name of the computing service, a service identifier management function to allocate a service identifier to the computing service; and the edge computing node receives the service identifier of the computing service from the service identifier management function.

In the foregoing technical solution, the edge computing node may request the service identifier management function to allocate a corresponding service identifier to a computing service deployed on the edge computing node, and receive an allocation result returned by the service identifier management function.

In a possible design, the method further includes: The edge computing node reports computing service information of the computing service to an associated egress computing aware-user plane function. The computing service information includes the service identifier, a service attribute, a running status, and computing resource information of the computing service.

In the foregoing technical solution, the foregoing related information including the service identifier of the computing service is reported to the egress computing aware-user plane function. In this way, the egress computing aware-user plane function can complete a process of constructing computing routing of the computing service in the computing-aware network through interaction with a corresponding ingress computing aware-user plane function.

According to a fourth aspect, an embodiment of this application provides a service identifier allocation method in a computing-aware network. The method may be performed by a computing management function, or may be performed by a component (for example, a chip or a circuit) configured in the computing management function.

The method includes: The computing management function receives a status request message from a service identifier management function, where the status request message is used to request a service status of a computing service, and the status request message includes a service identifier of the computing service; the computing management function determines the service status of the computing service based on the service identifier, where the service status indicates that the computing service is available or unavailable; and the computing management function sends a status response message to the service identifier management function, where the status response message includes the service status of the computing service.

In a possible design of the fourth aspect, that the computing management function determines the service status of the computing service based on the service identifier includes: The computing management function determines, based on the service identifier and a correspondence between a first computing aware-user plane function accessed by a terminal device and the service identifier, the service status of the computing service corresponding to the first computing aware-user plane function.

In a possible design of the fourth aspect, the status request message includes identification information of the first computing aware-user plane function, and the identification information of the first computing aware-user plane function is used to query the service status of the computing service corresponding to the first computing aware-user plane function.

According to a fifth aspect, an embodiment of this application provides a service identifier allocation method in a computing-aware network. The method may be performed by a terminal device, or may be performed by a component (for example, a chip or a circuit) configured in the terminal device.

The method includes: The terminal device requests a computing management function to query a service identifier of a computing service by using a service name of the computing service; the terminal device receives the service identifier and a service status of the computing service from the computing management function; and the terminal device sends a service request packet to a first computing aware-user plane function if the service status indicates that the computing service is available. The service request packet is used to request the computing service, the service request packet includes the service identifier of the computing service, and the service identifier is a destination address of the service request packet.

According to a sixth aspect, an embodiment of this application provides a service identifier allocation method in a computing-aware network. The method may be performed by a computing management function, or may be performed by a component (for example, a chip or a circuit) configured in the computing management function.

The method includes: The computing management function receives a service name of a computing service from a terminal device; the computing management function queries a service identifier management function for a service identifier of the computing service by using the service name of the computing service; the computing management function receives the service identifier of the computing service from the service identifier management function; the computing management function determines a service status of the computing service based on the service identifier, where the service status indicates that the computing service is available or unavailable; and the computing management function sends the service identifier and the service status of the computing service to the terminal device.

In a possible design of the sixth aspect, that the computing management function determines a service status of the computing service based on the service identifier includes: The computing management function determines, based on the service identifier and a correspondence between a first computing aware-user plane function accessed by the terminal device and the service identifier, the service status of the computing service corresponding to the first computing aware-user plane function.

In a possible design of the sixth aspect, the method further includes: The computing management function receives identification information of the first computing aware-user plane function from a session management function. The identification information of the first computing aware-user plane function is used to query the service status of the computing service corresponding to the first computing aware-user plane function.

For beneficial effects in any possible design of the fifth aspect and the sixth aspect, refer to corresponding descriptions in the first aspect to the third aspect. Details are not described again.

According to a seventh aspect, an embodiment of this application provides a service identifier allocation method in a computing-aware network. The method may be performed by a terminal device, or may be performed by a component (for example, a chip or a circuit) configured in the terminal device.

The method includes: The terminal device requests a computing management function to deploy a computing service by using information for obtaining the computing service; the terminal device receives a notification from the computing management function, where the notification indicates that deployment of the computing service is completed; and the terminal device sends a service request packet to a first computing aware-user plane function, where the service request packet is used to request the computing service.

In the foregoing technical solution, the terminal device may actively request the computing management function to deploy a computing service in the network. In this way, the computing management function may complete deployment of the computing service in the network based on the information for obtaining the computing service provided by the terminal device, and notify the terminal device of a result. According to the method, the terminal device may actively upload the computing service to the network, to effectively scale a way of deploying the computing service, and enhance diversity of computing services that can be provided by the computing-aware network.

In a possible design of the seventh aspect, the method further includes: The terminal device provides a service name of the computing service to the computing management function. That the terminal device receives a notification from the computing management function includes: The terminal device receives a service identifier and a service status of the computing service from the computing management function, where the service status indicates that the computing service is available or unavailable.

In a possible design of the seventh aspect, that the terminal device sends a service request packet to a first computing aware-user plane function includes: The terminal device sends the service request packet to the first computing aware-user plane function if the service status indicates that the computing service is available. The service request packet includes the service identifier of the computing service, and the service identifier is a destination address of the service request packet.

In a possible design of the seventh aspect, the method further includes: The terminal device receives a deployment request message from a client, where the deployment request message is used to trigger deployment of the computing service, and the deployment request message includes the service name of the computing service and the information for obtaining the computing service; the terminal device sends a deployment response message to the client, where the deployment response message is used to notify the client that deployment of the computing service is completed, and the deployment response message includes the service identifier and the service status of the computing service; and the terminal device receives the service request packet from the client if the service status indicates that the computing service is available.

In a possible design of the seventh aspect, the method further includes: The terminal device provides identification information of the terminal device to the computing management function.

According to an eighth aspect, an embodiment of this application provides a service identifier allocation method in a computing-aware network. The method may be performed by a computing management function, or may be performed by a component (for example, a chip or a circuit) configured in the computing management function.

The method includes: The computing management function receives obtaining information of a computing service from a terminal device; the computing management function sends a request to an edge computing platform manager, where the request includes the information for obtaining the computing service, and the request is used to request to deploy the computing service; the computing management function receives a response from the edge computing platform manager, where the response indicates that deployment of the computing service is completed; and the computing management function notifies the terminal device that deployment of the computing service is completed.

In the foregoing technical solution, after receiving the request of the terminal device that requests to deploy a computing service, the computing management function may further send, to the edge computing platform manager, the information for obtaining the computing service provided by the terminal device. That the computing service is deployed on an edge computing node in an edge data network is implemented through coordination and management of the edge computing platform manager.

In a possible design of the eighth aspect, the method further includes: The computing management function receives a service name of the computing service from the terminal device; the computing management function requests a service identifier management function to allocate a service identifier to the computing service, and provides the service name of the computing service to the service identifier management function; and the computing management function receives the service identifier of the computing service from the service identifier management function.

In the foregoing technical solution, before the computing management function deploys, through interaction with the edge computing platform manager, the computing service requested by the terminal device, the computing management function may further send, to the service identifier management function, the service identifier of the computing service provided by the terminal device, and allocate the corresponding service identifier to the computing service by using the service identifier management function, so that the network subsequently constructs computing routing based on the service identifier.

In a possible design of the eighth aspect, the request includes the service identifier of the computing service.

In a possible design of the eighth aspect, the response includes a service status of the computing service, and the service status indicates that the computing service is available or unavailable. That the computing management function notifies the terminal device that deployment of the computing service is completed includes: The computing management function sends the service identifier and the service status of the computing service to the terminal device.

In a possible design of the eighth aspect, the method further includes: The computing management function receives identification information of the terminal device from the terminal device; and the computing management function verifies, by using a unified data management based on the identification information of the terminal device, the service name of the computing service and the information for obtaining the computing service, that the terminal device has permission to actively trigger deployment of the computing service. This effectively improves security of the technical solution.

According to a ninth aspect, an embodiment of this application provides a service identifier allocation method in a computing-aware network. The method may be performed by an edge computing platform manager, or may be performed by a component (for example, a chip or a circuit) configured in the edge computing platform manager.

The method includes: The edge computing platform manager receives a request from a computing management function, where the request includes obtaining information of a computing service, and the request is used to request to deploy the computing service; the edge computing platform manager indicates a selected edge computing node to deploy the computing service based on the obtaining information; and the edge computing platform manager sends a response to the computing management function, where the response indicates that deployment of the computing service is completed.

In a possible design of the ninth aspect, the request includes a service identifier of the computing service.

In a possible design of the ninth aspect, the response includes a service status of the computing service, and the service status indicates that the computing service is available or unavailable.

According to a tenth aspect, an embodiment of this application provides a service identifier allocation method in a computing-aware network. The method may be performed by a service identifier management function, or may be performed by a component (for example, a chip or a circuit) configured in the service identifier management function.

The method includes: The service identifier management function receives a service name of a computing service from a computing management function; the service identifier management function allocates a service identifier to the computing service based on the service name; and the service identifier management function sends the service identifier of the computing service to the computing management function.

For beneficial effects in any possible design of the ninth aspect and the tenth aspect, refer to corresponding descriptions in the seventh aspect to the eighth aspect. Details are not described again.

According to an eleventh aspect, an embodiment of this application provides a communication apparatus. In an implementation, the apparatus may have a function of implementing the terminal device according to any one of the foregoing aspects or the possible designs of the foregoing aspects. The apparatus may be a terminal device, or may be a chip included in a terminal device, or may be an apparatus including a terminal device.

In another implementation, the apparatus may have a function of implementing the service identifier management function according to any one of the foregoing aspects or the possible designs of the foregoing aspects, or have a function of implementing the edge computing node according to any one of the foregoing aspects or the possible designs of the foregoing aspects, or have a function of implementing the computing management function according to any one of the foregoing aspects or the possible designs of the foregoing aspects, or have a function of implementing the edge computing platform manager according to any one of the foregoing aspects or the possible designs of the foregoing aspects. The apparatus may be a network device, or may be a chip included in a network device.

The functions of the communication apparatus may be implemented by hardware, or may be implemented by hardware executing corresponding software. The hardware or the software includes one or more modules, units, or means corresponding to the functions.

In a possible design, a structure of the apparatus includes a processing module and a transceiver module. The processing module is configured to support the apparatus in performing a corresponding function of the terminal device according to any one of the foregoing aspects or the designs of the foregoing aspects, or performing a corresponding function of the service identifier management function according to any one of the foregoing aspects or the designs of the foregoing aspects, or performing a corresponding function of the edge computing node according to any one of the foregoing aspects or the designs of the foregoing aspects, or performing a corresponding function of the computing management function according to any one of the foregoing aspects or the designs of the foregoing aspects, or performing a corresponding function of the edge computing platform manager according to any one of the foregoing aspects or the designs of the foregoing aspects. The transceiver module is configured to support communication between the apparatus and another communication device. For example, when the apparatus is a terminal device, the apparatus may query a service identifier management function for a service identifier of a computing service by using a service name of the computing service. The communication apparatus may further include a storage module. The storage module is coupled to the processing module, and stores program instructions and data for the apparatus. In an example, the processing module may be a processor, a communication module may be a transceiver, and the storage module may be a memory. The memory may be integrated with the processor, or may be disposed separately from the processor.

In another possible design, a structure of the apparatus includes a processor, and may further include a memory. The processor is coupled to the memory, and may be configured to execute computer program instructions stored in the memory, so that the apparatus performs the method according to any one of the foregoing aspects or the possible designs of the foregoing aspects. Optionally, the apparatus further includes a communication interface, and the processor is coupled to the communication interface. When the apparatus is a network device or a terminal device, the communication interface may be a transceiver or an input/output interface. When the apparatus is a chip included in the network device or a chip included in the terminal device, the communication interface may be an input/output interface of the chip. Optionally, the transceiver may be a transceiver circuit, and the input/output interface may be an input/output circuit.

According to a twelfth aspect, an embodiment of this application provides a chip system, including a processor. The processor is coupled to a memory, the memory is configured to store a program or instructions, and when the program or the instructions is/are executed by the processor, the chip system is enabled to implement the method according to any one of the foregoing aspects or the possible designs of the foregoing aspects.

Optionally, the chip system further includes an interface circuit, and the interface circuit is configured to exchange code instructions to the processor.

Optionally, there may be one or more processors in the chip system, and the processor may be implemented by hardware or may be implemented by software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. For example, the memory may be a non-transitory processor, for example, a read-only memory ROM. The memory and the processor may be integrated on a same chip, or may be separately disposed on different chips.

According to a thirteenth aspect, an embodiment of this application provides a computer-readable storage medium. The computer-readable storage medium stores a computer program or instructions. When the computer program or the instructions is/are executed, a computer is enabled to perform the method according to any one of the foregoing aspects or the possible designs of the foregoing aspects.

According to a fourteenth aspect, an embodiment of this application provides a computer program product. When a computer reads and executes the computer program product, the computer is enabled to perform the method according to any one of the foregoing aspects or the possible designs of the foregoing aspects.

According to a fifteenth aspect, an embodiment of this application provides a communication system. The communication system includes one or more network elements or functional entities of a terminal device, a service identifier management function, a computing management function, an edge computing node, or an edge computing platform manager.

In a possible design, the terminal device can implement the method according to any one of the first aspect or the possible designs of the first aspect, the service identifier management function can implement the method according to any one of the second aspect or the possible designs of the second aspect, the edge computing node can implement the method according to any one of the third aspect or the possible designs of the third aspect, and the computing management function can implement the method according to any one of the fourth aspect or the possible designs of the fourth aspect.

In another possible design, the terminal device can implement the method according to any one of the fifth aspect or the possible designs of the fifth aspect, and the computing management function can implement the method according to any one of the sixth aspect or the possible designs of the sixth aspect.

In still another possible design, the terminal device can implement the method according to any one of the seventh aspect or the possible designs of the seventh aspect, the computing management function can implement the method according to any one of the eighth aspect or the possible designs of the eighth aspect, the edge computing platform manager can implement the method according to any one of the ninth aspect or the possible designs of the ninth aspect, and the service identifier management function can implement the method according to any one of the tenth aspect or the possible designs of the tenth aspect.

Optionally, the communication system further includes one or more network elements or functional entities of a unified data management function, a session management function, a computing aware-user plane function, and an access network device.

BRIEF DESCRIPTION OF DRAWINGS

FIG. 10a-1 to FIG. 10a-3 and FIG. 10b-1 to FIG. 10b-3 are two specific examples in which a terminal device queries a service identifier of a computing service deployed in a network according to Embodiment 1 of this application;

FIG. 14A, FIG. 14B, FIG. 14C, and FIG. 14D are a specific example in which a terminal device actively requests a network to deploy a computing service according to Embodiment 2 of this application;

DESCRIPTION OF EMBODIMENTS

Figure 1:
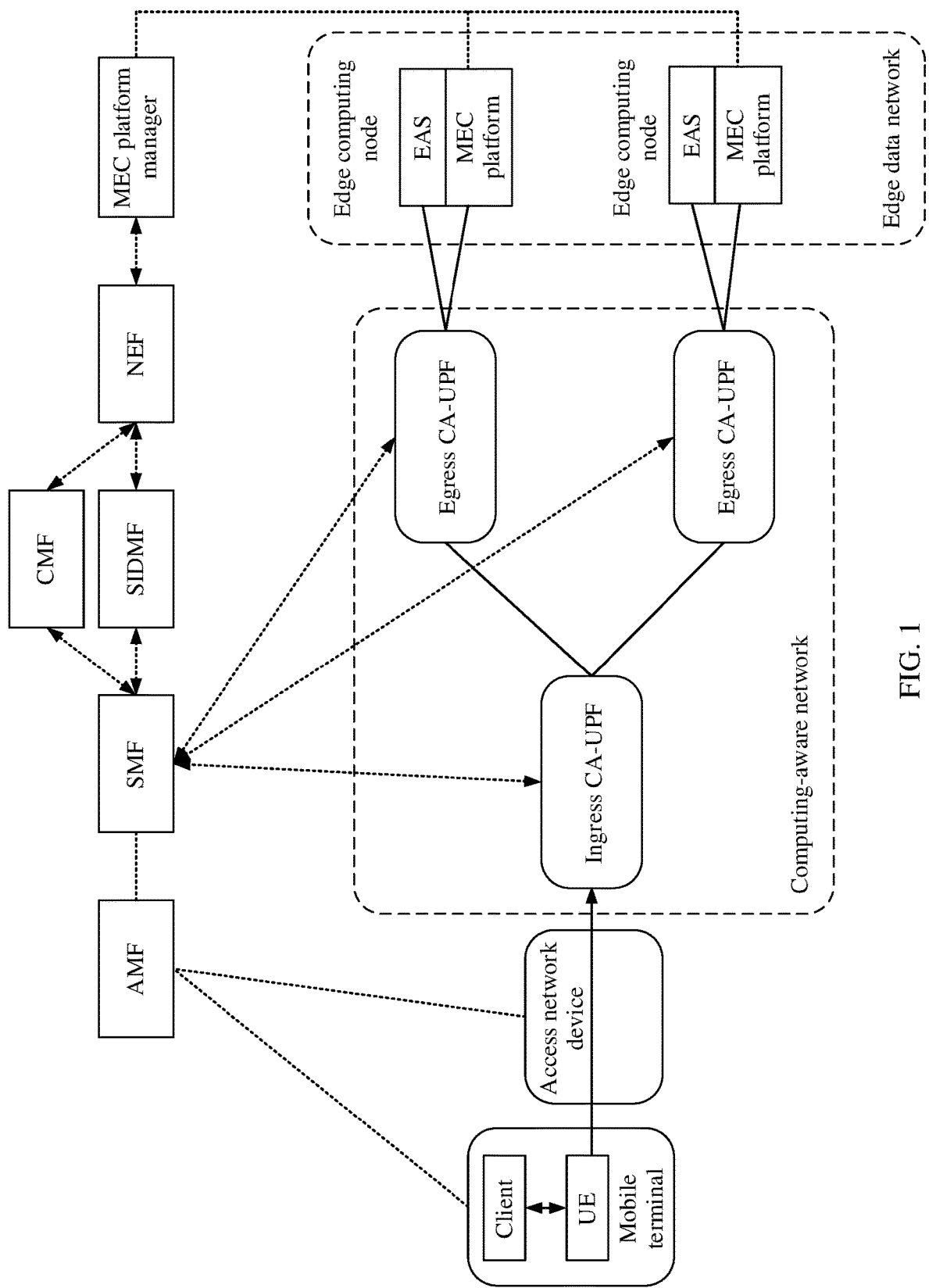
FIG. 1 is a schematic diagram of a network architecture of a communication system to which this application is applicable.

To make objectives, technical solution, and advantages of embodiments of this application clearer, the following further describes embodiments of this application in detail with reference to the accompanying drawings.

The technical solutions in embodiments of this application are applicable to various communication systems, for example, a long term evolution (LTE) system, an LTE frequency division duplex (FDD) system, an LTE time division duplex (TDD) system, a 5th generation (5G) mobile communication system or a new radio (NR) system, a future communication system, or another similar communication system.

In the following, some terms in this application are described, to help a person skilled in the art have a better understanding.

(1) A terminal device is a device having a wireless transceiver function. The terminal device may communicate with a core network or an internet by using a radio access network (RAN), and exchange voice and/or data with the RAN.

The terminal device may include user equipment (UE), a wireless terminal device, a mobile terminal device, a D2D terminal device, a vehicle to everything (V2X) terminal device, a machine-to-machine/machine-type communication (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may be a mobile phone, a tablet computer, a computer having a wireless transceiver function, or a portable, pocket-sized, handheld, or computer built-in mobile apparatus. For another example, the terminal device may alternatively be a virtual reality (VR) terminal device, an augmented reality (AR) terminal device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, a terminal device in a future evolved public land mobile communication network (PLMN), a vehicle device in V2X, a customer premise equipment (CPE), or the like. For another example, the terminal device may alternatively be a device such as a personal communication service (PCS) phone, a cordless telephone set, a session initiation protocol (SIP) phone, a wireless local loop (WLL) station, or a personal digital assistant (PDA). A specific technology used by the terminal device and a specific device form of the terminal device are not limited in embodiments of this application.

By way of example rather than limitation, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that dedicated to only one type of application function and need to collaboratively work with other devices such as smartphones, for example, various smart bands, smart helmets, or smart jewelry for monitoring physical signs. If the various terminal devices described above are located in a vehicle (for example, placed in the vehicle or installed in the vehicle), the terminal devices may be all considered as vehicle-mounted terminal devices. For example, the vehicle-mounted terminal devices are also referred to as on-board units (OBU).

(2) A radio access network device is a device that is in a communication system and that is configured to connect a terminal device to a wireless network. The radio access network device may generally be connected to a core network through a wired link (for example, an optical fiber cable). The radio access network device may be a node in a RAN, may also be referred to as a base station, or may also be referred to as a RAN node (or device).

The radio access network device may include a base station, an evolved NodeB (eNodeB) in an LTE system or an evolved LTE system (LTE-Advanced, LTE-A), a next generation NodeB (gNB) in a 5G communication system, a transmission reception point (TRP), a baseband unit (BBU), an access point (AP) in a wireless local area network (WLAN), an integrated access and backhaul (IAB) node, a base station in a future mobile communication system, an access node in a Wi-Fi system, or the like. The radio access network device may alternatively be a module or a unit that completes some functions of the base station, for example, a central unit (CU) or a distributed unit (DU). A specific technology used by the radio access network device and a specific device form of the radio access network device are not limited in embodiments of this application.

For example, in a network structure, the radio access network device may be a CU node, a DU node, or a radio access network device including a CU node and a DU node. The CU node is configured to support protocols such as a radio resource control (RRC) protocol, a packet data convergence protocol (PDCP), and a service data adaptation protocol (SDAP). The DU node is configured to support a radio link control (RLC) layer protocol, a medium access control (MAC) layer protocol, and a physical layer protocol.

The radio access network device and the terminal device may be deployed on land, including indoors or outdoors, or handheld or vehicle-mounted; may be deployed on water; or may be deployed on an airplane, a balloon, and a satellite in the air. Application scenarios of the radio access network device and the terminal device are not limited in embodiments of this application. In embodiments of this application, the radio access network device may be referred to as an access network device for short. Unless otherwise specified, all access network devices in the following are radio access network devices.

(3) A core network device is a device on a core network (CN) that provides service support for a terminal device. The core network device may include network elements or functional entities such as an access and mobility management function (AMF), a session management function (SMF), a user plane function (UPF), a network exposure function (NEF), a unified data management (UDM), and an application function (AF).

The AMF is mainly configured to implement access management and mobility management of the terminal device, such as user location update, network registration, and cell handover. The SMF is mainly configured to implement session management, such as user session establishment, modification, and release. The UPF is a functional entity of the user plane, and is mainly configured to be responsible for connecting to an external network and processing a user packet, such as forwarding, charging, and lawful interception. The NEF is configured to expose some functions of a network to an application in a controlled manner. The UDM is configured to manage subscription information of the terminal device. The AF is configured to provide service data of various applications to a control plane network element in a communication network of an operator, or obtain data information and control information of a network from a control plane network element in a communication network.

The core network device may further include another function or entity related to multi-access edge computing (MEC). Details are described in the following of this application.

It should be noted that the foregoing network elements or functional entities may be network elements in a hardware device, software functions running on dedicated hardware, or virtualized functions instantiated on a platform (for example, a cloud platform). Optionally, the foregoing network elements or functional entities may be implemented by one device, or may be implemented by a plurality of devices together, or may be different functional modules in one device. This is not specifically limited in this embodiment of this application.

(4) Terms "system" and "network" may be used interchangeably in embodiments of this application. "A plurality of" means two or more. In view of this, "a plurality of" may also be understood as "at least two" in embodiments of this application. "At least one" may be understood as one or more, for example, one, two, or more. For example, "including at least one" means including one, two, or more, and does not limit items that are included. For example, if at least one of A, B, and C is included, A, B, C, A and B, A and C, B and C, or A, B, and C may be included. Similarly, understanding of the description such as "at least one type" is similar. "At least one of the following items (pieces)" or a similar expression thereof indicates any combination of these items, including any combination of singular items (pieces) or plural items (pieces). For example, "at least one of A, B, and C" includes A, B, C, AB, AC, BC, or ABC. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects.

Unless otherwise specified, ordinal numbers such as "first" and "second" in embodiments of this application are used to distinguish a plurality of objects, and are not intended to limit a sequence, a time sequence, priorities, or importance of the plurality of objects. In addition, descriptions of "first" and "second" do not necessarily indicate that objects are different.

FIG. 1 is a diagram of a network architecture of a communication system to which an embodiment of this application is applicable. The communication system includes a terminal device, a radio access network device, an AMF, an SMF, a computing management function (CMF), a service identifier management function (SIDMF), an NEF, an MEC platform manager, a computing-aware network, and an edge data network. The computing-aware network may include at least one computing aware-user plane function (CA-UPF). The edge data network may include at least one edge computing node. The edge computing node may also be referred to as an MEC node or an MEC site.

The following describes in detail functions of various types of network elements in the foregoing network architecture, and related technical features in the computing-aware network and the edge data network.

Optionally, a client is installed in the terminal device, and the client is an application client (AC).

The computing-aware network is a network that includes a plurality of CA-UPFs, can perform dynamic session management based on a service identifier of a computing service, and can adapt to dynamic deployment of the computing service and adaptively optimize computing resources. The computing-aware network may also be referred to as a computing aware-virtual network (CA-VN) or a mobile computing network, or has another name. This is not limited in this application. The computing-aware network exists in a form of an internal virtual interface in the CA-UPF, and may have a plurality of instances. Each computing-aware network corresponds to a different network slice instance (NSI) and/or data network name (DNN). CA-UPFs included in different computing-aware networks may be completely different, or may partially overlap, or may be completely the same. This is not limited in this application.

The CA-UPF in the computing-aware network has two functional roles: an ingress CA-UPF and an egress CA-UPF. The ingress CA-UPF is a CA-UPF that may be selected by a terminal device as an access anchor in the computing-aware network, and one ingress CA-UPF may correspond to one or more egress CA-UPFs. In some embodiments, the ingress CA-UPF may receive a service request packet from the terminal device, perform routing selection based on computing routing information (for example, computing service information, load information, and network cost information) of a computing service requested by the terminal device, and then dynamically forward the service request packet to an optimal egress CA-UPF.

The egress CA-UPF is a CA-UPF associated with an edge computing node in an edge data network, and one egress CA-UPF may correspond to one or more ingress CA-UPFs. In some embodiments, the egress CA-UPF may receive service capability information of the edge computing node associated with the egress CA-UPF, and advertise, to the one or more corresponding ingress CA-UPFs, the service capability information of the edge computing node associated with the egress CA-UPF. The service capability information may include computing service information of a computing service deployed on the edge computing node and load information of the edge computing node, and is used to represent a capability of the edge computing node to externally provide a computing service.

Any CA-UPF in the computing-aware network may be selected by the terminal device as an access anchor. In addition, any CA-UPF in the computing-aware network may also establish or dissociate, based on a dynamic change of a network deployment status, an association relationship with the edge computing node in the edge data network. Therefore, for a CA-UPF in the computing-aware network, a function role of the CA-UPF is relative and dynamically changes. The CA-UPF may be used only as an ingress CA-UPF, or may be used only as an egress CA-UPF, or may be used as both an ingress CA-UPF and an egress CA-UPF. This is not limited.

A neighbor relationship between CA-UPFs is classified into two types based on different function roles of the CA-UPFs, that is, a forwarding neighbor relationship and an advertisement neighbor relationship. The forwarding neighbor relationship is specific to the ingress CA-UPF, and is used to describe a neighbor relationship between the ingress CA-UPF and all forwarding objects (that is, the egress CA-UPF) corresponding to the ingress CA-UPF, and indicates that the ingress CA-UPF may forward a service request from the terminal device to one of a plurality of egress CA-UPFs that have a forwarding neighbor relationship with the ingress CA-UPF. According to various embodiments, if one CA-UPF in the computing-aware network may be used as an ingress CA-UPF, a neighbor relationship between the CA-UPF and one or more egress CA-UPFs corresponding to the CA-UPF is referred to as a forwarding neighbor relationship. The forwarding neighbor relationship is represented by a forwarding neighbor list. Each CA-UPF that can be used as an ingress CA-UPF may have a corresponding forwarding neighbor list, and the forwarding neighbor list includes identification information of one or more egress CA-UPFs corresponding to the CA-UPF.

The advertisement neighbor relationship is specific to the egress CA-UPF, and is used to describe a neighbor relationship between the egress CA-UPF and all advertisement objects (that is, the ingress CA-UPF) corresponding to the egress CA-UPF, and indicates that the egress CA-UPF needs to advertise service capability information of an associated edge computing node to each ingress CA-UPF that has an advertisement neighbor relationship with the egress CA-UPF. Accordingly to various embodiments, if one CA-UPF in the computing-aware network may be used as an egress CA-UPF, a neighbor relationship between the CA-UPF and one or more ingress CA-UPFs corresponding to the CA-UPF is referred to as an advertisement neighbor relationship. The advertisement neighbor relationship is represented by an advertisement neighbor list. Each CA-UPF that can be used as an egress CA-UPF may have a corresponding advertisement neighbor list, and the advertisement neighbor list includes identification information of one or more ingress CA-UPFs corresponding to the CA-UPF.

Each edge computing node in the edge data network may be associated with a CA-UPF in the computing-aware network, and is used as a last hop before a service request of the terminal device is forwarded to the edge computing node, to ensure that an end-to-end data forwarding path is controlled by a mobile network. An interface between the edge computing node and the CA-UPF is an N6 interface defined in 3GPP, and an interface between CA-UPFs is an N19 interface defined in 3GPP.

The edge computing node may include an MEC platform and an edge application server (EAS). The MEC platform is responsible for scheduling of local computing, storage, and network resources, and the like. The EAS is configured to deploy or run a computing service. A computing service that is run on the EAS may be referred to as a service instance of the computing service. One edge computing node may include one or more EASs, and each EAS is allocated with a different server IP address. A physical form of the EAS may be a physical bare-metal server, a virtual machine, a container, or the like. This is not limited in this application.

The MEC platform manager is configured to manage an MEC platform and an EAS resource on the edge computing node. The MEC platform manager interact with the MEC platform on the edge computing node, to implement dynamic deployment, orchestration, and life cycle management of computing services with different granularities, such as a virtual machine, a microservice, and a function instance, running on a plurality of EASs in edge computing nodes.

A group formed by a plurality of adjacent edge computing nodes in the edge data network is referred to as a regional computing group. CA-UPFs associated with edge computing nodes in the regional computing group are neighbor relationships with each other. The plurality of adjacent edge computing nodes form the regional computing group. In this way, the edge data network can use a load balancing technology to break through a resource bottleneck of a single site, and improve a scale at which edge computing is serviceable and applicable. It should be noted that the region and the neighbor herein are divided based on a network delay between edge computing nodes. Only edge computing nodes within a specified delay can form a regional computing group. Otherwise, it is meaningless.

The CMF is configured to create and manage the foregoing computing-aware network, including managing CA-UPFs included in the computing-aware network, configuring and updating a forwarding neighbor relationship and/or an advertisement neighbor relationship between CA-UPFs in the computing-aware network, and the like. The CMF may be further configured to record information such as a service identifier and a service status of a computing service deployed in the edge data network, so that the terminal device performs a query before initiating the service request.

In some embodiments, the CMF may create the foregoing computing-aware network between the CA-UPFs by using the SMF, establish a neighbor relationship between adjacent CA-UPFs in the computing-aware network, and perform, based on computing awareness, dynamic session management for the CA-UPFs that form the neighbor relationship. In this way, a regional computing group may be formed by edge computing nodes associated with these adjacent CA-UPFs, a computing service may be dynamically deployed in the regional computing group, and service capability information of the edge computing node may be quickly advertised between the CA-UPFs, to ensure that the service request of the terminal device can be quickly responded, and can be forwarded to an optimal edge computing node based on dynamic computing routing information, and to implement resource load balancing of a system and improve user experience.

In this embodiment of this application, a forwarding neighbor list and/or an advertisement neighbor list of each CA-UPF may be added, modified, and deleted as required. Because the forwarding neighbor relationship and the advertisement neighbor relationship are relative, the CMF needs to ensure that an advertisement neighbor list of each egress CA-UPF in a forwarding neighbor list of each ingress CA-UPF includes the ingress CA-UPF.

The SIDMF is configured to provide a unified service identifier allocation function to the computing service deployed in the edge data network. The SIDMF may be deployed together with the CMF as an enhanced function of the CMF, or may be deployed independently of the CMF. This is not limited in this application.

It should be noted that the computing service in embodiments of this application is also referred to as an edge application or an edge service. The computing service may be a lightweight service, for example, a microservice or a function instance, and these lightweight computing services are deployed and run on the EAS in the edge computing node. Optionally, the computing service may be a stateless short-lifecycle microservice or function instance.

Each type of computing service has a service name, which is used to represent what type the computing service is. The service name can be described in the form of a uniform resource identifier (URI) or a uniform resource locator (URL).

Each type of computing service corresponds to a unique service identifier (service ID) in a management domain of an operator network. A same computing service can run a plurality of service instances on EASs of different edge computing nodes, but still have a same service identifier. This may be understood as a one-to-one correspondence between a service name and a service identifier of the computing service.

To reuse an existing IP protocol stack as much as possible, the service identifier of the computing service may be an IP anycast address. In this way, the service name in the service request sent by the terminal device may be translated into a service identifier, and the service identifier is used as a destination IP address of an IP packet of the terminal device. A user of the terminal device needs only to consider a computing service to which a service request is sent, and does not need to consider an EAS on which a service instance of the computing service runs and an IP address of a server of the EAS. The CA-UPF may route and forward a service request packet based on a service identifier of the computing service, and perform mutual translation between the service identifier and a server IP address when receiving or sending a packet to the EAS.

In this embodiment of this application, the CA-UPF adds a computing-aware processing unit, a regional dynamic session processing unit, and a network address translation unit based on a existing protocol data unit (PDU) session processing unit of a UPF.

For the computing-aware processing unit, the computing-aware processing unit located in the egress CA-UPF is responsible for obtaining service capability information from the edge computing node, storing a mapping relationship between a service identifier (service ID) of the computing service and a server IP address, and forwarding the service capability information of the edge computing node to the ingress CA-UPF in the advertisement neighbor list. The service capability information of the edge computing node may include computing service information and/or load information of the edge computing node. The computing service information indicates computing services supported by the edge computing node, and may include information such as a service identifier, a service attribute, a running status, or computing resource information of each computing service. The load information is used to represent a current load status of the edge computing node.

The computing-aware processing unit located in the ingress CA-UPF is responsible for receiving the service capability information from the egress CA-UPF, and generating or updating a computing routing information base between the ingress CA-UPF and the egress CA-UPF. The computing routing information base includes computing routing information of one or more computing services. The computing routing information of the computing service includes a service identifier of the computing service, identification information of one or more egress CA-UPFs that can provide the computing service, and service capability information and/or network cost information corresponding to each egress CA-UPF. The service capability information may include computing service information and/or load information of an associated edge computing node. The computing-aware processing unit may select, based on the computing routing information of the computing service in the computing routing information base, a proper forwarding tunnel for the service request received by the regional dynamic session processing unit, and generate a corresponding packet matching forwarding rule.

A main function of the regional dynamic session processing unit is to establish a forwarding tunnel between the ingress CA-UPF and the egress CA-UPF based on forwarding tunnel information delivered by the SMF, and forward a packet in real time based on the packet matching forwarding rule generated by the computing-aware processing unit. After the regional dynamic session processing in the ingress CA-UPF receives a packet from the terminal device, if there is no corresponding packet matching forwarding rule to match the packet with a corresponding forwarding tunnel, the computing-aware processing unit may select an egress CA-UPF for the computing-aware processing unit based on the computing routing information base, and generate a corresponding packet matching forwarding rule.

A main function of the network address translation unit is to complete mutual replacement between the service identifier of the computing service and the server IP address in the packet based on a mapping relationship between the service identifier of the computing service and the server IP address provided by the computing-aware processing unit. The network address translation unit may replace a destination IP address in an uplink packet sent to the EAS, from the original service identifier of the computing service, with the server IP address, and replace a source IP address in a downlink packet returned to the terminal device, from the original server IP address, with the service identifier of the computing service.

It should be understood that the network architecture and the service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

To simplify description, the SIDMF, the CMF, the SMF, and the CA-UPF are used as an example in the following embodiments. It should be understood that in the following embodiments, the SIDMF may be replaced with a service identifier management function, the CMF may be replaced with a computing management function, the SMF may be replaced with a session management function, and the CA-UPF may be replaced with a computing aware-user plane function.

For a lack of a unified service identifier generation and allocation mechanism in the computing-aware network in the conventional technology, in this application, an SIDMF is introduced in the foregoing network architecture to implement unified allocation and management of service identifiers, and a service identifier allocation method in the computing-aware network is correspondingly provided.

Based on whether the computing service is triggered by a network side or a terminal side for deployment, this application includes two deployment scenarios: deployment of a computing service triggered by a network side and deployment of a computing service triggered by a terminal side. Deployment of a computing service triggered by a network side means that an edge application provider or an operator first completes deployment of the computing service on an edge computing node by using an MEC platform manager, and before the terminal device installs and runs an edge application, the computing service required by the terminal device has been deployed on an edge computing node in a regional computing group, and can provide a service at any time.

Deployment of a computing service triggered by a terminal side means that before the terminal device installs and runs an edge application, a computing service required by the terminal device is not deployed in advance on an edge computing node in a regional computing group. When the terminal device installs or starts the edge application, a client of the edge application indicates the terminal device to request a CMF in the computing-aware network to deploy the computing service, and provides information for obtaining the computing service at the same time. The obtaining information may include a download address of the computing service. Further, the CMF requests the SIDMF to allocate a corresponding service identifier to the computing service, and indicates, through interaction with the MEC platform manager, the MEC platform manager to select a proper edge computing node. In this way, the edge computing node downloads code of the computing service based on the information for obtaining the computing service, and installs and runs the code. Then, after determining that the computing service is installed and starts to run, the CMF returns, to the terminal device, the service identifier allocated to the computing service and a service status of the computing service.

In this embodiment of this application, deployment of a computing service triggered by a network side may also be referred to as deployment of a computing service triggered by a server side. Deployment of a computing service triggered by the terminal side may also be referred to as deployment of a computing service triggered by the client side, and may be understood as that the terminal device or the client installed in the terminal device actively uploads the computing service to the network.

The following separately describes in detail the service identifier allocation methods in the two deployment scenarios with reference to Embodiment 1 and Embodiment 2.

Embodiment 1

Embodiment 1 of this application provides a service identifier allocation method applied to a scenario in which a network side triggers deployment of a computing service. The service identifier allocation method includes two processes: deploying a computing service and allocating a service identifier on the network side, and obtaining a service identifier on a terminal side.

Figure 2:
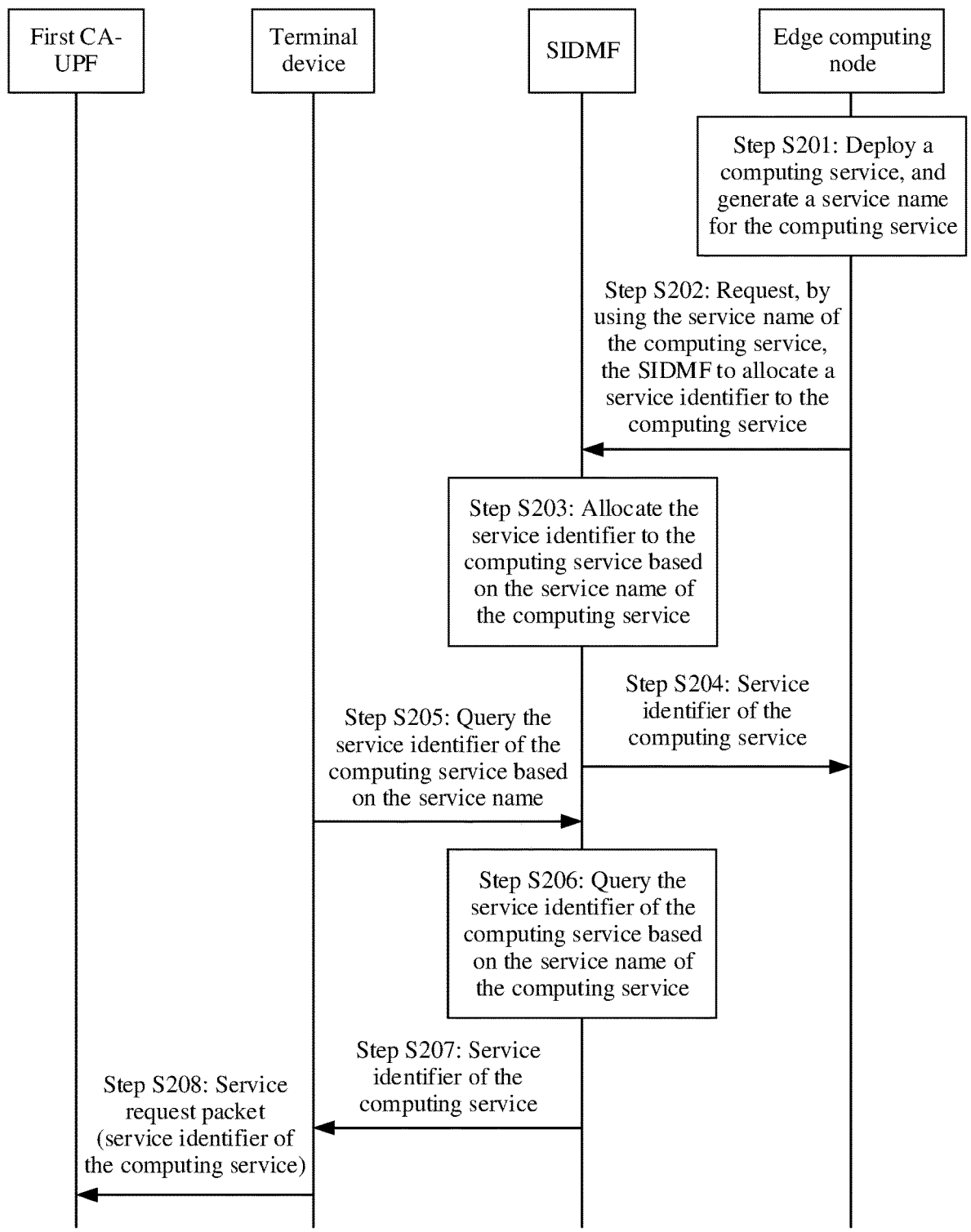
FIG. 2 is a schematic flowchart of a service identifier allocation method in a computing-aware network according to Embodiment 1 of this application.

FIG. 2 is a service identifier allocation method in a computing-aware network according to an embodiment of this application. The method includes the following steps.

Step S201: An edge computing node deploys a computing service, and generates a service name for the computing service.

Step S202: The edge computing node requests, by using the service name of the computing service, an SIDMF to allocate a service identifier to the computing service.

Correspondingly, the SIDMF receives the service name of the computing service from the edge computing node.

In a possible implementation, the edge computing node may send a first allocation request to the SIDMF. The first allocation request is used to request to allocate the service identifier to the computing service, and the first allocation request includes the service name of the computing service. Correspondingly, the SIDMF may receive the first allocation request from the edge computing node.

Optionally, if the edge computing node may directly interact with the SIDMF, the first allocation request may be carried in one message for sending. However, in some cases, the edge computing node may not directly interact with a service identifier allocation function, but may perform forwarding by using another network element or functional entity, for example, an NEF. In this case, as shown in step S301 and step S302 in FIG. 3, the edge computing node may send the first allocation request to the NEF, and then the NEF forwards the first allocation request to the SIDMF. After receiving the first allocation request from the edge computing node, the NEF may convert the first allocation request, and then send the converted first allocation request to the SIDMF. Optionally, the first allocation request sent by the edge computing node to the NEF may be carried in one message for sending, and the first allocation request sent by the NEF to the SIDMF may be carried in another message for sending.

For example, an MEC platform in the edge computing node may request, to install or start a service instance of the computing service on a selected EAS, and send the first allocation request to the SIDMF by using the NEF after learning that the service instance of the computing service is successfully installed or started.

Step S203: The SIDMF allocates the service identifier to the computing service based on the service name of the computing service.

In this embodiment of this application, that the SIDMF allocates the service identifier to the computing service based on the service name of the computing service may be: translating the service name of the computing service into a unique corresponding service identifier, for example, an IPv6 or IPv4 anycast address. A specific translation method may obtain the service identifier through hash, or through calculation based on a specific algorithm, or through matching and searching by using a database. This is not specifically limited in this application.

After generating the service identifier for the computing service, the SIDMF may further record a mapping relationship between the service name of the computing service and the service identifier, so that a terminal device queries the corresponding service identifier based on the service name of the computing service before subsequently initiating a service request. For example, the SIDMF may cache a service identifier list, and store, in the service identifier list, a service name of each computing service to which a service identifier is allocated and the corresponding service identifier. The service identifier list uses a service name of a computing service as an index. In this way, the SIDMF may query, based on a service name of a computing service and the service identifier list, a service identifier allocated to the computing service.

Step S204: The SIDMF sends the service identifier of the computing service to the edge computing node.

Correspondingly, the edge computing node receives the service identifier of the computing service from the SIDMF.

In a possible implementation, the SIDMF may send a first allocation response to the edge computing node. The first allocation response includes the service identifier of the computing service, and there is a mapping relationship between the service identifier and a server IP address of an EAS that is in the edge computing node and on which the computing service is deployed. Correspondingly, the edge computing node receives the first allocation response from the SIDMF.

Optionally, if the edge computing node may directly interact with the SIDMF, the first allocation response may be carried in one message for sending. However, in some cases, the edge computing node may not directly interact with the service identifier allocation function, but may perform forwarding by using another network element or function, for example, the NEF. In this case, as shown in step S304 and step S305 in FIG. 3, the SIDMF may send the first allocation response to the NEF, and then the NEF forwards the first allocation response to the edge computing node. After receiving the first allocation response from the edge computing node, the NEF may convert the first allocation response, and then send the converted first allocation response to the SIDMF. Optionally, the first allocation response sent by the SIDMF to the NEF may be carried in one message for sending, and the first allocation response sent by the NEF to the edge computing node may be carried in another message for sending.

Figure 3:
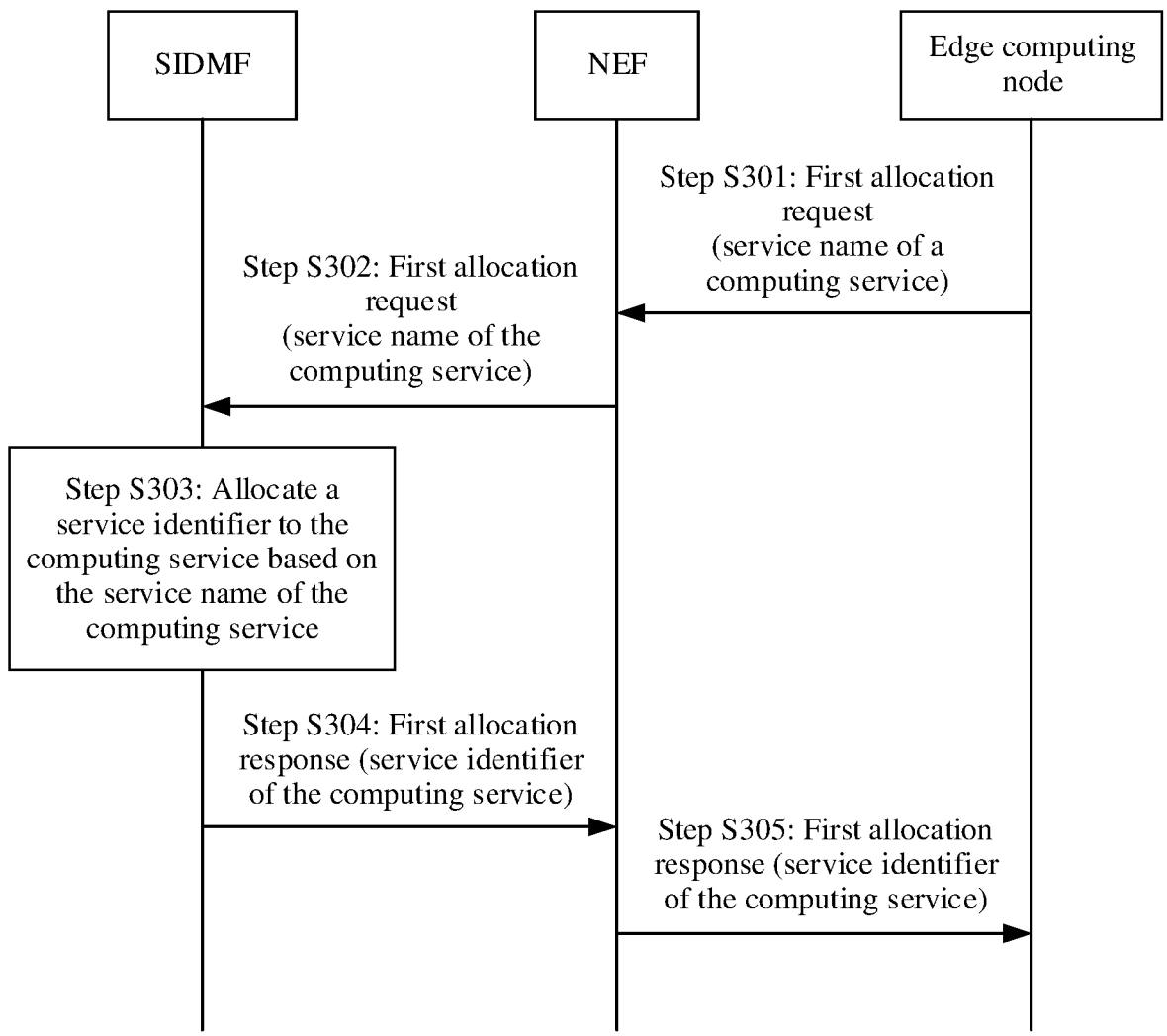
FIG. 3 is a schematic diagram of an implementation in which an edge computing node requests an SIDMF to allocate a service identifier to a computing service deployed by the edge computing node according to Embodiment 1 of this application.

For a specific implementation of step S303 in FIG. 3, refer to related descriptions of step S203 in the foregoing text. Details are not described again.

In this embodiment of this application, after obtaining the service identifier allocated by the SIDMF to the computing service, the edge computing node may send, to an associated second CA-UPF, the service identifier of the computing service and the server IP address of the EAS that is in the edge computing node and on which the computing service is deployed. The second CA-UPF is an egress CA-UPF in the computing-aware network. In this way, the second CA-UPF may record the mapping relationship between the service identifier of the computing service and the corresponding server IP address, so that the second CA-UPF may perform service identifier-to-server IP address translation on a destination IP address of a packet sent to the edge computing node, and perform server IP address-to-service identifier translation on a source IP address of the packet of the computing service received from the edge computing node.

The edge computing node may further send computing service information of the computing service to the associated second CA-UPF. The computing service information may include information such as the service identifier, a service attribute, a running status, or computing resource information of the computing service, so that the second CA-UPF creates or updates a computing routing information base based on the computing service information of the computing service received from the edge computing node, for example, creates or updates computing routing information of the computing service in the computing routing information base.

The service identifier is an identity of a computing service, and is in a one-to-one correspondence with a service name of the computing service. The service identifier may be used as a destination IP address of a service request packet sent by the terminal device, or may be used as a source IP address of a service response packet sent by the edge computing node. The service attribute indicates whether a computing service is stateful or stateless. If the computing service is a stateless service, service instances at different locations may be selected for each request of the computing service. If the computing service is a stateful service, a plurality of requests are associated and it needs to be ensured that each request of the computing service accesses service instances at a same location. The running status is an indication of a current status of a service instance (for example, a microservice or a function instance) of a computing service on a server of the edge computing node, including statuses such as installed, uninstalled, running, suspended, available, and unavailable. The computing resource information is a type and an attribute of a computing resource currently used by a service instance of a computing service on a server of the edge computing node that runs the service instance, including one or more specific indicator information such as a processor type, an overall memory usage, a quantity of used service sessions, a quantity of requests per second, and a computing delay, or including comprehensive indicator information obtained through calculation based on the specific indicator information. The processor type herein may be a central processing unit (CPU), a graphics processing unit (GPU), a neural network processing unit (NPU), or the like.

Step S205: The terminal device queries a service identifier management function for the service identifier of the computing service by using the service name of the computing service.

Correspondingly, the SIDMF receives the service name of the computing service from the terminal device.

In a possible implementation, the terminal device may send a first query request to the SIDMF. The first query request is used to query the service identifier of the computing service, and the first query request includes the service name of the computing service. Correspondingly, the SIDMF may receive the first query request from the terminal device.

Optionally, the terminal device does not directly interact with the SIDMF either. A process in which the terminal device sends the first query request to the SIDMF may be shown in step S401 to step S405 in FIG. 4. The terminal device first sends the first query request to an access network device, and the first query request arrives at a first CA-UPF after being forwarded by the access network device. The first CA-UPF is an ingress CA-UPF accessed by the terminal device in the computing-aware network, and may be understood as an access anchor of the terminal device in the computing-aware network. Then, the first CA-UPF sends the first query request to an SMF based on a packet matching forwarding rule. Further, after receiving the first query request, the SMF sends the first query request to a CMF. Finally, the CMF sends the first query request to the SIDMF. It should be noted that in the foregoing process, after receiving the first query request from a previous hop, each network element or functional entity may convert the first query request, and then send the converted first query request to a next hop. In addition, first query requests interacted between different network elements or functional entities in the foregoing process may be carried in different messages for sending.

Step S206: The SIDMF queries the service identifier of the computing service based on the service name.

In this embodiment of this application, the SIDMF may query the recorded mapping relationship between the service name and the service identifier of the computing service based on the service name, to determine the service identifier of the computing service. For example, the SIDMF may query, based on the service name of the computing service, a cached service identifier list for the service identifier corresponding to the service name, to obtain the service identifier of the computing service. Step S206 corresponds to step S406 in the example shown in FIG. 4.

Step S207: The SIDMF sends the service identifier of the computing service to the terminal device.

Correspondingly, the terminal device receives the service identifier of the computing service from the SIDMF.

In this embodiment of this application, the SIDMF may further determine a service status of the computing service, and send the service status to the terminal device. The service status indicates whether the computing service is available or unavailable. In some embodiments, available or unavailable service status means whether the computing service is available or unavailable in a regional computing group corresponding to the first CA-UPF, and the regional computing group is a group formed by edge computing nodes associated with the computing-aware network that uses the first CA-UPF as an ingress.

The service status may be obtained by the SIDMF from the CMF. Because service statuses of a same computing service in different regional computing groups may be different, each CA-UPF that can be used as an ingress CA-UPF in the computing-aware network may report, to the CMF by using the SMF, a service status of the computing service in a regional computing group that uses the CA-UPF as an ingress CA-UPF, the service status may be determined by the CMF based on running statuses of the computing service on edge computing nodes associated with the one or more egress CA-UPFs corresponding to the CA-UPF.

For example, the CMF may cache a service status list. The service status list stores a service status of each computing service to which a service identifier has been allocated. The service status list is indexed by using the service identifier of the computing service and identification information of the ingress CA-UPF. In this way, the CMF may determine, by querying the service status list, a service status corresponding to the computing service when the first CA-UPF is used as the ingress CA-UPF.

In a possible implementation, the SIDMF may send a first query response to the terminal device. The first query response includes the service identifier of the computing service. Correspondingly, the terminal device receives the first query response from the SIDMF.

Figure 4:
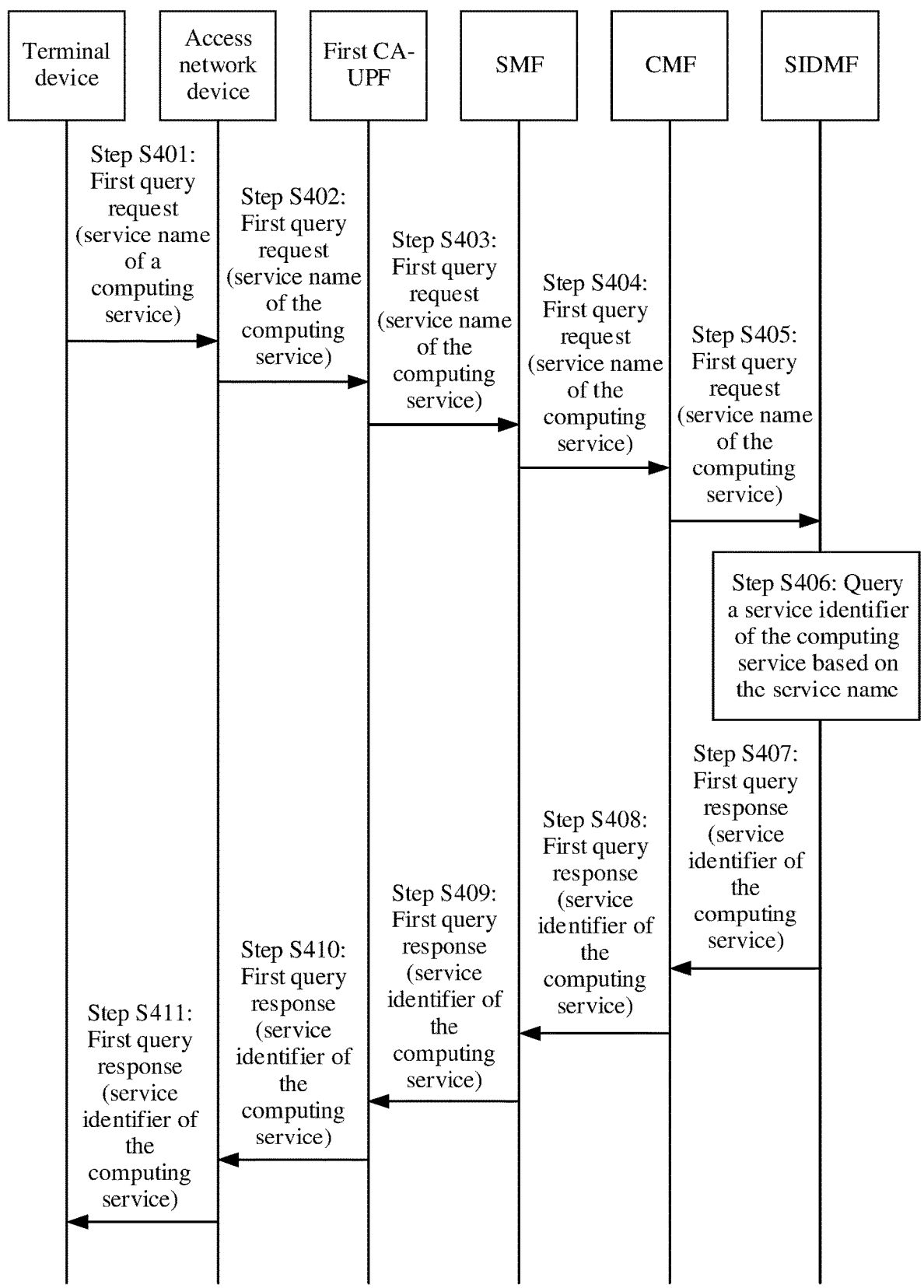
FIG. 4 is a schematic diagram of an implementation in which a terminal device queries an SIDMF for a service identifier of a computing service according to Embodiment 1 of this application.

Optionally, similar to that the terminal device sends the first query request to the SIDMF, because the terminal device does not directly interact with the SIDMF, a process in which the SIDMF sends the first query response to the terminal device may be shown in step S407 to step S411 in FIG. 4: The SIDMF sends the first query response to the CMF, and the CMF sends the first query response to the SMF. After receiving the first query response, the SMF sends the first query response to the first CA-UPF, that is, the ingress CA-UPF accessed by the terminal device. Then, the first CA-UPF sends the first query response to the corresponding access network device based on the packet matching forwarding rule, and the first query response is finally sent to the terminal device after being forwarded by the access network device. It should be noted that in the foregoing process, after receiving the first query response from a previous hop, each network element or functional entity may convert the first query response, and then send the converted first query response to a next hop. In addition, first query responses interacted between different network elements or functional entities in the foregoing process may be carried in different messages for sending.

Optionally, the first query request may be further used to request the service status of the computing service. Correspondingly, the first query response may further include the service status of the computing service. Further, after determining the service identifier of the computing service based on the service name, the SIDMF may further obtain the service status of the computing service from the CMF, and then include the service status of the computing service in the first query response and send the first query response to the terminal device.

Figure 5:
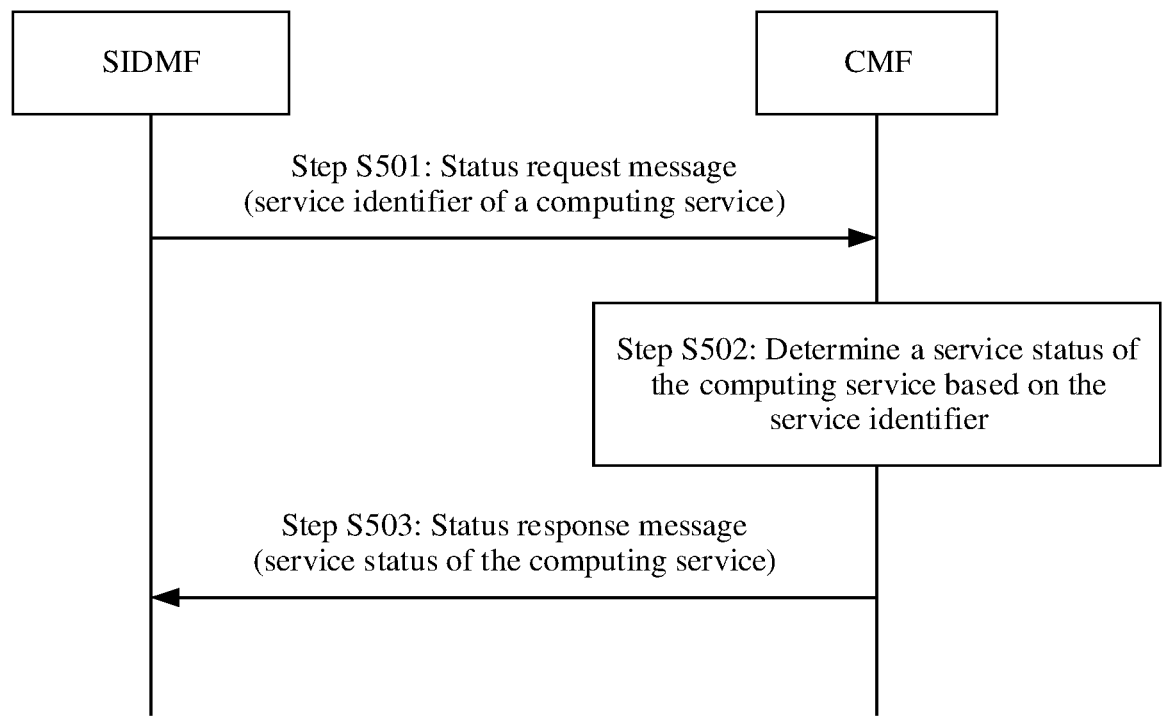
FIG. 5 is a schematic diagram of an implementation in which an SIDMF obtains a service status of a computing service from a CMF according to Embodiment 1 of this application.

For example, as shown in FIG. 5, in step S501, the SIDMF may send a status request message to the CMF. The status request message is used to request the service status of the computing service, and the status request message includes the service identifier of the computing service. Optionally, the status request message may further include identification information of the first CA-UPF accessed by the terminal device, or the CMF may receive, from the SMF, identification information of the first CA-UPF accessed by the terminal device. The identification information of the first CA-UPF is used by the CMF to query the service status of the computing service corresponding to the first CA-UPF. In step S502, after receiving the status request message from the SIDMF, the CMF may determine the service status of the computing service based on the service identifier of the computing service. Optionally, the CMF may determine, based on the service identifier of the computing service and a correspondence between the first CA-UPF and the service identifier, the service status of the computing service corresponding to the first CA-UPF. Further, in step S503, the CMF may send a status response message to the SIDMF. The status response message includes the service status of the computing service.

The SMF may determine, in a process of establishing a protocol data unit (PDU) session by the terminal device, that an ingress CA-UPF of the terminal device is the first CA-UPF, and then send the identification information of the first CA-UPF corresponding to the terminal device to the CMF. Alternatively, after receiving the first query request of the terminal device, the SMF may determine, based on N4 interface information for receiving the first query request, that the ingress CA-UPF of the terminal device is the first CA-UPF, and then send the identification information of the first CA-UPF corresponding to the terminal device to the CMF. In a possible design, it is considered that the first query request is sent to the CMF by using the SMF, in a process of forwarding the first query request, after the SMF determines, based on the N4 interface information for receiving the first query request, that the ingress CA-UPF of the terminal device is the first CA-UPF, the SMF may add the identification information of the first CA-UPF to the message that carries the first query request, and then forward the message to the CMF.

After receiving the first query response, the terminal device may record a mapping relationship between the service name of the computing service and the corresponding service identifier and service status, to subsequently perform query as required. For example, the terminal device may cache a computing service list. After obtaining a service identifier and a service status of a computing service by querying the SIDMF and the CMF, the terminal device may store a service name of the computing service and the corresponding service identifier and the service status in the computing service list.

Step S208: The terminal device sends a service request packet to the first CA-UPF. The service request packet is used to request the computing service, the service request packet includes the service identifier of the computing service, and the service identifier is a destination address of the service request packet.

In this embodiment of this application, the terminal device may determine, based on the service status of the computing service, whether to request the computing service. When the service status indicates that the computing service is available, the terminal device determines to request the computing service, and further sends the service request packet to the first CA-UPF based on the service identifier of the computing service. Optionally, a destination IP address of the service request packet is the service identifier of the computing service.

Optionally, the service request packet is an IP packet, for example, may be referred to as an application layer service request IP packet. A source IP address of the service request packet is an IP address of the terminal device, and the destination IP address is the service identifier of the computing service.

Further, after receiving a service response packet from a mobile computing network, the terminal device directly forwards the service response packet to an application client. Similarly, the service response packet is alternatively an IP packet, and may also be referred to as an application layer service response IP packet. A source address of the service response packet is the service identifier of the computing service, and a destination address is an IP address of the terminal device.

Optionally, an action of requesting the computing service by the terminal device may be initiated by a client in the terminal device. A manner in which the client initiates a computing service varies based on different interaction modes between the terminal device and the internal client. In embodiments of this application, there are two interaction modes between the terminal device and the client. The following separately describes the two interaction modes.

Interaction Mode 1

The client in the terminal device discovers, by using the terminal device, a computing service deployed in a network, and obtains information such as a service identifier and a service status of the computing service. The client generates a service request packet based on the obtained service identifier, and then sends the service request packet to the computing-aware network by using the terminal device. Correspondingly, after receiving a service response packet from the computing-aware network, the terminal device may completely return the service response packet to the client.

It may be understood that in the interaction mode 1, before installing, starting, or running an edge application, the client in the terminal device needs to learn in advance information such as a service identifier and a service status (available or unavailable) of a computing service that needs to be invoked.

Figure 6:
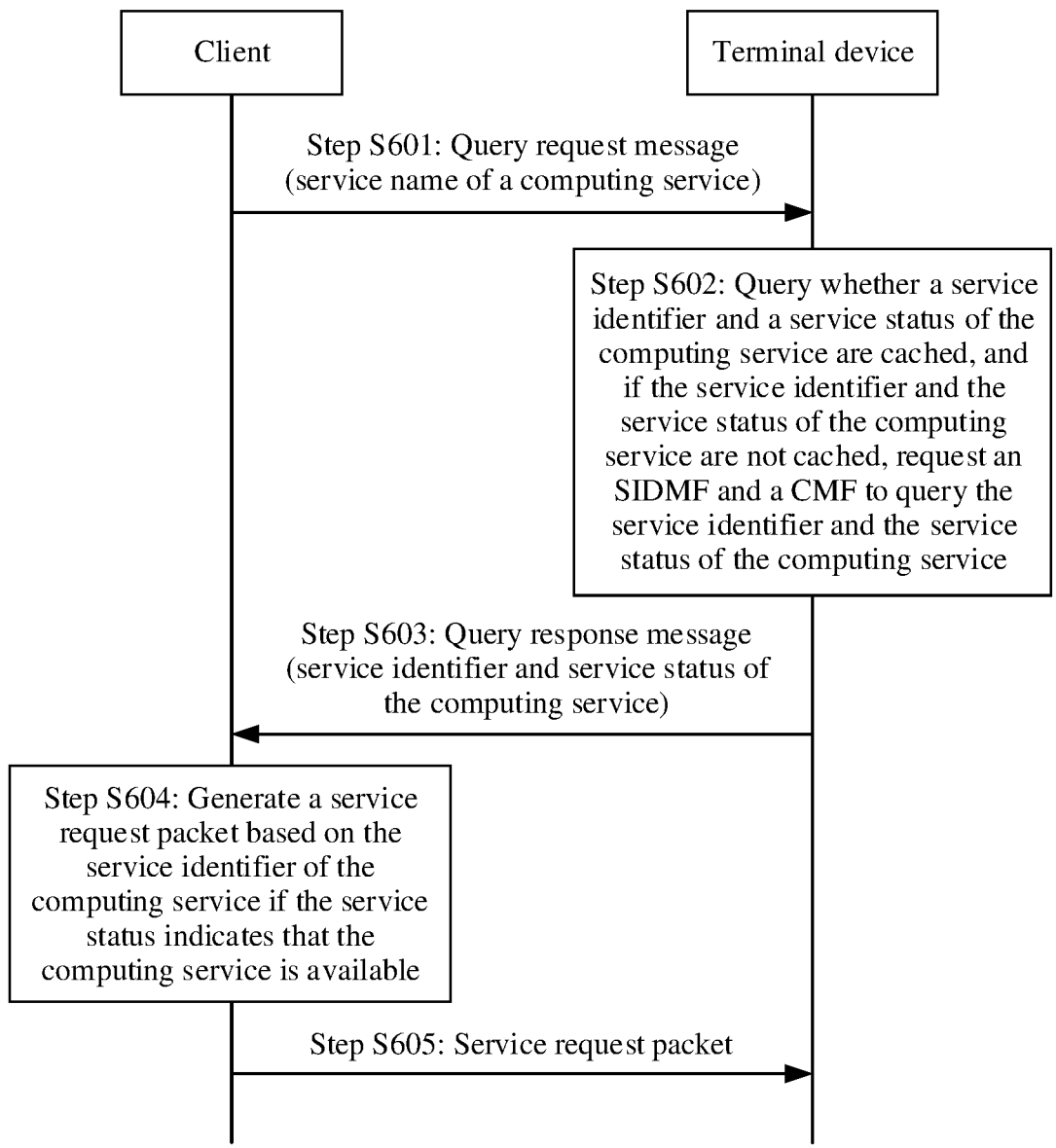
FIG. 6 is a schematic diagram of interaction mode 1 between a terminal device and a client according to Embodiment 1 of this application.

Therefore, as shown in FIG. 6, in step S601, the client may send a query request message to the terminal device. The query request message is used to query the service identifier of the computing service, and the query request message includes a service name of the computing service. Optionally, the query request message may be further used to query the service status of the computing service. The query request message may also be referred to as a second query request or a second query request message. In step S602, after receiving the query request message from the client, the terminal device may first query a cached computing service list to determine whether the service identifier and the service status of the computing service are cached. If the service identifier and the service status of the computing service have been cached, the terminal device may send the cached service identifier and the cached service status of the computing service to the client by using the query response message in step S603. If the service identifier and the service status of the computing service are not cached, the terminal device may query the SIDMF and the CMF for the service identifier and the service status (for example, related content of the first query request and the first query response described above) of the computing service by using a related procedure described above, and then send, to the client by using the query response message in step S603, the service identifier and the service status that are of the computing service and that are obtained through query.

Further, in step S604, if the service status indicates that the computing service is available, the client may generate a service request packet based on the service identifier of the computing service. The service request packet is an IP packet. When generating the service request packet, the client may use the service identifier of the computing service as a destination IP address of the service request packet, and use an IP address of the terminal device as a source IP address of the service request packet. In step S605, the client sends the generated service request packet to the terminal device. Further, after receiving the service request packet from the client, the terminal device may send the service request packet to the first CA-UPF. Subsequently, after receiving a service response packet from the first CA-UPF, the terminal device may send the service response packet to the client. A source IP address of the service response packet is the service identifier of the computing service, and a destination IP address is an IP address of the terminal device.

Interaction Mode 2

The client in the terminal device registers a required computing service with the terminal device, and the terminal device discovers the computing service deployed in an edge data network, and obtains information such as a service identifier and a service status. The client needs only to send an application layer request message to the terminal device, and the terminal device generates a service request packet based on the service identifier of the computing service and the application layer request message received from the client, and sends the service request packet to the computing-aware network. Correspondingly, after receiving a service response packet from the computing-aware network, the terminal device may extract an application layer response message from the service response packet and return the response message to the terminal device.

It may be understood that, in the interaction mode 2, before installing, starting, or running an edge application, the client in the terminal device needs to register, with the terminal device in advance, a computing service that needs to be invoked.

Figure 7:
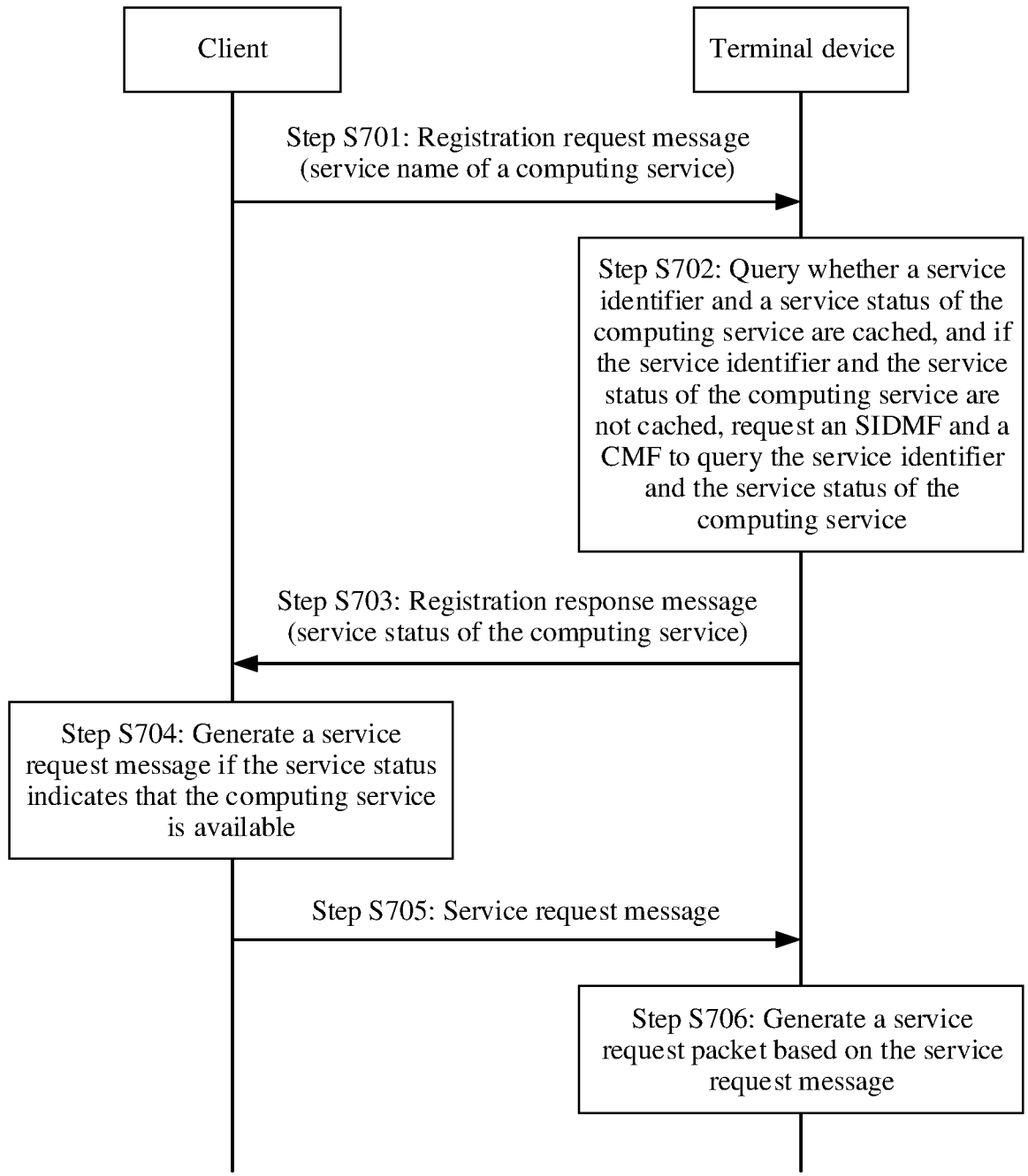
FIG. 7 is a schematic diagram of interaction mode 2 between a terminal device and a client according to Embodiment 1 of this application.

Therefore, as shown in FIG. 7, in step S701, the client may send a registration request message to the terminal device. The registration request message is used to request to register the computing service with the terminal device, and the registration request message includes a service name of the computing service. In step S702, after receiving the registration request message from the client, the terminal device may query a cached computing service list to determine whether the service identifier and the service status of the computing service are cached. If the service identifier and the service status of the computing service have been cached, it indicates that the terminal device has completed registration of the computing service, and the terminal device may send the service status of the computing service to the client by using a registration response message in step S703. If the service identifier and the service status of the computing service are not cached, it indicates that the computing service is not registered or fails to be registered. The terminal device may request the service identifier and the service status of the computing service from the SIDMF and the CMF by using the related procedure described above, and then send the service status of the computing service obtained through query to the client by using the registration response message in step S703.

Further, in step S704, if the service status indicates that the computing service is available, the client may generate a service request message. The service request message is an application layer request message and is used to request the computing service. In step S705, the client may send the service request message to the terminal device. After the terminal device receives the service request message from the client, in step S706, the terminal device may generate the service request packet based on the service request message. The service request packet is an IP packet. For example, the terminal device may construct the IP packet based on the service request message, use the service identifier of the computing service as a destination IP address of the packet, and use an IP address of the terminal device as a source IP address of the packet, to obtain the service request packet. The terminal device may send the generated service request packet to the first CA-UPF. Subsequently, after the terminal device receives a service response packet from the first CA-UPF, the terminal device may extract a service response message from the service response packet and send the service response message to the client. The service response packet is an IP packet, a source IP address of the packet is the service identifier of the computing service, a destination IP address is the IP address of the terminal device, and the service response message is an application layer response message encapsulated in the service response packet, the service response message does not include an IP header.

Figure 8:
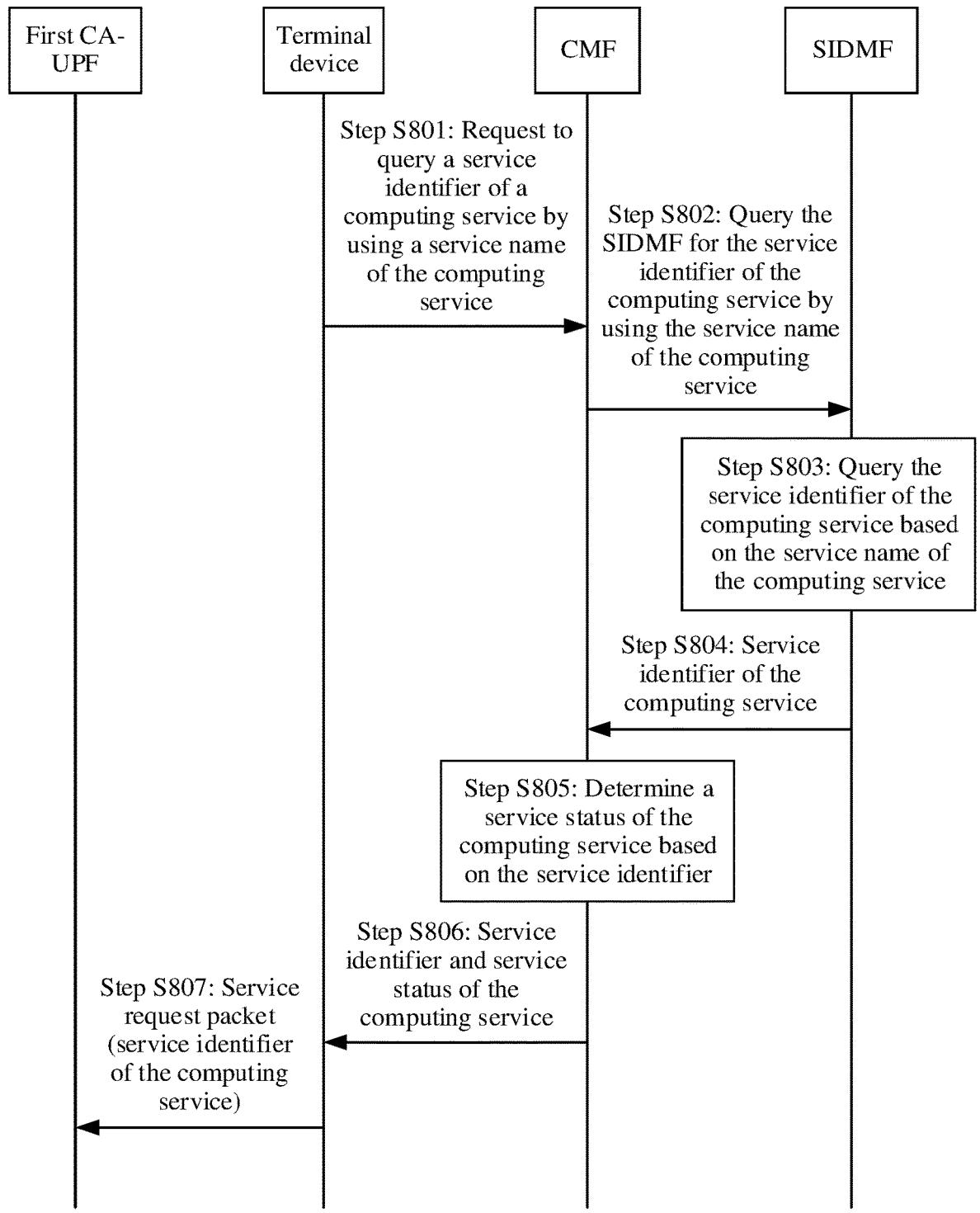
FIG. 8 is a schematic flowchart of another service identifier allocation method in a computing-aware network according to Embodiment 1 of this application.

FIG. 8 is another service identifier allocation method in the computing-aware network according to an embodiment of this application. The method includes the following steps.

Step S801: The terminal device requests the CMF to query a service identifier of a computing service by using a service name of the computing service.

Correspondingly, the CMF receives the service name of the computing service from the terminal device.

In a possible implementation, the terminal device may send a first query request to the CMF. The first query request includes the service name of the computing service. The first query request may be forwarded to the CMF by the access network device, the first CA-UPF, the SMF in sequence. For the first query request, refer to the foregoing description. Details are not described again. Optionally, the first query request may be further used to request to query a service status of the computing service. Similarly, the first query request may be forwarded to the CMF by the access network device, the first CA-UPF, and the SMF in sequence.

Step S802: The CMF queries the SIDMF for the service identifier of the computing service by using the service name of the computing service.

Correspondingly, the SIDMF may receive the service name of the computing service from the CMF.

In a possible implementation, after receiving the first query request from the terminal device, the CMF may send a third query request to the SIDMF. The third query request is used to request to query the service identifier of the computing service, and the third query request includes the service name of the computing service. Correspondingly, the SIDMF may receive the third query request from the CMF.

Step S803: The SIDMF queries the service identifier of the computing service based on the service name.

For a specific implementation of step S803, refer to related descriptions of step S206 in the foregoing text. Details are not described herein again.

Step S804: The SIDMF sends the service identifier of the computing service to the CMF.

Correspondingly, the CMF receives the service identifier of the computing service from the SIDMF.

In a possible implementation, the SIDMF may send a third query response to the CMF. The third query response includes the service identifier of the computing service. Correspondingly, the CMF may receive the third query response from the SIDMF.

Step S805: The CMF determines the service status of the computing service based on the service identifier. The service status indicates that the computing service is available or unavailable.

In this embodiment of this application, the CMF may receive, from the SMF, identification information of the first CA-UPF accessed by the terminal device, and then determine, based on the service identifier and a correspondence between the first CA-UPF and the service identifier, the service status of the computing service corresponding to the first CA-UPF.

In a possible implementation, the identification information of the first CA-UPF may be determined by the SMF based on N4 interface information for receiving a first query request after receiving the first query request, and then sent to the CMF. Optionally, the SMF may send the identification information of the first CA-UPF to the CMF in a process of forwarding the first query request. For example, the identification information of the first CA-UPF is carried in a message including the first query request, and is sent to the CMF together with the first query request.

Step S806: The CMF sends the service identifier and the service status of the computing service to the terminal device.

Correspondingly, the terminal device receives the service identifier and the service status of the computing service from the CMF.

In a possible implementation, the CMF may send a first query response to the terminal device. The first query response includes the service identifier and the service status of the computing service. Similarly, the first query response may be forwarded to the terminal device by the SMF, the first CA-UPF, and the access network device in sequence.

Step S807: The terminal device sends a service request packet to the first CA-UPF. The service request packet is used to request the computing service, the service request packet includes the service identifier of the computing service, and the service identifier is a destination address of the service request packet.

It should be noted that, the method shown in FIG. 8 may be understood as a variant of the method shown in FIG. 2, that is, the service status may be determined and sent to the terminal device by the CMF in a process in which the terminal device requests the SIDMF to query the service identifier of the computing service and obtains a query result. Therefore, the SIDMF does not need to interact with the CMF to obtain the service status of the computing service from the CMF.

The following describes the service identifier allocation method in Embodiment 1 in detail by using two specific examples with reference to FIG. 9A, FIG. 9B, FIG. 10a-1, FIG. 10a-2, FIG. 10a-3, FIG. 10b-1, FIG. 10b-2, and FIG. 10b-3. One example may include the steps shown in FIG. 9A, FIG. 9B, FIG. 10a-1, FIG. 10a-2, and FIG. 10a-3, and the other example may include the steps shown in FIG. 9A, FIG. 9B, FIG. 10b-1, FIG. 10b-2, and FIG. 10b-3.

Figure 9A:
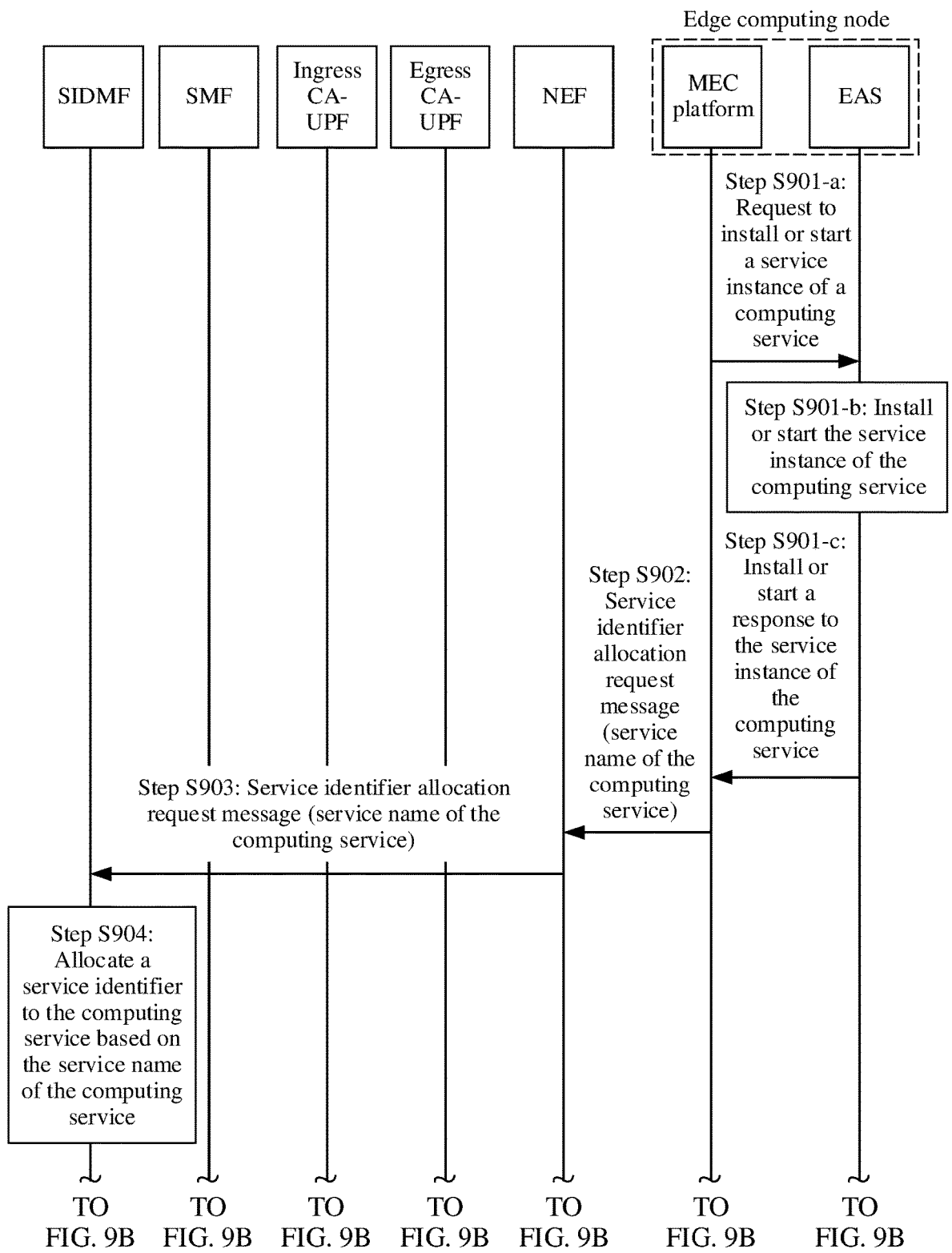
FIG. 9A and FIG. 9B are a specific example of deploying a computing service by using a network and allocating a service identifier to the computing service according to Embodiment 1 of this application.
Figure 9B:
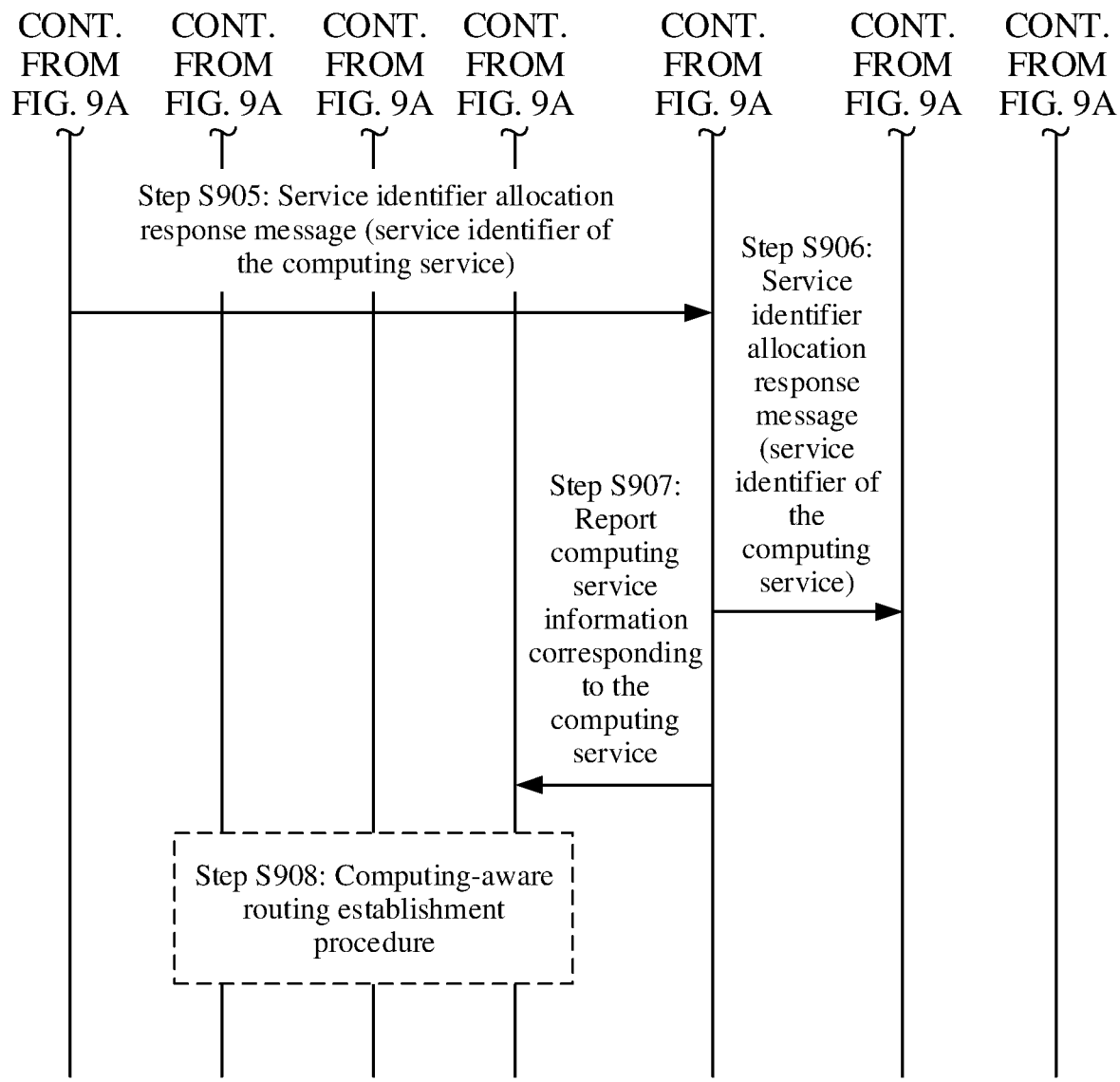

FIG. 9A and FIG. 9B are a process in which a network deploys a computing service and allocates a service identifier to the computing service. The process shown in FIG. 9A and FIG. 9B includes the following steps.

Step S901-a: An MEC platform on an edge computing node requests, on a selected EAS, to install or start a service instance of a computing service.

Steps S901-b to S901-c: The EAS on the edge computing node may respond to a request of the MEC platform, install or start the service instance of the computing service, and send, to the MEC platform, a response for installing or starting the service instance of the computing service. After receiving the response, the MEC platform on the edge computing node determines that the service instance is successfully installed or started on the EAS.

Step S902: The MEC platform on the edge computing node sends a service identifier allocation request message to an NEF, where the service identifier allocation request message includes a service name of the computing service.

Step S903: The NEF forwards the service identifier allocation request message to the SIDMF.

Step S904: After receiving the service identifier allocation request message, the SIDMF allocates a service identifier to the computing service based on the service name In some embodiments, the SIDMF may translate the service name of the computing service into a unique corresponding service identifier (service ID). The service identifier may be an IPv6 or IPv4 anycast address. A specific translation method may obtain the service identifier through hash, through calculation based on a specific algorithm, or through matching and searching by using a database. This is not limited. Optionally, the SIDMF may further store a mapping relationship between the service name and the service identifier of the computing service, so that the UE subsequently obtains the service identifier corresponding to the computing service.

Step S905: The SIDMF returns a service identifier allocation response message to the NEF, where the service identifier allocation response message includes the service identifier (service ID) allocated to the computing service.

Step S906: The NEF returns the service identifier allocation response message to the MEC platform on the edge computing node.

Step S907: After obtaining the service identifier allocated to the computing service, the MEC platform reports computing service information corresponding to the computing service to an associated egress CA-UPF, to create computing routing.

Step S908: The CA-UPF in the computing-aware network performs a computing routing creation procedure, which mainly includes: The egress CA-UPF sends the service identifier of the computing service and corresponding computing service information to an ingress CA-UPF, and generates a computing routing information base on the ingress CA-UPF.

It should be noted that in the foregoing process, after receiving the service identifier allocation request message from the edge computing node, the NEF may convert the service identifier allocation request message, and then send the converted service identifier allocation request message to the SIDMF. Similarly, after receiving the service identifier allocation response message from the SIDMF, the NEF may convert the service identifier allocation response message, and then send the converted service identifier allocation response message to the edge computing node.

FIG. 10a-1, FIG. 10a-2 and FIG. 10a-3 are a process in which the UE queries a service identifier allocated to a computing service deployed in a network. The process corresponds to the foregoing interaction mode 1 of interaction between the terminal device and the client, and the client directly constructs a service request packet based on the service identifier provided by the terminal device. The process shown in FIG. 10a-1, FIG. 10a-2 and FIG. 10a-3 includes the following steps.

Step S1001: The UE initiates and completes a registration procedure.

Step S1002: A PCF delivers a UE route selection policy (URSP) to the UE by using a UE configuration update procedure, where the URSP includes related information such as a data network name (DNN) corresponding to the computing-aware network and network slice information.

Step S1003-a: In a process of installing, starting, and running an edge application, the AC in the UE needs to learn in advance a service identifier and a service status (available or unavailable) of a computing service that needs to be invoked. Therefore, the AC sends a service identifier query request message to the UE. The service identifier query request message includes a service name and application descriptor information of the computing service required by the AC, for example, an edge application type.

Step S1004-a: The UE queries a locally cached service identifier list based on the service name. If there is a record, go to step S1018-a, a service identifier query response message is sent to the AC, and a corresponding service identifier and a current service status (available or unavailable) is returned; otherwise, continue to perform the following step S1005-a.

Step S1005-a: The UE further queries the URSP, and queries the corresponding DNN and traffic descriptor information by using the service name and the application descriptor information. If there is no matching information, go to step S1018-a, the service identifier query response message is sent to the AC, and an unavailable status is returned.

Step S1006: The UE further queries whether a PDU session connection has been established for the DNN. If the PDU session connection has been established, the UE continues to perform the following step S1007, or if the PDU session connection has not been established, the UE initiates a PDU session establishment procedure for the DNN. During the PDU session establishment procedure, when selecting a corresponding ingress CA-UPF and establishing a session connection, the SMF may deliver a packet matching forwarding rule to the ingress CA-UPF at the same time, and indicate the ingress CA-UPF to forward a subsequent service identifier query request message to the SMF.

Step S1007: The UE sends the service identifier query request message by using the established PDU session, where the service identifier query request message includes the service name of the computing service requested by the UE.

Step S1008: The service identifier query request message arrives at the ingress CA-UPF, and the ingress CA-UPF identifies the service identifier query request message based on the packet matching forwarding rule, and forwards the service identifier query request message to the SMF.

Step S1009: If the SMF determines, based on N4 interface information, that the service identifier query request message is from the ingress CA-UPF, the SMF adds an ingress CA-UPF ID to the service identifier query request message and forwards the service identifier query request message to the CMF, so that the CMF determines a service status of the computing service in a regional computing group that uses the ingress CA-UPF as an access anchor.

Step S1010: The CMF sends the service identifier query request message to the SIDMF, where the service identifier query request message includes the service name of the computing service requested by the UE.

Step S1011: The SIDMF queries, based on the service name, an service identifier list to obtain the service identifier (service ID) allocated to the computing service, and returns the service identifier to the CMF by using the service identifier query response message in step S1012.

Step S1013: The CMF queries a corresponding service status list based on the received service identifier (service ID) and the ingress CA-UPF ID, to obtain a service status of the computing service in the regional computing group that uses the ingress CA-UPF as an ingress anchor, and then carries the service identifier and the service status in the service identifier query response message and returns the service identifier query response message to the SMF in step S1014.

Step S1015: The SMF returns the service identifier query response message to the ingress CA-UPF.

Step S1016: The ingress CA-UPF returns the service identifier query response message to the UE.

Step S1017: After receiving the service identifier query response message, the UE caches a mapping relationship between the service name, the service identifier, and the service status of the computing service, so that the AC subsequently performs quick query.

Step S1018-a: The UE returns the service identifier query response message to the AC, where the service identifier query response message includes the service identifier and the service status (available or unavailable) of the computing service.

Step S1019-a: The AC generates an application layer service request packet based on the obtained service identifier of the computing service, and sends the generated service request packet to the UE. The service request packet is an IP packet, a source address of the service request packet is a UE IP address, and a destination address of the service request packet is the service identifier (service ID) of the computing service. The UE forwards the service request packet to the computing-aware network by using the established PDU session.

Step S1020-a: The UE sends, to the AC, a service response packet received from the ingress CA-UPF.

FIG. 10b-1, FIG. 10b-2 and FIG. 10b-3 are another process in which the UE queries a service identifier of a computing service deployed in the network. The process corresponds to the foregoing interaction mode 2 of interaction between the terminal device and the client, and the terminal device constructs a service request packet based on an application layer request message sent by the client. The process shown in FIG. 10b-1, FIG. 10b-2 and FIG. 10b-3 includes the following steps.

Step S1001: The UE initiates and completes a registration procedure.

Step S1002: The PCF delivers a URSP to the UE by using a UE configuration update procedure, where the URSP includes related information such as a DNN corresponding to the computing-aware network and network slice information.

Step S1003-b: In a process of installing, starting, and running an edge application, the AC in the UE needs to register, with the UE in advance, a computing service that needs to be invoked. Therefore, the AC sends a service registration request message to the UE. The service registration request message includes a service name and application descriptor (app descriptor) information of the computing service that the AC requests to register, for example, an edge application type.

Step S1004-b: The UE queries a cached service identifier list based on the service name. If there is a record, it indicates that the UE has completed registration of the computing service, go to step S1018-b, a service registration response message is sent to the AC, and a corresponding service identifier and a current service status (available or unavailable) is returned; otherwise, it indicates that the UE has not registered the computing service, and the following step S1005-b continues to be performed.

Step S1005-b: The UE further queries the URSP, and queries the corresponding DNN and traffic descriptor information by using the service name and the application descriptor information. If there is no matching information, go to step S1018-b, the service registration response message is sent to the AC, and an unavailable state is returned.

Figures 1, 10A:
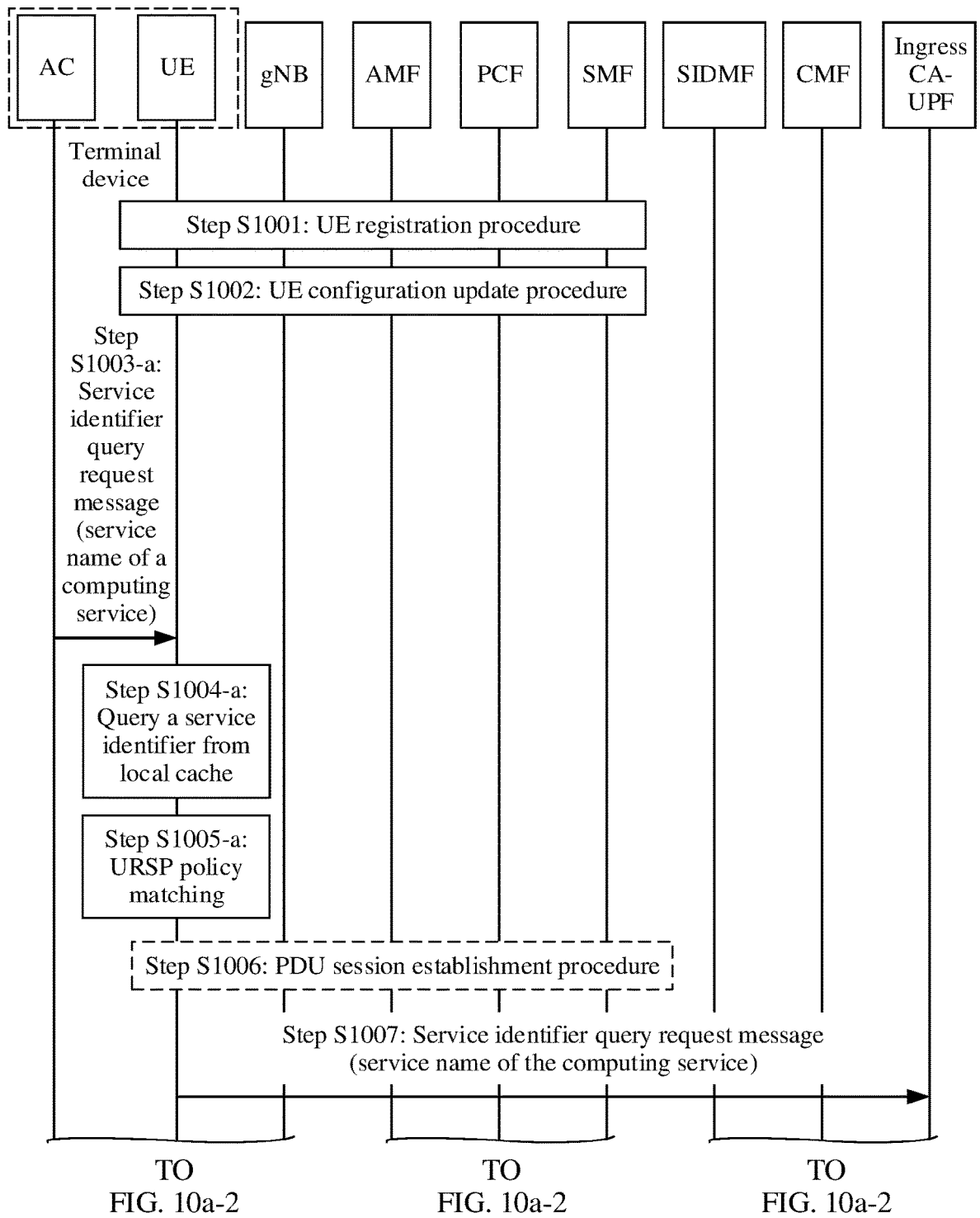
Figures 2, 10A:
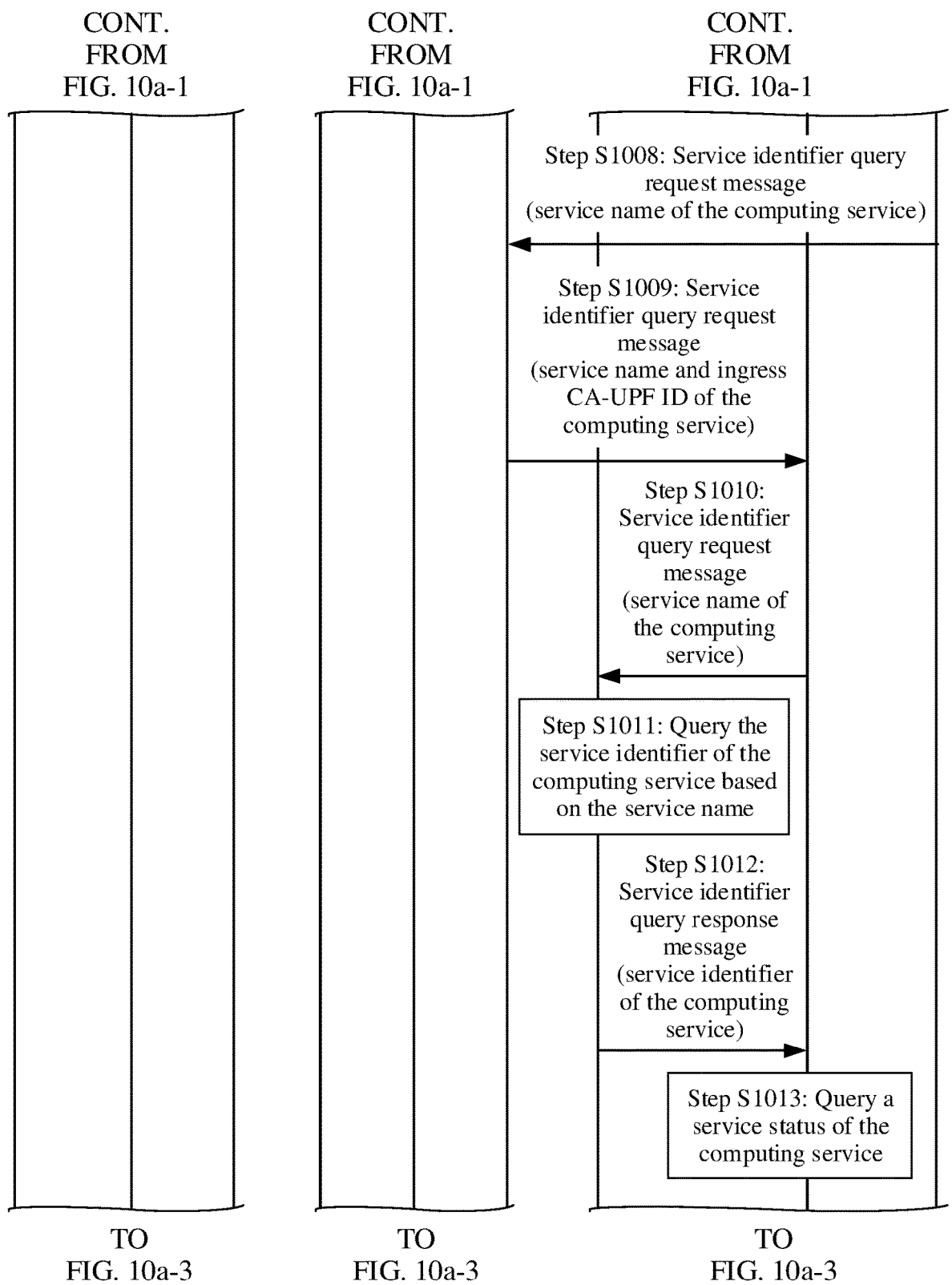
Figures 3, 10A:
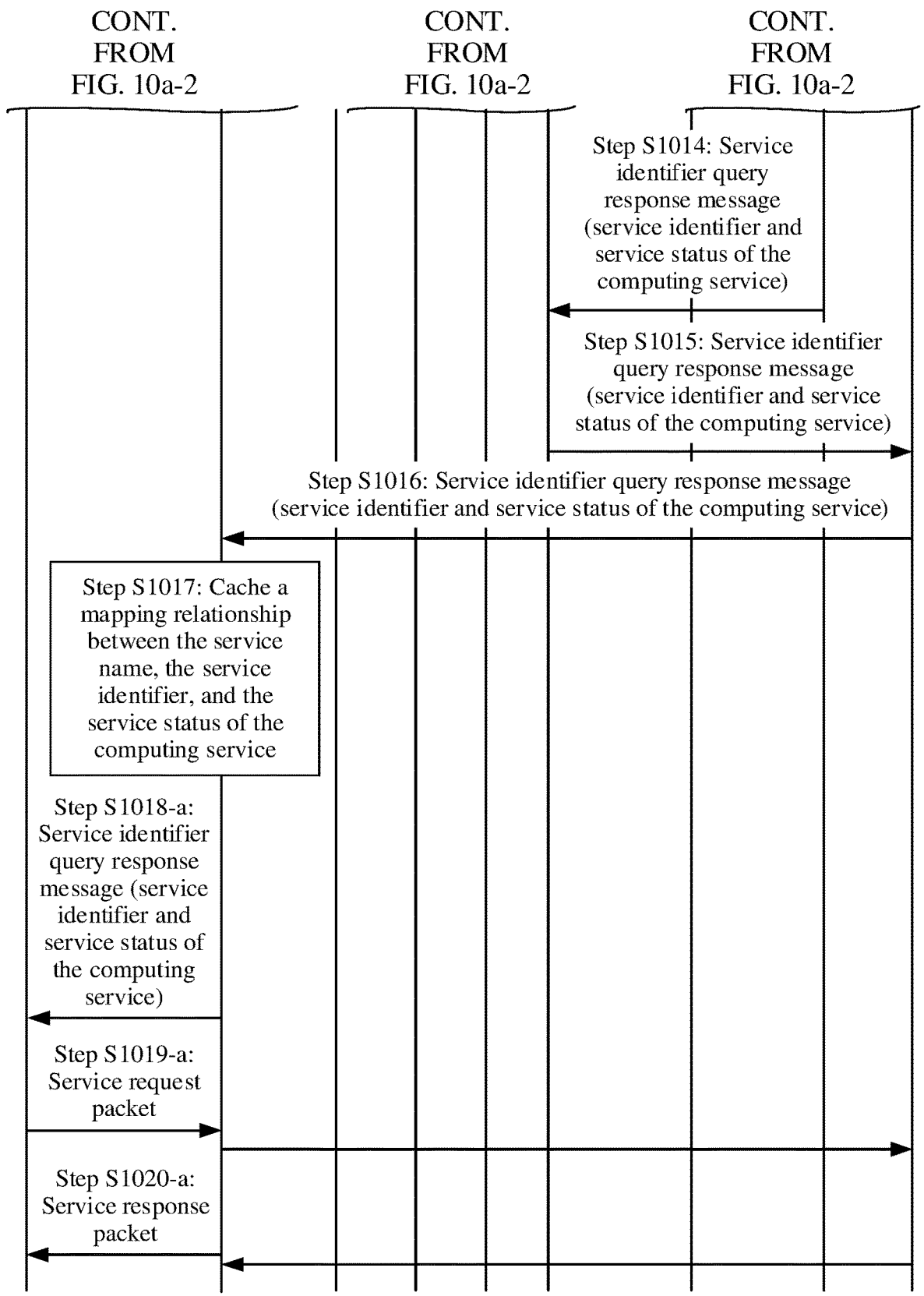
Figures 1, 10B:
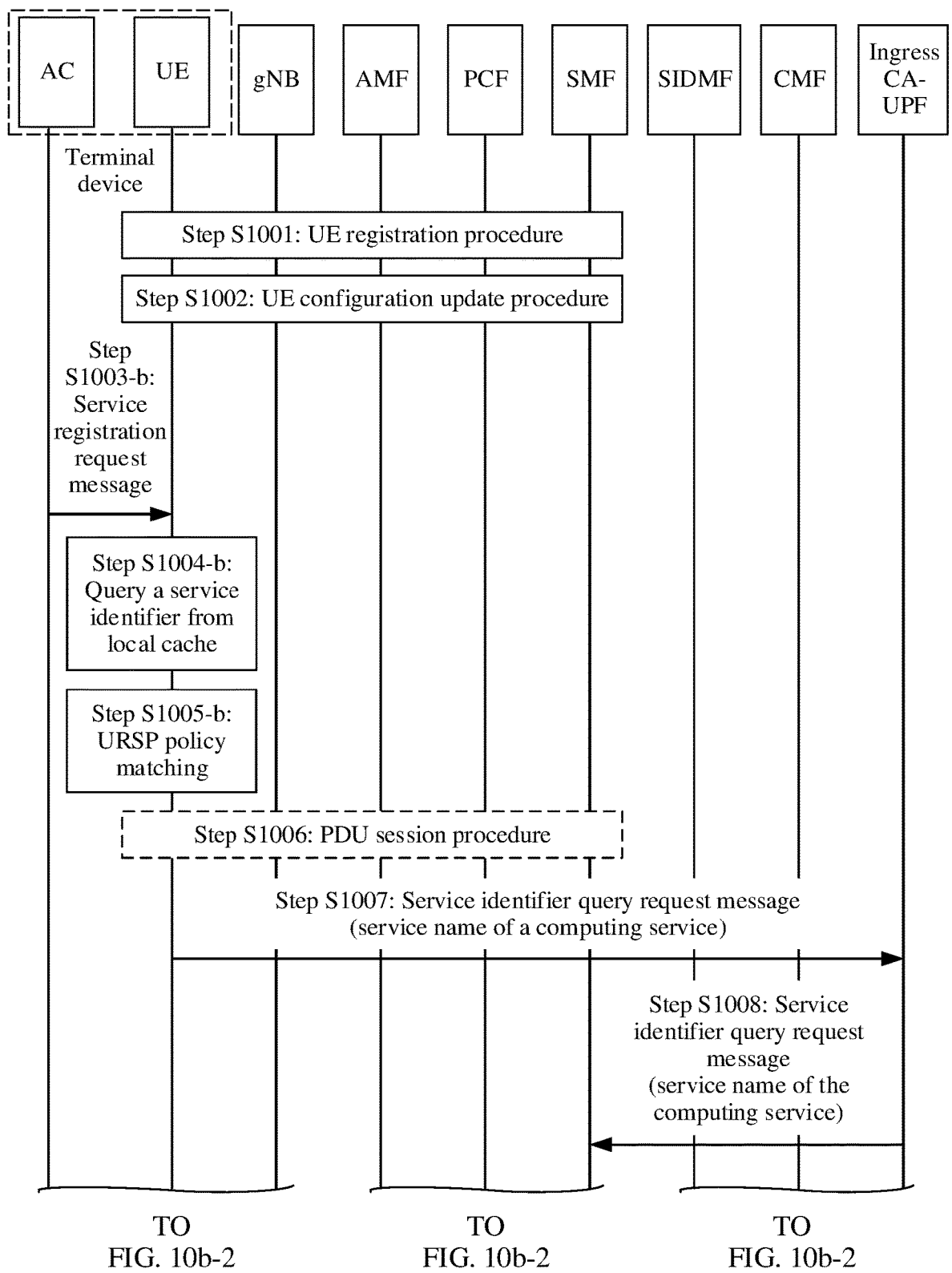
Figures 2, 10B:
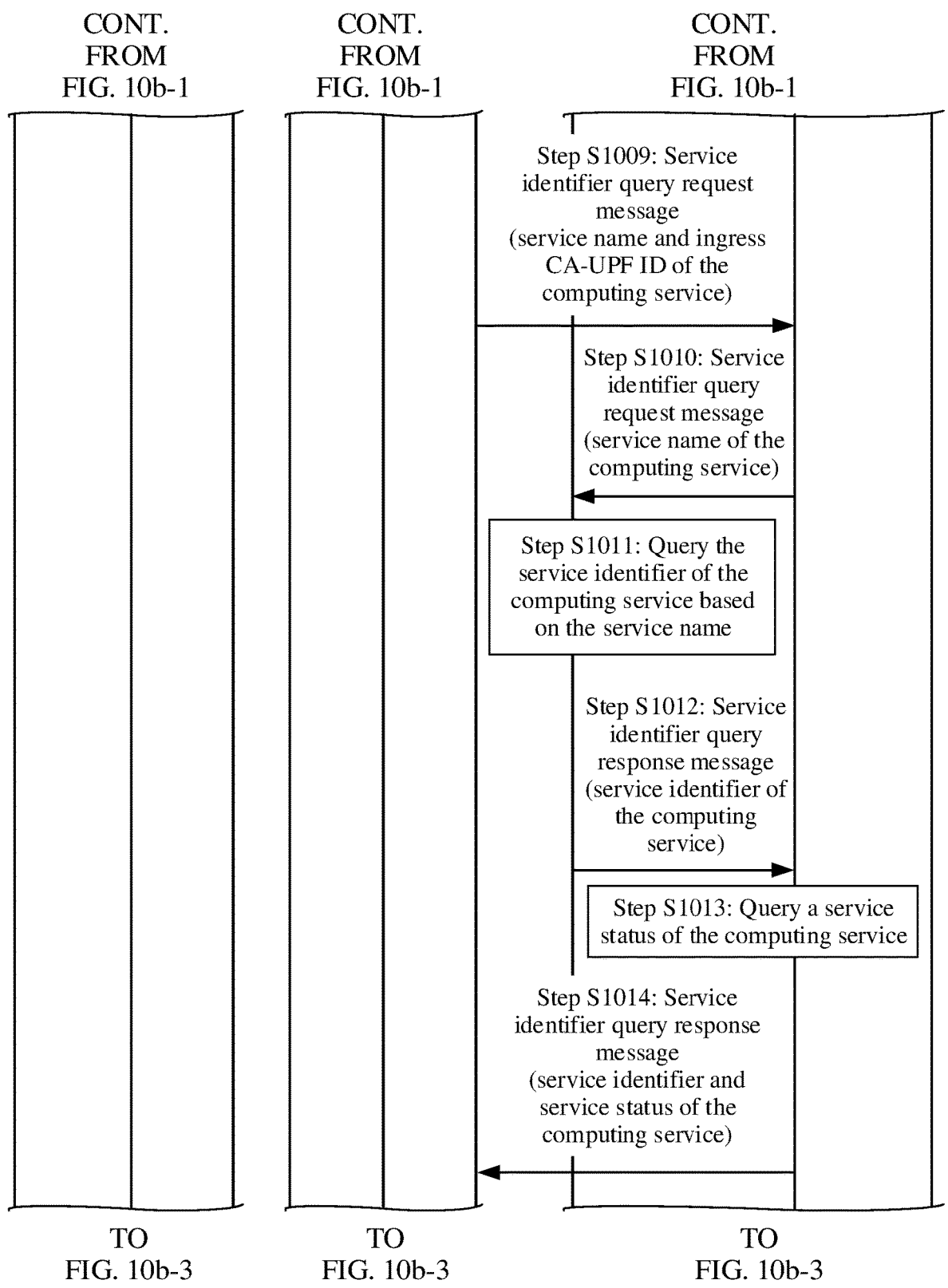
Figures 3, 10B:
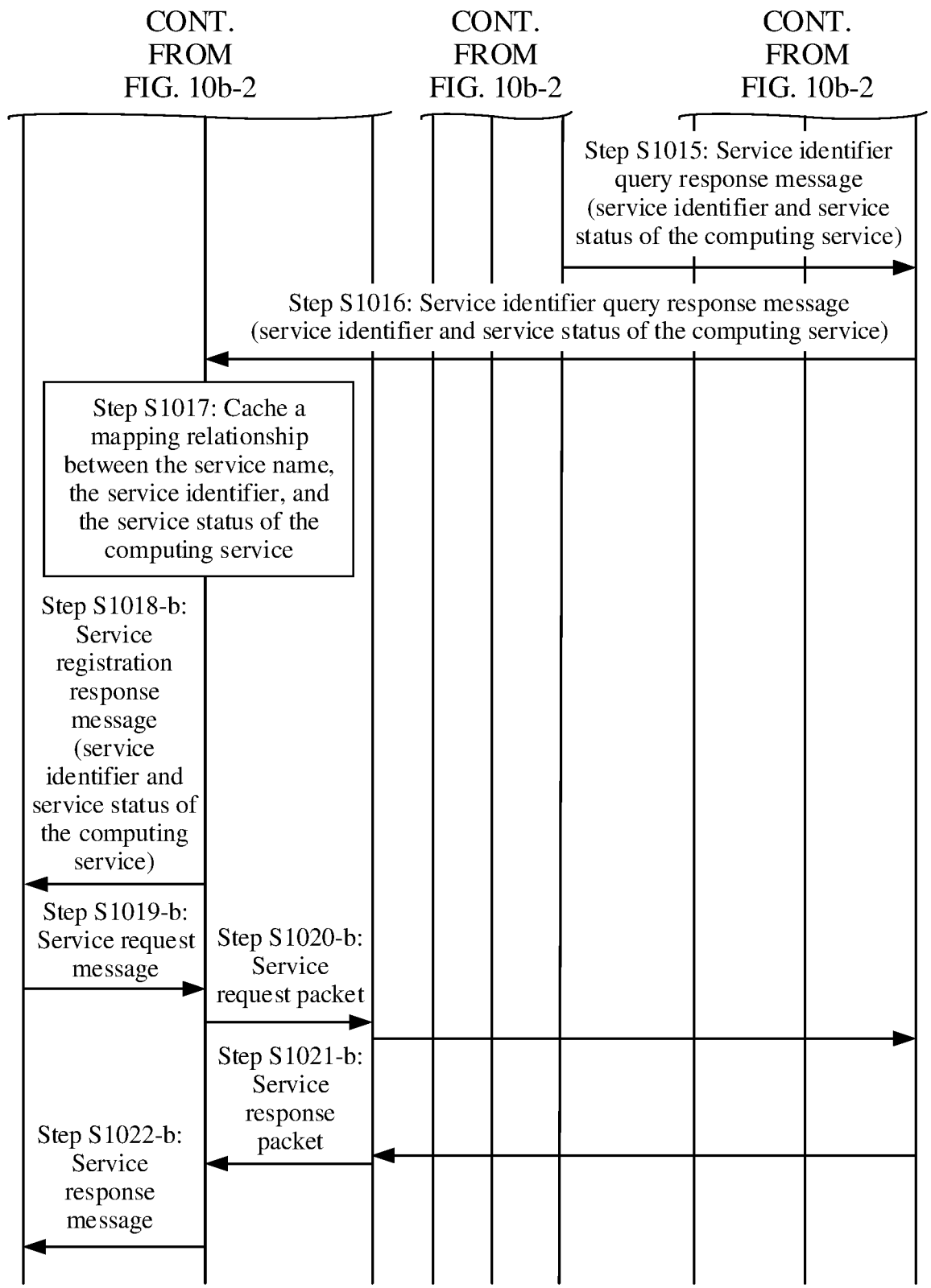

For step S1006 to step S1016, refer to corresponding descriptions in FIG. 10a-1, FIG. and FIG. 10a-3. Details are not described again.

Step S1017: After receiving the service identifier query response message, the UE caches a mapping relationship between the service name, the service identifier, and the service status of the computing service, so that the AC subsequently performs quick query. If the service identifier and the service status that correspond to the service name of the computing service are obtained, it indicates that registration of the computing service with the UE is completed; or if the service identifier and the service status that correspond to the service name of the computing service are not obtained, it indicates that registration fails.

Step S1018-b: The UE returns the service registration response message to the AC, where the service registration response message includes the service identifier and the service status (available or unavailable) of the computing service.

Step S1019-b: The AC sends an application layer service request message to the UE.

Step S1020-b: The UE generates a service request packet based on the received application layer service request message. The service request packet is an IP packet, a source address of the service request packet is a UE IP address, and a destination address of the service request packet is the service identifier (service ID) of the computing service. The UE forwards the generated service request packet to the computing-aware network (that is, an ingress CA-UPF) by using the established PDU session.

Step S1021-b: The UE receives an application layer service response packet from a mobile computing network (that is, the ingress CA-UPF). The service response packet is an IP packet, a source address of the service response packet is the service identifier (service ID) of the computing service, and a destination address of the service response packet is a UE IP address.

Step S1022-b: The UE extracts the application layer service response message from the received service response packet, and forwards the application layer service response message to the AC.

It should be noted that, in the processes shown in FIG. 10a-1, FIG. 10a-2, FIG. 10a-3, FIG. 10b-1, FIG. 10b-2, and FIG. 10b-3, after receiving the service identifier query request message from a previous hop, each network element or functional entity may convert the service identifier query request message, and then send the converted service identifier query request message to a next hop. Similarly, in a reverse direction, after receiving the service identifier query response message from a previous hop, each network element or functional entity may convert the service identifier query response message, and then send the converted service identifier query response message to a next hop.

Embodiment 2

Embodiment 2 of this application provides a service identifier allocation method applied to a scenario in which a terminal side triggers deployment of a computing service. The service identifier allocation method is used by a terminal device to actively upload a required computing service to an edge data network. In the service identifier allocation method, the terminal device first triggers deployment of the computing service, and then a network side allocates a service identifier and deploys the computing service, and provides the service identifier and a service status of the deployed computing service to the terminal device.

Figure 11:
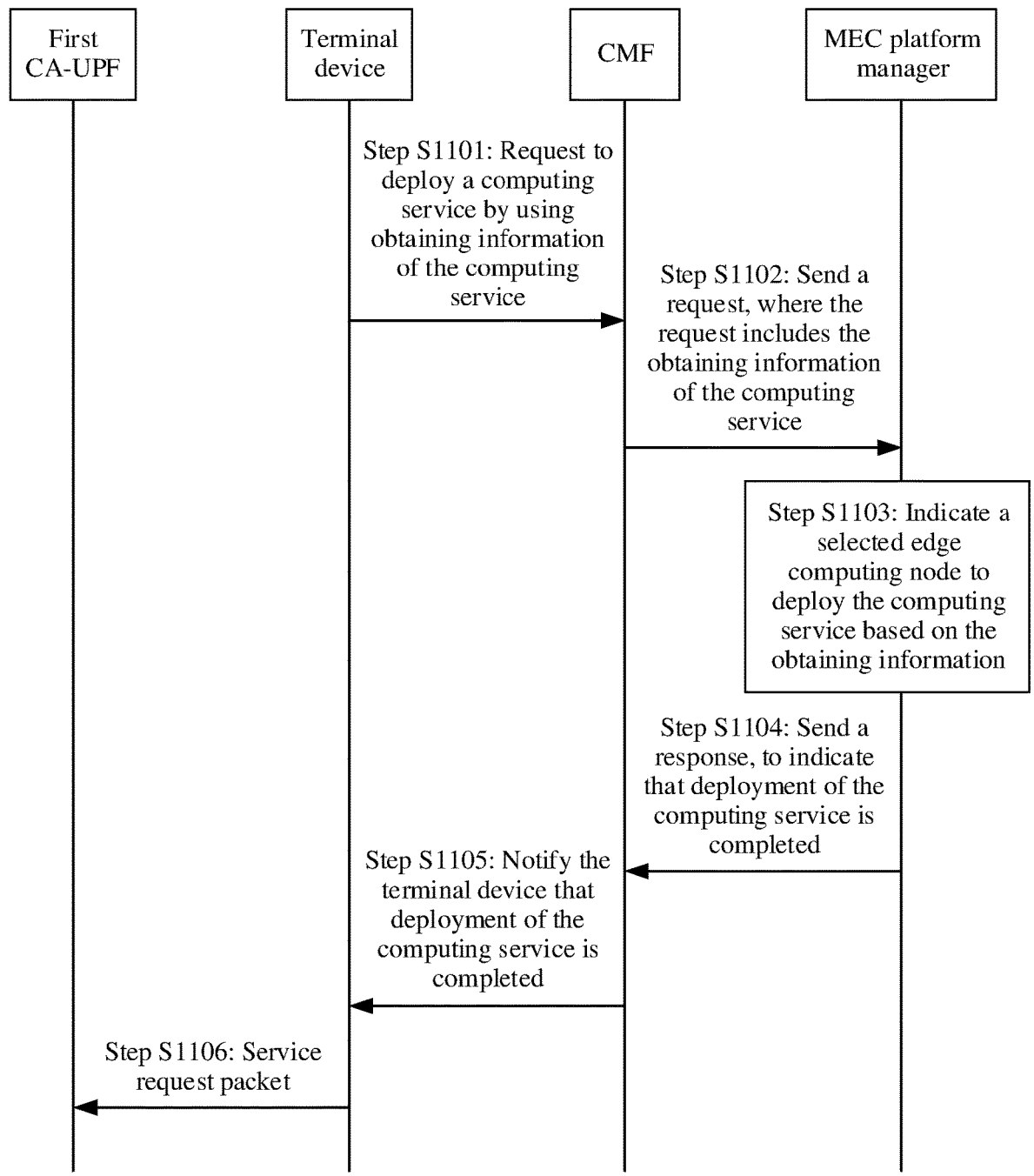
FIG. 11 is a schematic flowchart of a service identifier allocation method in a computing-aware network according to Embodiment 2 of this application.

FIG. 11 is another service identifier allocation method in a computing-aware network according to an embodiment of this application. The method includes the following steps.

Step S1101: A terminal device requests a CMF to deploy a computing service by using information for obtaining the computing service.

Correspondingly, the CMF receives the information for obtaining the computing service from the terminal device.

The information for obtaining the computing service may include a download address of the computing service, or further include running environment information. This is used by a network side to download and install the computing service. In some embodiments, the download address may be represented in a form of a URL, that is, the download address may be represented as a download URL. The URL generally includes three parts: (1) a protocol, such as a hypertext transfer protocol (HTTP), a hypertext transfer protocol over secure socket layer (HTTPS), or a file transfer protocol (FTP); (2) a site domain name or a host IP address, and optionally, may alternatively include a port number; and (3) a resource access path and a file name The running environment information mainly includes information about an operating system, a compiler, a virtual machine, or a container on which running of the computing service depends. In this way, an edge computing node downloads code (or an image) of the computing service based on the URL, and implements instantiation of the computing service based on the running environment information.

It should be noted that, in this embodiment of this application, that the terminal device requests a network to deploy a computing service may be understood as that the terminal device actively uploads a computing service to the network. The "upload" means that the terminal device actively provides a computing service to the network, and the computing service is deployed in an edge data network. The "upload" may also be sometimes referred to as "uninstall (offload)", that is, under management and coordination of an MEC platform manager, the edge computing node in the edge data network downloads, from a specified download address, the code of the computing service actively provided by the terminal device, and installs and runs the code, to complete deployment of the computing service in the edge data network.

In this embodiment of this application, when requesting the CMF to deploy the computing service, the terminal device may further provide identification information (namely, a UE ID) of the terminal device to the CMF, so that the CMF performs subscription verification on the terminal device. In some embodiments, the CMF determines whether the terminal device has permission to actively trigger deployment of the computing service, and whether the information for obtaining the computing service meets a requirement (for example, determines whether a download address of the computing service is valid), and the like. If it is determined that the terminal device has the permission to actively trigger deployment of the computing service, a subsequent procedure continues; otherwise, the terminal device is notified that deployment fails. The identification information of the terminal device (that is, the UE ID) may be a generic public subscription identifier (GPSI), a 5G-globally unique temporary UE identity (GUTI), or other identification information of the terminal device. This is not limited.

When requesting the CMF to deploy a computing service, the terminal device may further provide a service name of the computing service to the CMF, so that the CMF allocates, by using an SIDMF, a corresponding service identifier to the computing service that the terminal device requests to deploy. That is, after receiving the service name of the computing service from the terminal device, the CMF may request the SIDMF to allocate the service identifier to the computing service, and provide the service name of the computing service to the SIDMF. Subsequently, the CMF may receive, from the SIDMF, the service identifier allocated to the computing service based on the service name.

It should be noted that, in this embodiment of this application, the CMF may first perform subscription verification on the terminal device, determine that the terminal device has permission to actively trigger deployment of the computing service, and then request the SIDMF to allocate the corresponding service identifier to the computing service. After obtaining the service identifier allocated by the SIDMF to the computing service, the CMF performs the following step S1102 to request the MEC platform manager to deploy the computing service.

Figure 12:
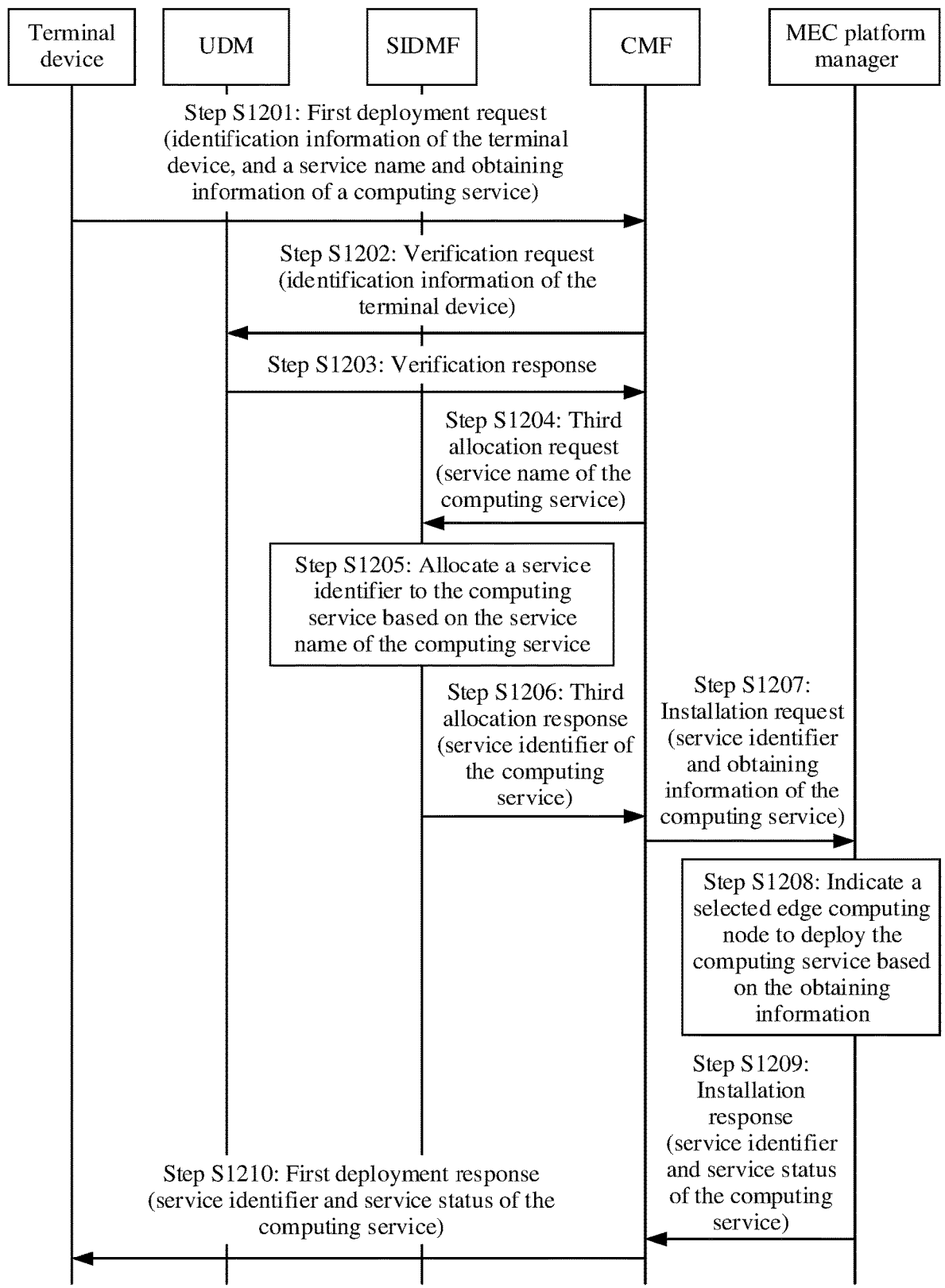
FIG. 12 is a schematic diagram of an implementation in which a terminal device requests a CMF to deploy a computing service according to Embodiment 2 of this application.

In a possible implementation, that the terminal device requests the CMF to deploy the computing service may be shown in step S1201 in FIG. 12: The terminal device sends a first deployment request to the CMF, where the first deployment request includes the identification information of the terminal device, the service name of the computing service and the information for obtaining the computing service. Correspondingly, the CMF receives the first deployment request from the terminal device.

It may be understood that the terminal device may not directly interact with the CMF, but may perform forwarding by using a series of network elements. In some embodiments, the terminal device may first send the first deployment request to an access network device, and the first deployment request arrives at a first CA-UPF after being forwarded by the access network device. The first CA-UPF is an ingress CA-UPF accessed by the terminal device in the computing-aware network, and may be understood as an access anchor of the terminal device in the computing-aware network. Then, the first CA-UPF sends the first deployment request to the SMF based on a packet matching forwarding rule. Further, after receiving the first deployment request, the SMF sends the first deployment request to the CMF. It should be noted that, in the foregoing process, after receiving the first deployment request from a previous hop, each network element or functional entity may convert the first deployment request, and then send the converted first deployment request to a next hop. In addition, first deployment requests interacted between different network elements or functional entities may be carried in different messages for sending. Optionally, after receiving the first deployment request, the SMF may determine, based on N4 interface information for receiving the first deployment request message, that the ingress CA-UPF of the terminal device is the first CA-UPF, add identification information of the first CA-UPF to the message including the first deployment request, and then send the message to the CMF, so that the CMF learns that the ingress CA-UPF of the terminal device is the first CA-UPF.

Further, after receiving the first deployment request from the terminal device, the CMF may send information such as the identification information of the terminal device, the service name of the computing service and the information for obtaining the computing service to UDM for subscription verification. As shown in step S1202 and step S1203 in FIG. 12, the CMF may send a verification request to the UDM. The verification request includes information such as the identification information of the terminal device, the service name of the computing service and the information for obtaining the computing service. After performing verification, the UDM may send a verification response to the CMF. The verification response includes result information indicating whether verification succeeds. It may be understood that the verification request and the verification response may be separately carried in one message for sending.

The verification process may include verifying whether the terminal device has permission to actively upload the computing service, whether the obtaining information (for example, a download address) of the computing service is valid, and the like. If the verification fails, for example, the terminal device has no permission to actively trigger deployment of the computing service, or the information for obtaining the computing service does not meet a requirement, the CMF may subsequently send a first deployment response to the terminal device. In this case, the first deployment response may be used to notify the terminal device that deployment of the computing service fails. Optionally, the first deployment response may further include a service status of the computing service, and the service status indicates that the computing service is unavailable. If verification succeeds, for example, the terminal device has permission to actively trigger deployment of the computing service, and the information for obtaining the computing service meets a requirement, the CMF may continue to perform the following step S1204, to request the SIDMF to allocate the service identifier to the computing service.

A process in which the CMF requests the SIDMF to allocate the service identifier to the computing service may be shown in step S1204 to step S1206 in FIG. 12. The CMF may send a third allocation request to the SIDMF. The third allocation request is used to request to allocate the service identifier to the computing service, and the third allocation request includes the service name of the computing service. After receiving the third allocation request from the CMF, the SIDMF may allocate the service identifier to the computing service based on the service name of the computing service. For example, the SIDMF may translate the service name of the computing service into a unique corresponding service identifier, for example, an IPv6 or IPv4 anycast address. A specific translation method may obtain the service identifier through hash, or through calculation based on a specific algorithm, or through matching and searching by using a database. This is not limited in this application. Optionally, after allocating the service identifier to the computing service, the SIDMF may further record a mapping relationship between the service name and the service identifier of the computing service for subsequent query. Further, the SIDMF may send a third allocation response to the CMF. The third allocation response includes the service identifier of the computing service.

Step S1102: The CMF sends a request to the MEC platform manager, where the request includes the information for obtaining the computing service, and the request is used to request to deploy the computing service.

Correspondingly, the MEC platform manager may receive the request from the CMF.

Step S1103: The MEC platform manager indicates the selected edge computing node to deploy the computing service based on the obtaining information.

Step S1104: The MEC platform manager sends a response to the CMF, where the response indicates that deployment of the computing service is completed.

Correspondingly, the CMF receives the response from the MEC platform manager.

In a possible implementation, a process in which the CMF requests the MEC platform manager to deploy the computing service may be shown in step S1207 to step S1209 in FIG. 12: The CMF sends an installation request to the MEC platform manager. The installation request is used to request the MEC platform manager to deploy the computing service, and the installation request includes the service identifier of the computing service and the information for obtaining the computing service. After receiving the installation request, the MEC platform manager may select a proper edge computing node, and indicate the edge computing node to download and install the computing service based on the information for obtaining the computing service, for example, download code of the computing service from a specified download address and run the code. After the edge computing node installs and runs the computing service, the MEC platform manager may send an installation response to the CMF. The installation response is used to notify the CMF that deployment of the computing service is completed, the installation response message includes the service identifier and the service status of the computing service, and the service status indicates whether the computing service is available or unavailable. In this way, the CMF may record a service status of the computing service in a regional computing group that uses the first CA-UPF as an ingress CA-UPF.

Optionally, after the edge computing node installs and runs the computing service, the edge computing node may further send computing service information of the computing service to an associated egress CA-UPF (that is, a second CA-UPF). The computing service information may include information such as the service identifier, a service attribute, a running status, and computing resource information of the computing service, so that the second CA-UPF creates or updates a computing routing information base based on the computing service information of the computing service received from the edge computing node, and, in some embodiments, creates or updates computing routing information of the computing service in the computing routing information base.

It may be understood that interaction between the CMF and the MEC platform manager may not be directly performed, but is performed through forwarding by an NEF. In this way, the CMF may send an installation request to the NEF, and the NEF forwards the installation request to the MEC platform manager. In the foregoing process, after receiving the installation request from the CMF, the NEF may convert the installation request, and then send the converted installation request to the MEC platform manager. In addition, the installation request sent by the CMF to the NEF and the installation request sent by the NEF to the MEC platform manager may be carried in different messages for sending. This is not limited.

Similarly, the MEC platform manager may send an installation response to the NEF, and the NEF forwards the installation response to the CMF. In the foregoing process, after receiving the installation response from the MEC platform manager, the NEF may convert the installation response, and then send the converted installation response to the CMF. In addition, the installation response sent by the MEC platform manager to the NEF and the installation response sent by the NEF to the CMF may also be carried in different messages for sending.

Step S1105: The CMF notifies the terminal device that deployment of the computing service is completed.

Correspondingly, the terminal device receives a notification from the CMF. The notification indicates that deployment of the computing service is completed.

In this embodiment of this application, that the CMF notifies the terminal device that deployment of the computing service is completed may include: The CMF notifies the terminal device of the service identifier and the service status of the computing service. The service identifier is allocated to the computing service by the SIDMF based on the request of the CMF, and the service status is determined by the CMF based on a response returned by the MEC platform manager.

In a possible implementation, that the CMF notifies the terminal device that deployment of the computing service is completed may be shown in step S1210 in FIG. 12: The CMF sends a first deployment response to the terminal device. The first deployment response is used to notify the terminal device that deployment of the computing service is completed. The first deployment response includes the service identifier and the service status of the computing service. Correspondingly, the terminal device receives the first deployment response from the CMF.

It may be understood that the terminal device may not directly interact with the CMF, but may perform forwarding by using a series of network elements. Therefore, the CMF may first send the first deployment response to the SMF. After receiving the first deployment response, the SMF sends the first deployment response to the first CA-UPF (that is, the ingress CA-UPF accessed by the terminal device). Then, the first CA-UPF sends the first deployment response to the corresponding access network device based on the packet matching forwarding rule. Finally, the first deployment response arrives at the terminal device after being forwarded by the access network device. It should be noted that in the foregoing process, after receiving the first deployment response from a previous hop, each network element or functional entity may convert the first deployment response, and then send the converted first deployment response to a next hop. In addition, first deployment responses interacted between different network elements or functional entities may be carried in different messages for sending.

After receiving the first deployment response, the terminal device may record a mapping relationship between the service name of the computing service and the corresponding service identifier and service status, for subsequent query. For example, the terminal device may maintain a computing service list. After successfully triggering a network to deploy a computing service and obtaining a service identifier and a service status of the computing service, the terminal device may cache a service name of the computing service and the corresponding service identifier and service status into the computing service list.

Step S1106: The terminal device sends a service request packet to the first CA-UPF, where the service request packet is used to request the computing service.

In this embodiment of this application, the service request packet includes the service identifier of the computing service, and the service identifier is a destination address of the service request packet. Optionally, the service request packet is an IP packet, a source IP address of the IP packet is an IP address of the terminal device, and a destination IP address is the service identifier of the computing service.

Optionally, the terminal device may determine, based on the service status of the computing service, whether to request the computing service. When the service status indicates that the computing service is available, the terminal device determines to request the computing service, and further sends the service request packet to the first CA-UPF based on the service identifier of the computing service.

Figure 13:
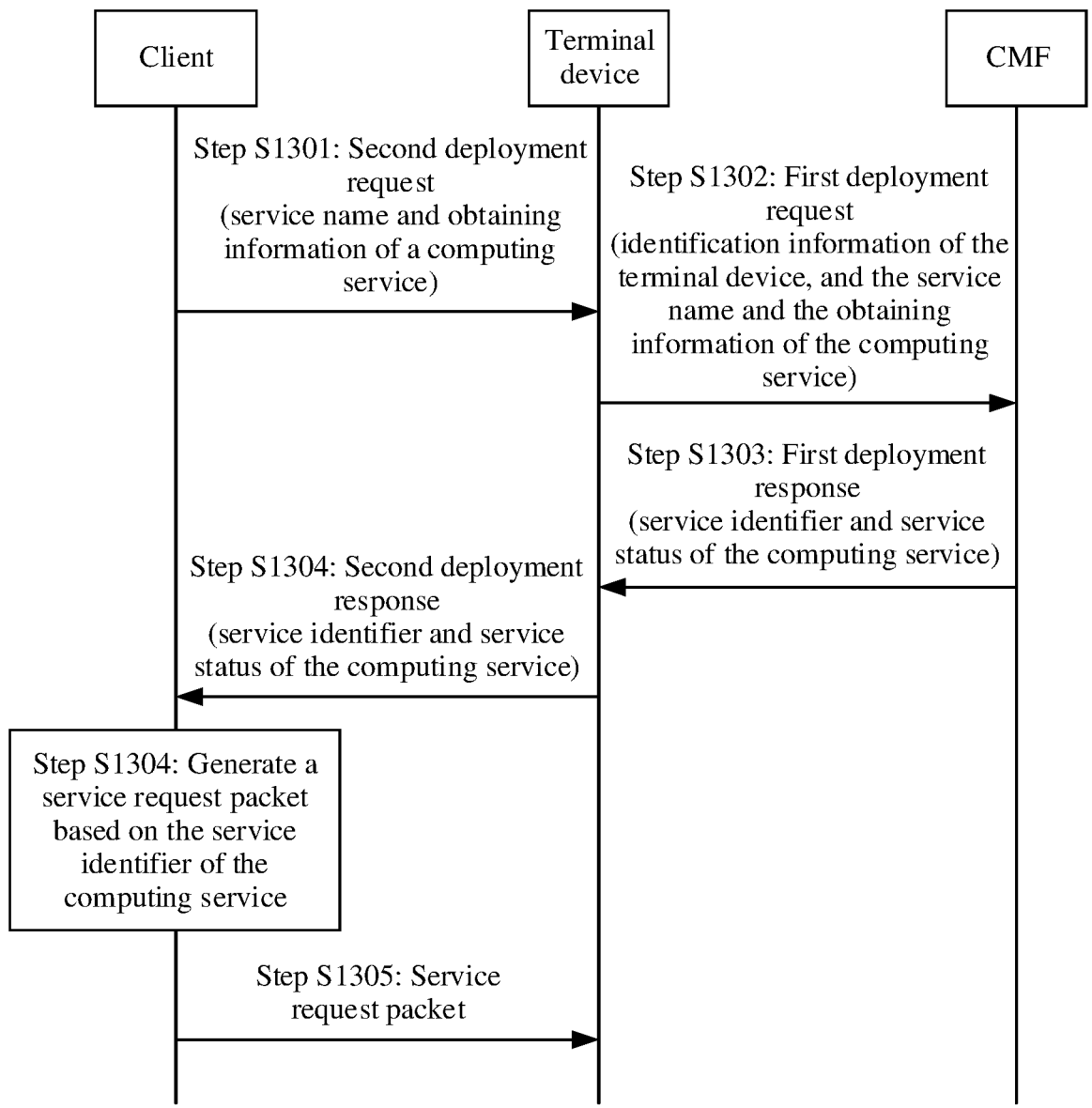
FIG. 13 is a schematic diagram of a process in which a client in a terminal device triggers to request a network to deploy a computing service according to Embodiment 2 of this application.
Figure 14A:
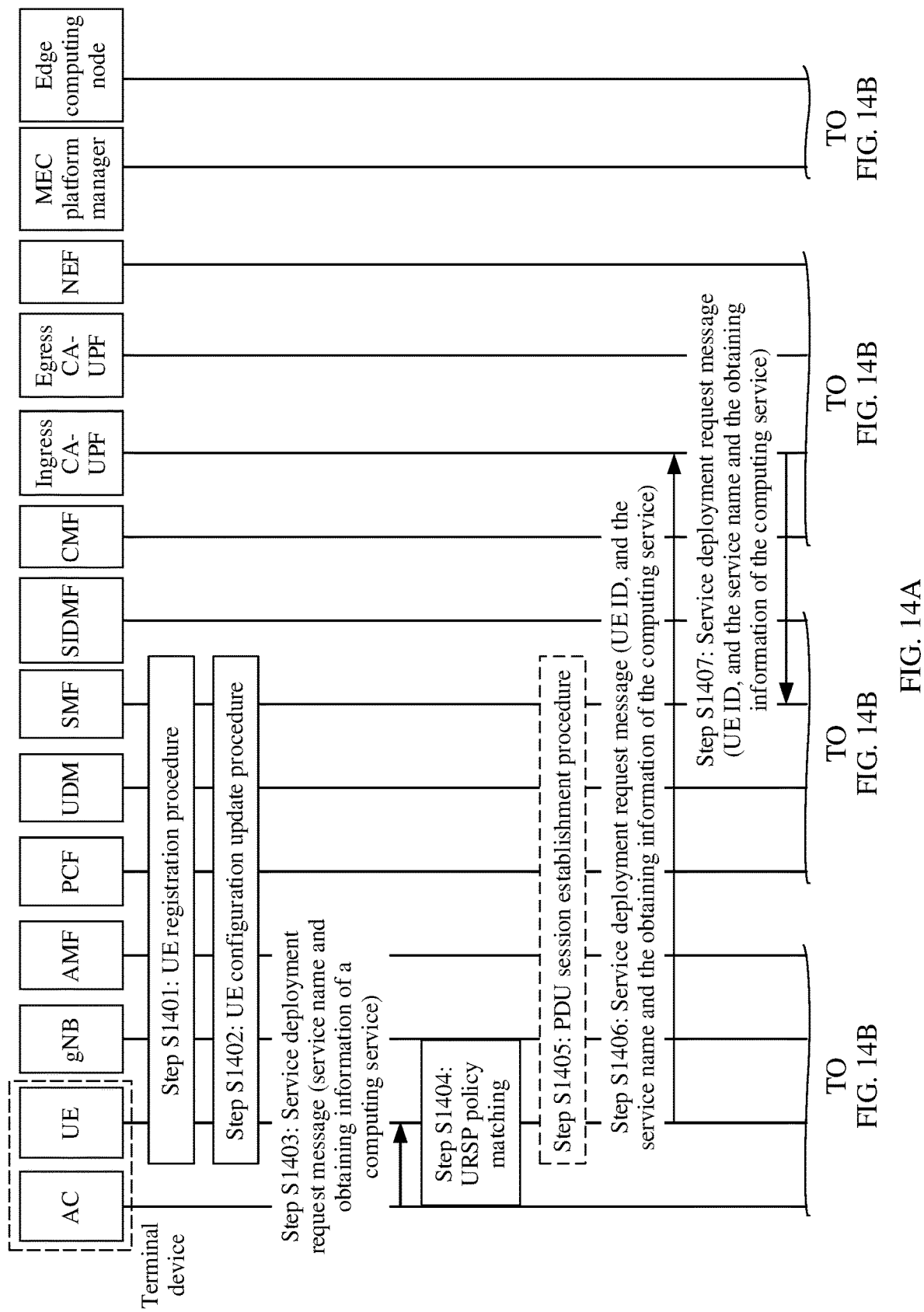
Figure 14D:
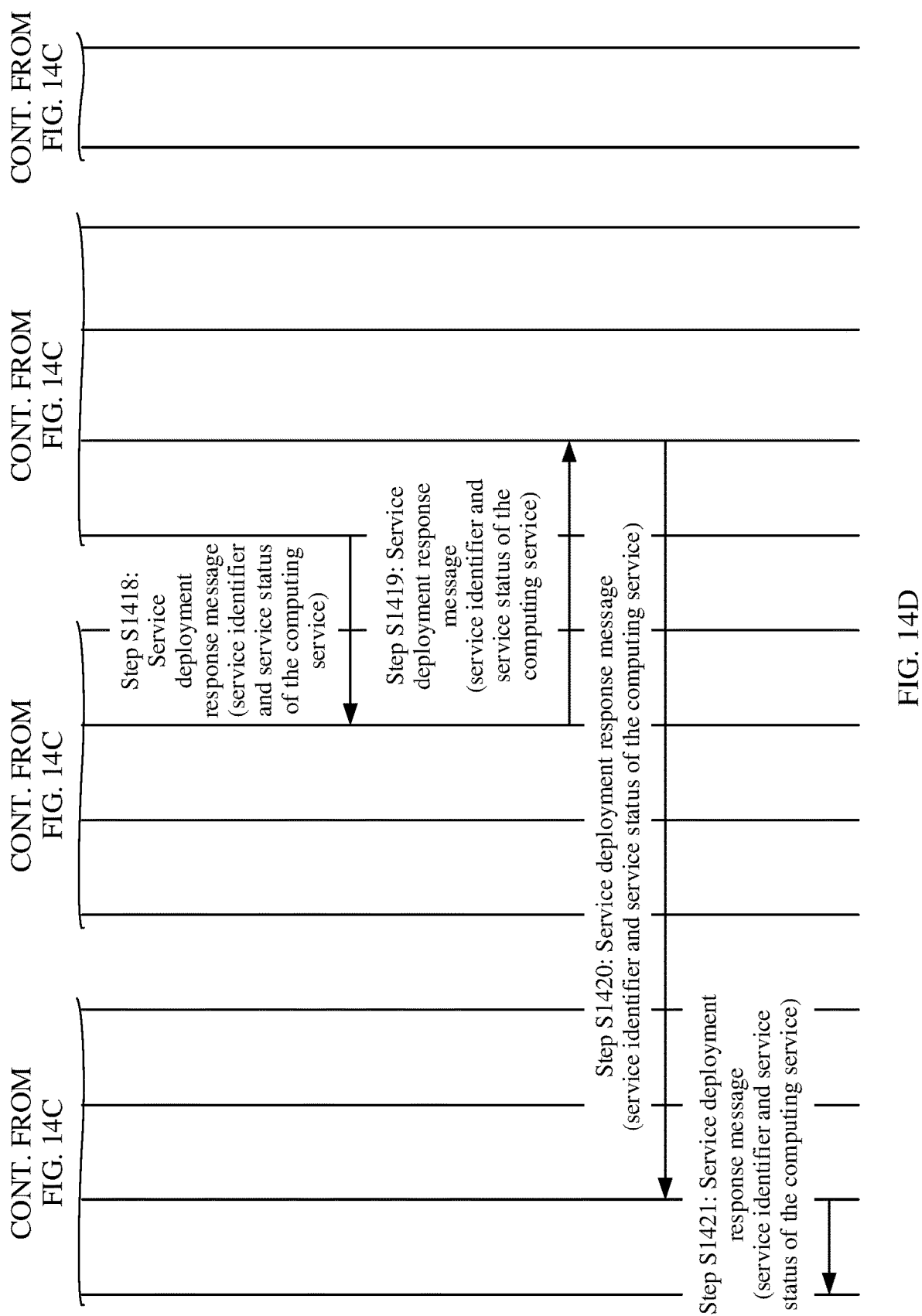

In this embodiment of this application, an action that the terminal device actively triggers the network to deploy the computing service may alternatively be initiated by a client in the terminal device. For example, as shown in FIG. 13, when the terminal device installs or runs the client, the client may send a second deployment request to the terminal device in step S1301. The second deployment request is used to request to deploy the computing service, and the second deployment request includes the service name of the computing service and the information for obtaining the computing service. After receiving the second deployment request, the terminal device may add the identification information of the terminal device to the second deployment request, to obtain the first deployment request, and send the first deployment request to the CMF in step S1302. Then, the CMF may perform the deployment process shown in FIG. 11 and FIG. 12. In step S1303, the terminal device may receive the first deployment response from the CMF. The first deployment response is used to notify the terminal device that deployment of the computing service is completed. The first deployment response includes the service identifier and the service status of the computing service. In step S1304, the terminal device may send a second deployment response to the client. The second deployment response is used to notify the client that deployment of the computing service is completed, and the second deployment response includes the service identifier and the service status of the computing service. Further, if the service status indicates that the computing service is available, the client may generate the service request packet based on the service identifier of the computing service in step S1304. In some embodiments, the service request packet is an IP packet, and the client may construct the IP packet based on the service identifier of the computing service, use the service identifier of the computing service as a destination address of the IP packet, and use the IP address of the terminal device as a source address of the IP packet. In step S1305, the client may send the generated service request packet to the terminal device, so that the terminal device may further send the service request packet to the first CA-UPF. Subsequently, after receiving a service response packet from the first CA-UPF, the terminal device may send the service response packet to the client. A source IP address of the service response packet is the service identifier of the computing service, and a destination IP address is the IP address of the terminal device. It should be noted that the second deployment request and the second deployment response in the foregoing process may be separately carried in one message for sending.

The following uses a specific example to describe in detail the service identifier allocation method in Embodiment 2. This example includes the steps shown in FIG. 14A, FIG. 14B, FIG. 14C, and FIG. 14D.

Step S1401: The UE initiates and completes a registration procedure.

Step S1402: A PCF delivers a URSP to the UE by using a UE configuration update procedure, where the URSP includes related information such as a DNN corresponding to the computing-aware network and network slice information.

Step S1403: When the UE installs and runs an AC, the AC sends a service deployment request message to the UE, where the service deployment request message includes a service name, application descriptor (app descriptor) information, and obtaining information (download URL) of a computing service that the AC requests to upload, and the obtaining information may be, for example, a download address of the computing service.

Step S1404: The UE further queries a URSP rule, and queries a corresponding DNN and traffic descriptor information by using the application descriptor information. If there is matching information, continue to perform the following step S1405. If there is no matching information, go to step S1421, a second service upload response message is sent to the AC, and an unavailable state is returned.

Step S1405: The UE further queries whether a PDU session connection has been established for the DNN. If the PDU session connection has been established, the UE continues to perform the following step S1406. If the PDU session is not established, the UE initiates a PDU session establishment procedure. During the PDU session establishment procedure, when selecting a corresponding ingress CA-UPF and establishing a session connection, the SMF may deliver a packet matching forwarding rule to the ingress CA-UPF at the same time, and indicate the ingress CA-UPF to forward a subsequently received service deployment request message to the SMF.

Step S1406: The UE sends the service deployment request message by using the established PDU session in the computing-aware network, where the service deployment request message includes a UE ID, the service name of the computing service and the information for obtaining the computing service that the UE requests to upload. Compared with the service deployment request message received by the UE from the AC in step S1403, the service deployment request message sent by the UE to the network adds a UE ID information element. The UE ID may be a GPSI or a 5G-GUTI, and is used by the network to subsequently perform subscription verification on the UE.

Step S1407: The service deployment request message is sent to the ingress CA-UPF (for example, the first CA-UPF described above) accessed by the UE, and the ingress CA-UPF identifies the service deployment request message based on the packet matching forwarding rule, and forwards the service deployment request message to the SMF.

Step S1408: The SMF adds an ingress CA-UPF ID to the service deployment request message based on the N4 interface information, and then forwards the service deployment request message to the CMF. It should be noted that in this case, the service deployment request message includes the UE ID, the service name, the obtaining information (download URL), and the ingress CA-UPF ID.

Step S1409: The CMF sends the UE ID, the service name, and the download address (download URL) to the UDM for subscription verification. If subscription verification succeeds, the following step S1410 continues to be performed. If subscription verification fails, for example, the UE is not allowed to actively trigger deployment of the computing service, or the information for obtaining the computing service does not meet a requirement, go to step S1417. The CMF sends a service deployment response message to the UE through forwarding by using the SMF and the ingress CA-UPF, and returns an unavailable state.

Step S1410: The CMF sends a service identifier allocation request message to the SIDMF, where the service identifier allocation request message includes the service name of the computing service that the UE requests to upload.

Step S1411: After receiving the service identifier allocation request message, the SIDMF allocates the service identifier to the computing service based on the service name In some embodiments, the SIDMF may translate the service name into a unique corresponding service identifier (service ID). The service identifier may be an IPv6 or IPv4 anycast address. A specific translation method may obtain the service identifier through hash, through calculation based on a specific algorithm, or through matching and searching by using a database. This is not limited. Optionally, the SIDMF may further store a mapping relationship between the service name and the service identifier, so that the UE subsequently obtains the service identifier corresponding to the computing service.

Step S1412: The SIDMF sends a service identifier allocation response message to the CMF, where the service identifier allocation response message includes the service identifier (service ID) of the computing service.

Step S1413: The CMF sends a service installation request message to the MEC platform manager by using the NEF, where the service installation request message includes the service name, the service identifier (service ID), and the obtaining information (such as a download URL) of the computing service that the UE requests to upload.

Step S1414: The MEC platform manager selects a proper edge computing node, and indicates the edge computing node to download the computing service based on the information for obtaining the computing service, and install and run the computing service.

Step S1415: The edge computing node reports the service identifier and the corresponding computing service information to the associated egress CA-UPF, to create computing routing.

Step S1416: The CA-UPF in the computing-aware network performs a computing routing creation procedure, which mainly includes: The egress CA-UPF sends the service identifier and the corresponding computing service information to the ingress CA-UPF, and generates the computing routing information base on the ingress CA-UPF.

Step S1417: The MEC platform manager returns a service installation response message to the CMF by using the NEF, where the service installation response message includes the service identifier (service ID) and the service status of the computing service on which installation is completed. Optionally, after receiving the service installation response message, the CMF may record a service status of the computing service in a regional computing group that uses the ingress CA-UPF as an access anchor.

Step S1418: The CMF returns the service deployment response message to the SMF, where the service deployment response message includes the service identifier (service ID) and the service status of the computing service whose deployment is completed.

Step S1419: The SMF returns the service deployment response message to the ingress CA-UPF.

Step S1420: The ingress CA-UPF sends the service deployment response message to the UE. Optionally, after receiving the service deployment response message, the UE caches the mapping relationship between the service name, the service identifier, and the service status, so that the AC subsequently performs quick query.

Step S1421: The UE returns the service deployment response message to the AC, where the service deployment response message includes the service identifier (service ID) and the service status of the computing service whose deployment is completed.

It should be noted that, in the foregoing process, after receiving the service deployment request message from a previous hop, each network element or functional entity may convert the service deployment request message, and then send the converted service deployment request message to a next hop. Similarly, in a reverse direction, after receiving the service deployment response message from a previous hop, each network element or functional entity may convert the service deployment response message, and then send the converted service deployment response message to a next hop.

Figure 15:
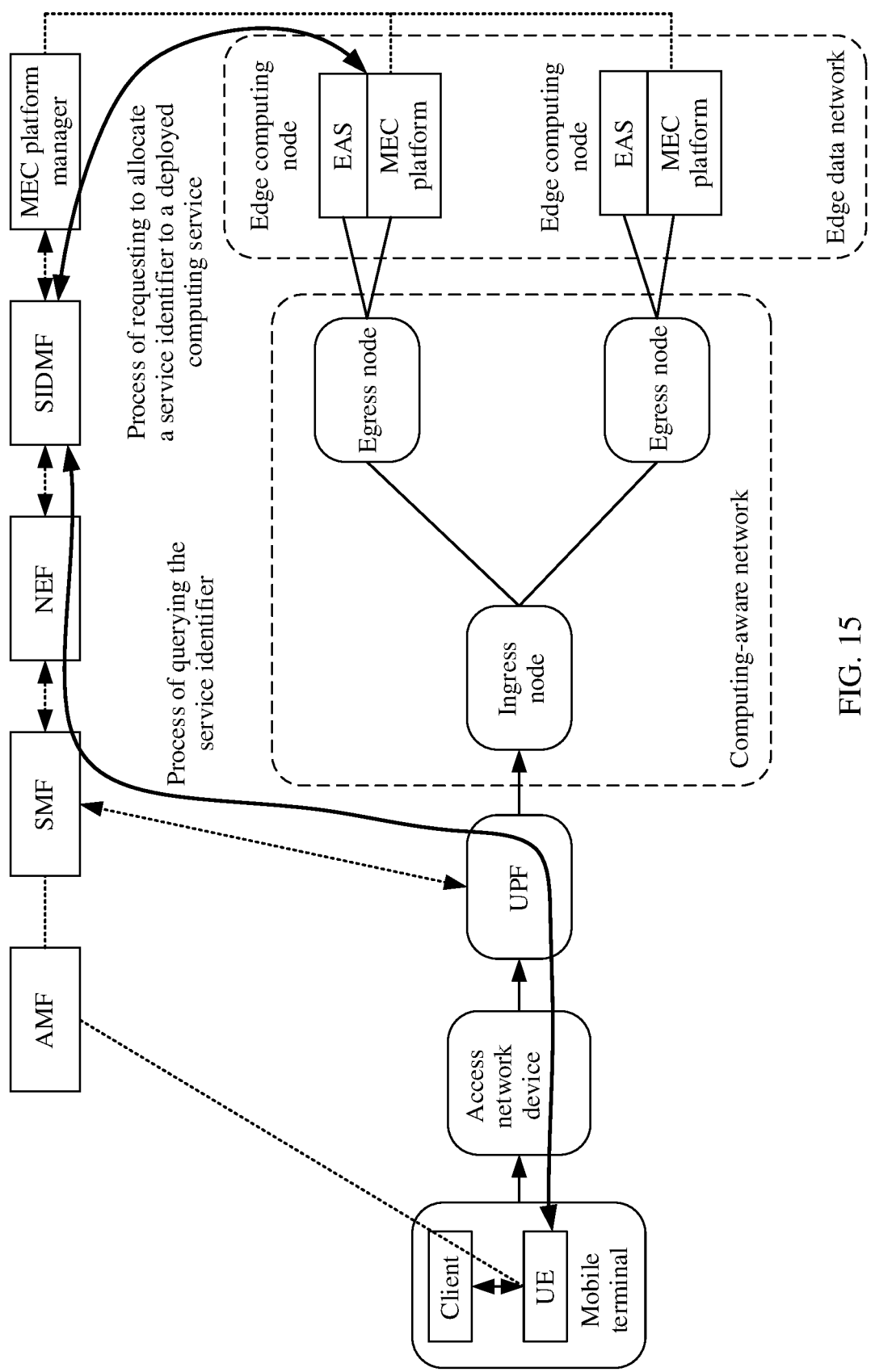
FIG. 15 and FIG. 16 each are a schematic diagram of a process of allocating and querying a service identifier of a computing service when an SIDMF is a functional entity outside a 3GPP network according to an embodiment of this application.
Figure 16:
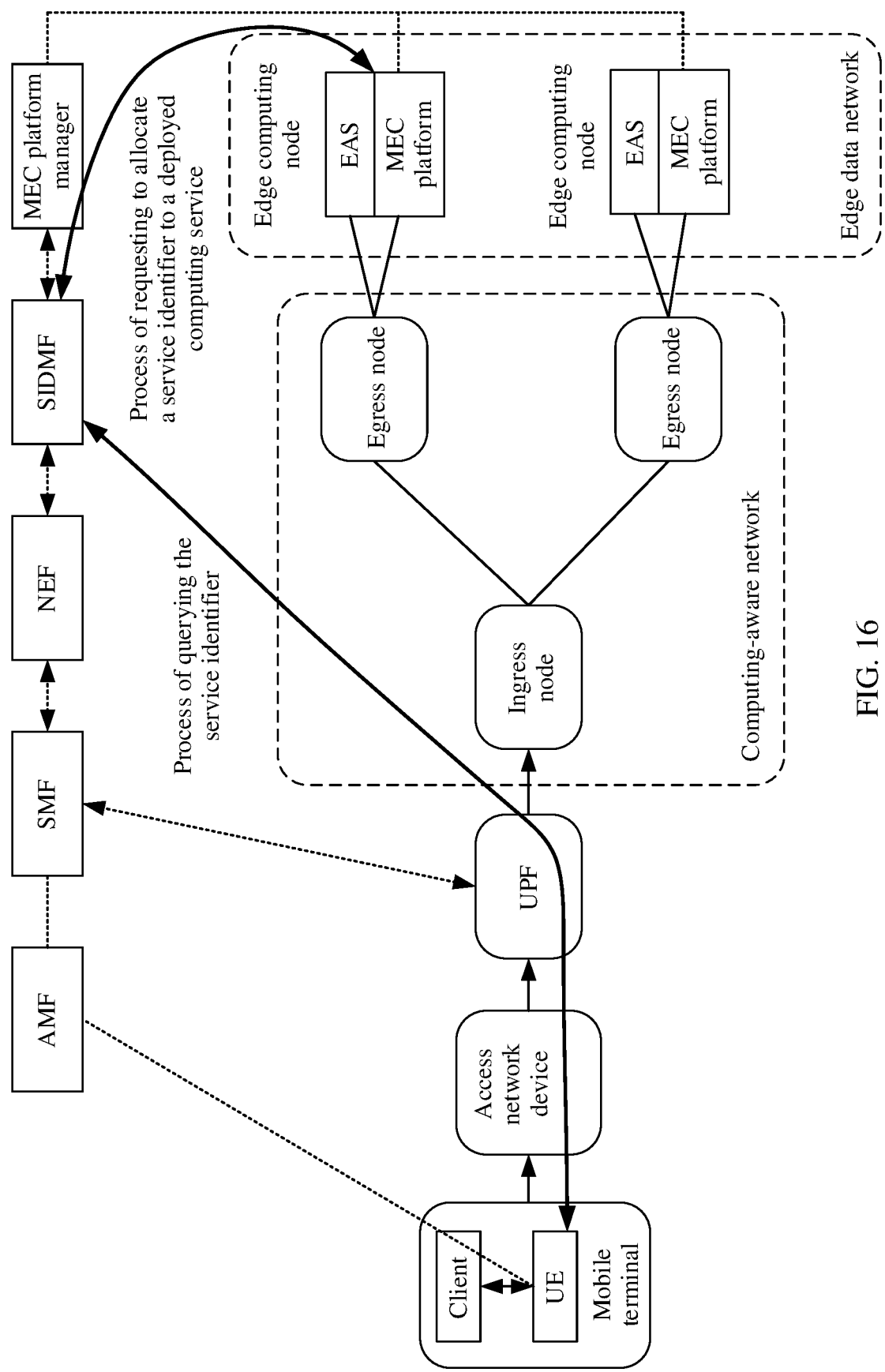

It should be noted that the foregoing Embodiment 1 and Embodiment 2 are described by using an example in which the SIDMF is a network element/functional entity inside a 3GPP network. However, it should be noted that the technical solutions provided in this application may also be applicable to a scenario in which the SIDMF is used as a functional entity outside the 3GPP network. In this scenario, the UPF directly accesses the computing-aware network through an N6 interface. The edge computing node sends the service name of the deployed computing service to the SIDMF, and the SIDMF allocates the corresponding service identifier to the computing service. The edge computing node advertises computing service information corresponding to the computing service to the computing-aware network, to complete service identifier-based computing routing. The UE may send the service name to the SIDMF to request to obtain the corresponding service identifier. In this case, there are the following two forwarding paths for service identifier request and response messages interacted between the UE and the SIDMF: (1) As shown in FIG. 15, the service identifier request is sent to the SIDMF by the UPF, the SMF and the NEF, and the service identifier response is returned along an original path. (2) As shown in FIG. 16, the service identifier request is directly forwarded to the SIDMF by using the UPF, and the service identifier response is returned along the original path.

Figure 17:
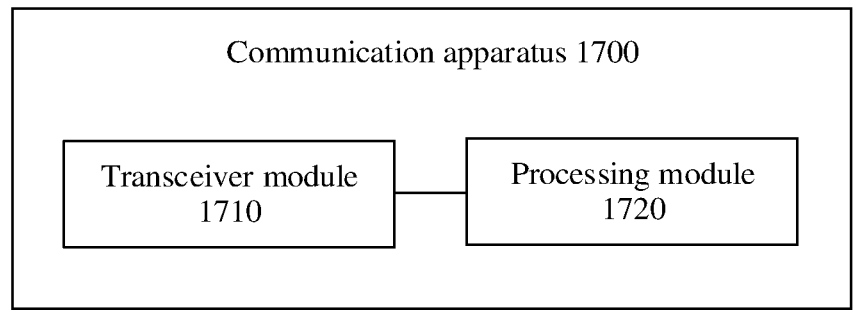
FIG. 17 to FIG. 19 each are a schematic diagram of a structure of a communication apparatus according to an embodiment of this application.

An embodiment of this application further provides a communication apparatus. FIG. 17 is a schematic diagram of a structure of a communication apparatus according to an embodiment of this application. The communication apparatus 1700 includes a transceiver module 1710 and a processing module 1720. In an implementation, the communication apparatus may be configured to implement a function of the terminal device in any one of the foregoing method embodiments. For example, the communication apparatus may be a terminal device, for example, a handheld terminal device or a vehicle-mounted terminal device. Alternatively, the communication apparatus may be a chip or a circuit included in a terminal device, or an apparatus including a terminal device, for example, various types of vehicles.

In another implementation, the communication apparatus may be configured to implement a service identifier management function, a computing management function, or a function of an MEC platform manager or an edge computing nod in any one of the foregoing method embodiments. For example, the communication apparatus may be a network device, or may be a chip included in a network device.

For example, when the communication apparatus performs the operations or steps corresponding to the terminal device in the method embodiment shown in FIG. 2, the transceiver module 1710 is configured to: query a service identifier management function for a service identifier of a computing service by using a service name of the computing service, and receive the service identifier of the computing service from the service identifier management function. The processing module 1720 is configured to send a service request packet to a first computing aware-user plane function by using the transceiver module 1710. The service request packet is used to request the computing service, the service request packet includes the service identifier of the computing service, and the service identifier is a destination address of the service request packet.

In a possible design, the transceiver module 1710 is further configured to receive a service status of the computing service from the service identifier management function, where the service status indicates that the computing service is available or unavailable; and the processing module 1720 is configured to send the service request packet to the first computing aware-user plane function if the service status indicates that the computing service is available.

In a possible design, the transceiver module 1710 is further configured to: receive a query request message from a client, where the query request message is used to query the service identifier of the computing service, and the query request message includes the service name of the computing service; send a query response message to the client, where the query response message includes the service identifier and the service status of the computing service; and receive the service request packet from the client if the service status indicates that the computing service is available.

In a possible design, the transceiver module 1710 is further configured to: receive a registration request message from a client, where the registration request message is used to request to register the computing service with the terminal device, and the registration request message includes the service name of the computing service; send a registration response message to the client, where the registration response message is used to notify the client that registration of the computing service is completed, and the registration response message includes the service status of the computing service; and receive a service request message from the client, and generate the service request packet based on the service request message if the service status indicates that the computing service is available.

When the communication apparatus performs the operations or steps corresponding to the service identifier management function in the method embodiment shown in FIG. 2, the transceiver module 1710 is configured to receive the service name of the computing service from an edge computing node; the processing module 1720 is configured to allocate the service identifier to the computing service based on the service name; and the transceiver module 1710 is further configured to send the service identifier of the computing service to the edge computing node.

In a possible design, the transceiver module 1710 is further configured to receive the service name of the computing service from the terminal device; the processing module 1720 is further configured to query the service identifier of the computing service based on the service name; and the transceiver module 1710 is further configured to send the service identifier of the computing service to the terminal device.

In a possible design, the transceiver module 1710 is further configured to send the service status of the computing service to the terminal device. The service status indicates that the computing service is available or unavailable, and the service status is obtained by the service identifier management function from a computing management function.

In a possible design, the transceiver module 1710 is further configured to send a status request message to the computing management function, where the status request message is used to request the service status of the computing service, and the status request message includes the service identifier of the computing service; and receive a status response message from the computing management function, where the status response message includes the service status of the computing service.

In a possible design, the status request message includes identification information of the first computing aware-user plane function accessed by the terminal device.

When the communication apparatus performs the operations or steps corresponding to the edge computing node in the method embodiment shown in FIG. 2, the processing module 1720 is configured to deploy a computing service, and generate a service name for the computing service; the transceiver module 1710 is configured to request, by using the service name of the computing service, the service identifier management function to allocate a service identifier to the computing service; and the transceiver module 1710 is further configured to receive the service identifier of the computing service from the service identifier management function.

When the communication apparatus performs the operations or steps corresponding to the terminal device in the method embodiment shown in FIG. 11, the transceiver module 1710 is configured to request the computing management function to deploy the computing service by using information for obtaining the computing service; the transceiver module 1710 is further configured to receive a notification from the computing management function, where the notification indicates that deployment of the computing service is completed; and the processing module 1720 is configured to send the service request packet to the first computing aware-user plane function by using the transceiver module 1710, where the service request packet is used to request the computing service.

In a possible design, the transceiver module 1710 is further configured to: provide the service name of the computing service to the computing management function; and receive the service identifier and the service status of the computing service from the computing management function, where the service status indicates that the computing service is available or unavailable.

In a possible design, the processing module 1720 is configured to send the service request packet to the first computing aware-user plane function if the service status indicates that the computing service is available. The service request packet includes the service identifier of the computing service, and the service identifier is a destination address of the service request packet.

In a possible design, the transceiver module 1710 is further configured to: receive a deployment request message from the client, where the deployment request message is used to trigger deployment of the computing service, and the deployment request message includes the service name of the computing service and the information for obtaining the computing service; and send a deployment response message to the client, where the deployment response message is used to notify the client that deployment of the computing service is completed, and the deployment response message includes the service identifier and the service status of the computing service; and the terminal device receives the service request packet from the client if the service status indicates that the computing service is available.

In a possible design, the transceiver module 1710 is further configured to provide the identification information of the terminal device to the computing management function.

When the communication apparatus performs the operations or steps corresponding to the computing management function in the method embodiment shown in FIG. 11, the transceiver module 1710 is configured to receive the information for obtaining the computing service from the terminal device; the processing module 1720 is configured to send a request to an edge computing platform manager by using the transceiver module 1710, where the request includes the information for obtaining the computing service, and the request is used to request to deploy the computing service; the transceiver module 1710 is further configured to receive a response from the edge computing platform manager, where the response indicates that deployment of the computing service is completed; and the transceiver module 1710 is further configured to notify the terminal device that deployment of the computing service is completed.

In a possible design, the transceiver module 1710 is further configured to receive the service name of the computing service from the terminal device; the processing module 1720 is further configured to request, by using the transceiver module 1710, the service identifier management function to allocate the service identifier to the computing service, and provide the service name of the computing service to the service identifier management function; and the transceiver module 1710 is further configured to receive the service identifier of the computing service from the service identifier management function.

In a possible design, the request includes a service identifier of the computing service.

In a possible design, the response includes a service status of the computing service, and the service status indicates that the computing service is available or unavailable. The transceiver module 1710 is configured to send the service identifier and the service status of the computing service to the terminal device.

In a possible design, the transceiver module 1710 is further configured to receive identification information of the terminal device from the terminal device. The processing module 1720 is further configured to verify, by using the transceiver module 1710 and a unified data management and based on the identification information of the terminal device, the service name of the computing service and the information for obtaining the computing service, that the terminal device has permission to actively trigger deployment of the computing service.

When the communication apparatus performs the operations or steps corresponding to the MEC platform manager in the method embodiment shown in FIG. 11, the transceiver module 1710 is configured to receive a request from the computing management function, where the request includes obtaining information of a computing service, and the request is used to request to deploy the computing service; the processing module 1720 is configured to indicate, by using the transceiver module 1710, a selected edge computing node to deploy the computing service based on the obtaining information; and the transceiver module 1710 is further configured to send a response to the computing management function, where the response indicates that deployment of the computing service is completed.

In a possible design, the request includes a service identifier of the computing service.

In a possible design, the response includes a service status of the computing service, and the service status indicates that the computing service is available or unavailable.

The processing module 1720 in the communication apparatus may be implemented by at least one processor or one processor-related circuit component, and the transceiver module 1710 may be implemented by at least one transceiver or one transceiver-related circuit component, or one communication interface. Operations and/or functions of the modules in the communication apparatus are separately used to implement corresponding procedures of the methods shown in FIG. 2 to FIG. 9B, FIG. 10a-1 to FIG. 10b-3, and FIG. 11 to FIG. 14D. For brevity, details are not described herein again. Optionally, the communication apparatus may further include a storage module. The storage module may be configured to store data and/or instructions. The transceiver module 1710 and/or the processing module 1720 may read the data and/or the instructions in the storage module, to enable the communication apparatus to implement a corresponding method. The storage module may be implemented, for example, by using at least one memory.

The storage module, the processing module, and the transceiver module may exist separately, or all or some of the modules may be integrated. For example, the storage module and the processing module are integrated, or the processing module and the transceiver module are integrated.

Figure 18:
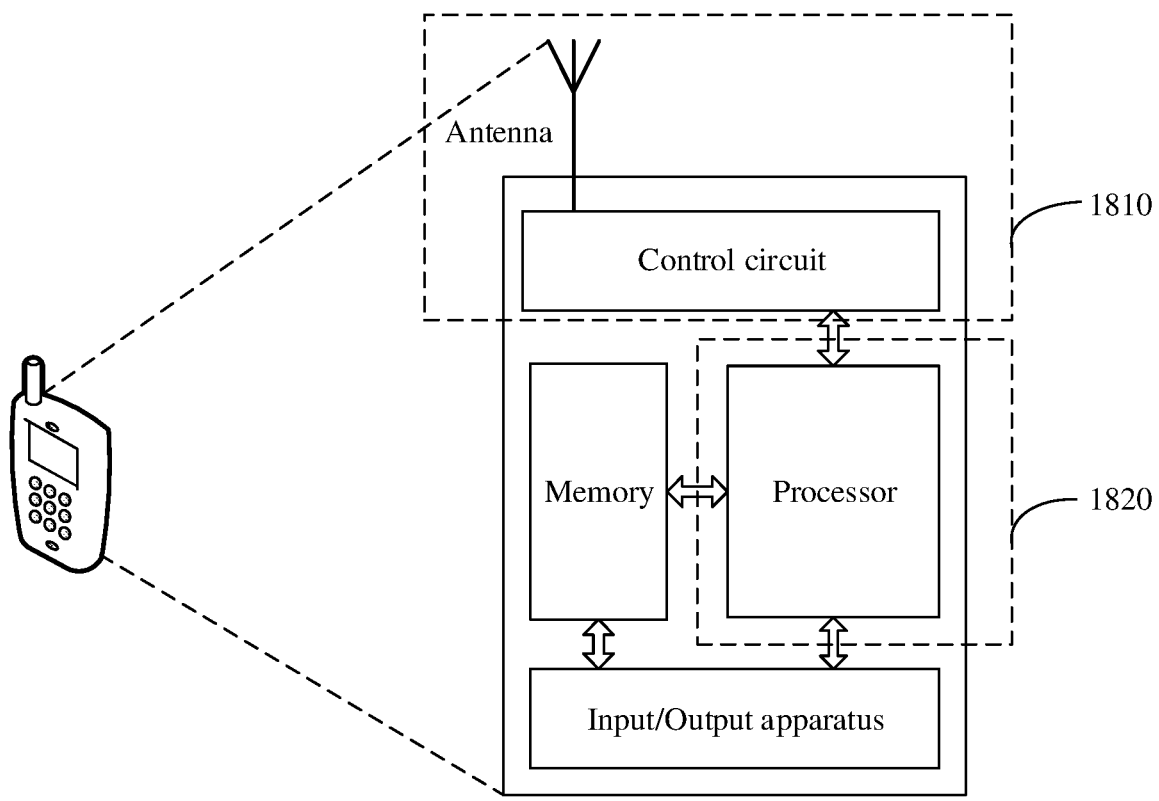

FIG. 18 is a schematic diagram of another structure of a communication apparatus according to an embodiment of this application. The communication apparatus may be a terminal device. The communication apparatus may be configured to implement functions of the terminal device according to any one of the foregoing method embodiments. For ease of understanding and illustration, in FIG. 18, an example in which the terminal device is a mobile phone is used. As shown in FIG. 18, the terminal device includes a processor, and may further include a memory. Certainly, the terminal device may further include a radio frequency circuit, an antenna, an input/output apparatus, and the like. The processor is mainly configured to: process a communication protocol and communication data, control the terminal device, execute a software program, process data of the software program, and the like. The memory is mainly configured to store the software program and data. The radio frequency circuit is mainly configured to perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to the user. It should be noted that some types of terminal devices may not have input/output apparatuses.

When needing to send data, after performing baseband processing on the to-be-sent data, the processor outputs a baseband signal to the radio frequency circuit; and the radio frequency circuit performs radio frequency processing on the baseband signal and then sends the radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 18 shows only one memory and one processor. In an actual terminal product, there may be one or more processors and one or more memories. The memory may also be referred to as a storage medium, a storage device, or the like. The memory may be disposed independent of the processor, or may be integrated with the processor. This is not limited in embodiments of this application.

In this embodiment of this application, the antenna and a radio frequency circuit that have a transceiver function may be considered as a transceiver unit of the terminal device, and a processor that has a processing function may be considered as a processing unit of the terminal device. As shown in FIG. 18, the terminal device includes a transceiver unit 1810 and a processing unit 1820. The transceiver unit may also be referred to as a transceiver, a transceiver device, a transceiver apparatus, or the like. The processing unit may also be referred to as a processor, a processing board, a processing module, a processing apparatus, or the like. Optionally, a component that is in the transceiver unit 1810 and that is configured to implement a receiving function may be considered as a receiving unit, and a component that is in the transceiver unit 1810 and that is configured to implement a sending function may be considered as a sending unit. That is, the transceiver unit 1810 includes the receiving unit and the sending unit. The transceiver unit sometimes may also be referred to as a transceiver device, a transceiver, a transceiver circuit, or the like. The receiving unit sometimes may also be referred to as a receiver device, a receiver, a receive circuit, or the like. The sending unit sometimes may also be referred to as a transmitter device, a transmitter, a transmit circuit, or the like. It should be understood that the transceiver unit 1810 is configured to perform a sending operation and a receiving operation on a terminal side in the foregoing method embodiments, and the processing unit 1820 is configured to perform an operation other than the sending operation and the receiving operation of the terminal in the foregoing method embodiments.

Figure 19:
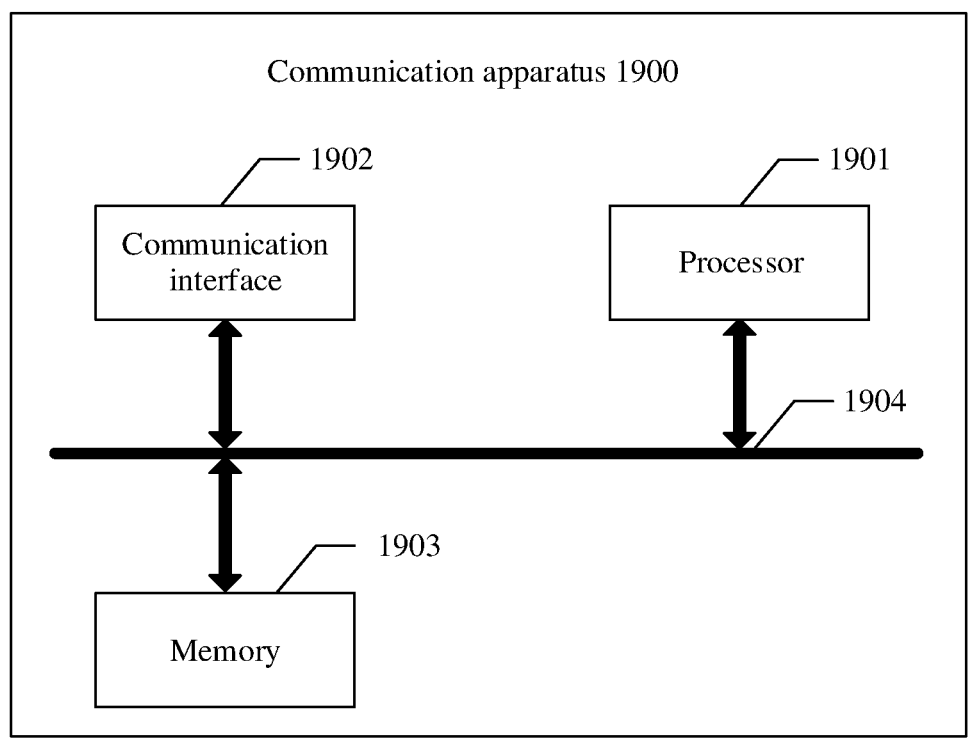

FIG. 19 is a schematic diagram of another structure of a communication apparatus according to an embodiment of this application. The communication apparatus 1900 may be configured to implement a service identifier management function or a function corresponding to a computing management network element, an MEC platform manager, or an edge computing node in the foregoing method embodiments. The communication apparatus may be a network device, an apparatus that can support the network device in implementing a corresponding function in the foregoing method embodiments, or the like.

The communication apparatus may include a processor 1901, a communication interface 1902, and a memory 1903. The communication interface 1902 is configured to communicate with another device through a transmission medium. The communication interface 1902 may be a transceiver, or may be an interface circuit such as a transceiver circuit or a transceiver chip. The memory 1903 is configured to store program instructions and/or data. The processor 1901 is configured to execute the program instructions stored in the memory 1903, to implement the method in the foregoing method embodiments. Optionally, the memory 1903 is coupled to the processor 1901. The coupling is an indirect coupling or a communication connection between apparatuses, units, or modules, and may be in an electrical, mechanical, or another form, and is used for information exchange between the apparatuses, the units, or the modules.

In an embodiment, the communication interface 1902 may be configured to perform an action of the transceiver module 1710, and the processor 1901 may be configured to perform an action of the processing module 1720. Details are not described herein again in this application.

In this embodiment of this application, a specific connection medium between the communication interface 1902, the processor 1901 and the memory 1903 is not limited. In this embodiment of this application, the memory 1903, the processor 1901, and the communication interface 1902 are connected through a bus 1904 in FIG. 19, and the bus is represented by using a bold line in FIG. 19. A connection manner between other components is merely an example for description, and is not limited thereto. The bus may be classified into an address bus, a data bus, a control bus, and the like. For ease of representation, only one bold line is used to represent the bus in FIG. 19, but this does not mean that there is only one bus or only one type of bus.

An embodiment of this application further provides a chip system, including a processor. The processor is coupled to a memory. The memory is configured to store a program or instructions. When the program or the instructions is/are executed by the processor, the chip system is enabled to implement the method corresponding to the terminal device or the method corresponding to the network device according to any one of the foregoing method embodiments.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may alternatively be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

For example, the chip system may be a field programmable gate array (FPGA), an application-specific integrated circuit (ASIC), a system on a chip (SoC), a central processing unit (CPU), a network processor (NP), a digital signal processor (DSP), a microcontroller unit (MCU), a programmable logic device (PLD), or another integrated chip.

It should be understood that the steps in the foregoing method embodiments may be completed by using a hardware integrated logic circuit or instructions in a form of software in the processor. The steps of the methods disclosed with reference to embodiments of this application may be directly performed by a hardware processor, or may be performed by a combination of hardware in the processor and a software module.

An embodiment of this application further provides a computer-readable storage medium. The computer storage medium stores computer-readable instructions. When a computer reads and executes the computer-readable instructions, the computer is enabled to perform the method according to any one of the foregoing method embodiments.

An embodiment of this application further provides a computer program product. When a computer reads and executes the computer program product, the computer is enabled to perform the method according to any one of the foregoing method embodiments.

An embodiment of this application further provides a communication system. The communication system includes one or more of the following: a terminal device, a service identifier management function, a computing management function, an edge computing node, or an edge computing platform manager. Optionally, the communication system further includes one or more network elements or functional entities of a unified data management function, a session management function, a computing aware-user plane function, and an access network device.

It should be understood that, the processor in embodiments of this application may be a CPU, or may be another general-purpose processor, a DSP, an ASIC, an FPGA or another programmable logic device, a discrete gate or a transistor logic device, a discrete hardware component, or the like. The general-purpose processor may be a microprocessor, or the processor may be any conventional processor or the like.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example, and not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM).

It should be noted that when the processor is a general-purpose processor, a DSP, an ASIC, an FPGA, another programmable logic device, a discrete gate or transistor logic device, or a discrete hardware component, the memory (a storage module) is integrated into the processor.

It should be noted that the memory described in this specification aims to include but is not limited to these memories and any memory of another proper type.

It should be understood that numbers in various embodiments of this application are merely used for differentiation for ease of description. Sequence numbers of the foregoing processes or steps do not mean execution sequences. The execution sequences of the processes or steps should be determined based on functions and internal logic of the processes or steps, and should not constitute any limitation on the implementation processes of embodiments of the present disclosure.

A person of ordinary skill in the art may be aware that, in combination with the examples described in embodiments disclosed in this specification, units and algorithm steps may be implemented by electronic hardware or a combination of computer software and electronic hardware. Whether the functions are performed by using hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist independently physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a ROM, a RAM, a magnetic disk, or an optical disc.

In various embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

What is claimed is:

1. A service identifier allocation method, applied to a communication apparatus, comprising:
   requesting a computing management function to deploy a computing service by using information for obtaining the computing service;
   receiving a notification from the computing management function, wherein the notification comprises a service identifier of the computing service and a service status of the computing service, the notification indicates that deployment of the computing service is completed, the service status indicates that the computing service is available or unavailable in a regional computing group corresponding to a first computing-aware user plane function, and the regional computing group is a group formed by edge computing nodes associated with a computing-aware network that uses the first computing-aware user plane function as an ingress; and
   sending a service request packet to the first computing-aware user plane function in response to the service status indicating that the computing service is available, wherein the service request packet is used to request the computing service and comprises the service identifier of the computing service.

2. The service identifier allocation method according to claim 1, wherein the service identifier is allocated based on a service name of the computing service, and the method further comprises:
   providing the service name of the computing service to the computing management function.

3. The service identifier allocation method according to claim 1, further comprising:
   receiving a deployment request message from a client, wherein the deployment request message is used to trigger the deployment of the computing service, and the deployment request message comprises a service name of the computing service and the information for obtaining the computing service;
   sending a deployment response message to the client, wherein the deployment response message is used to notify the client that the deployment of the computing service is completed, and the deployment response message comprises the service identifier and the service status of the computing service, wherein the service status indicates that the computing service is available; and
   receiving the service request packet from the client.

4. The service identifier allocation method according to claim 1, further comprising:
   providing identification information of the communication apparatus to the computing management function.

5. The service identifier allocation method according to claim 1, wherein the information for obtaining the computing service comprises a download address of the computing service.

6. The service identifier allocation method according to claim 1, wherein the service identifier is a destination address of the service request packet.

7. The service identifier allocation method according to claim 1, wherein the communication apparatus is a terminal device or a chip in the terminal device.

8. A communication apparatus, comprising:
   at least one processor; and
   a memory having instructions stored thereon that, when executed by the at least one processor, cause the communication apparatus to:
   request a computing management function to deploy a computing service by using information for obtaining the computing service;
   receive a notification from the computing management function, wherein the notification comprises a service identifier of the computing service and a service status of the computing service, the notification indicates that deployment of the computing service is completed, the service status indicates that the computing service is available or unavailable in a regional computing group corresponding to a first computing-aware user plane function, and the regional computing group is a group formed by edge computing nodes associated with a computing-aware network that uses the first computing-aware user plane function as an ingress; and
   send a service request packet to the first computing-aware user plane function in response to the service status indicating that the computing service is available, wherein the service request packet is used to request the computing service and comprises the service identifier of the computing service.

9. The communication apparatus according to claim 8, wherein the service identifier is allocated based on a service name of the computing service, and the communication apparatus is further caused to:

provide the service name of the computing service to the computing management function.

10. The communication apparatus according to claim 8, wherein the communication apparatus is further caused to:
receive a deployment request message from a client, wherein the deployment request message is used to trigger the deployment of the computing service, and the deployment request message comprises a service name of the computing service and the information for obtaining the computing service;
send a deployment response message to the client, wherein the deployment response message is used to notify the client that the deployment of the computing service is completed, and the deployment response message comprises the service identifier and the service status of the computing service, wherein the service status indicates that the computing service is available; and
receive the service request packet from the client.

11. The communication apparatus according to claim 8, wherein the communication apparatus is further caused to:
provide identification information of the communication apparatus to the computing management function.

12. The communication apparatus according to claim 8, wherein the information for obtaining the computing service comprises a download address of the computing service.

13. A non-transitory computer readable medium having instructions stored thereon that, when executed by a processor, cause a communication apparatus to:
request a computing management function to deploy a computing service by using information for obtaining the computing service;
receive a notification from the computing management function, wherein the notification comprises a service identifier of the computing service and a service status of the computing service, the notification indicates that deployment of the computing service is completed, the service status indicates that the computing service is available or unavailable in a regional computing group corresponding to a first computing-aware user plane function, and the regional computing group is a group formed by edge computing nodes associated with a computing-aware network that uses the first computing-aware user plane function as an ingress; and
send a service request packet to the first computing-aware user plane function in response to the service status indicating that the computing service is available, wherein the service request packet is used to request the computing service and comprises the service identifier of the computing service.

14. The non-transitory computer readable medium according to claim 13, wherein the communication apparatus is further caused to:
provide a service name of the computing service to the computing management function.

15. The non-transitory computer readable medium according to claim 14, wherein the communication apparatus is further caused to:
provide identification information to the computing management function.

16. The non-transitory computer readable medium according to claim 13, wherein the communication apparatus is further caused to:
receive a deployment request message from a client, wherein the deployment request message is used to trigger the deployment of the computing service, and the deployment request message comprises a service name of the computing service and the information for obtaining the computing service;
send a deployment response message to the client, wherein the deployment response message is used to notify the client that the deployment of the computing service is completed, and the deployment response message comprises the service identifier and the service status of the computing service, wherein the service status indicates that the computing service is available; and
receive the service request packet from the client.

* * * * *